(12) United States Patent
Yamaoka et al.

(10) Patent No.: US 11,789,716 B2
(45) Date of Patent: Oct. 17, 2023

(54) ELECTRONIC APPARATUS CAPABLE OF UPDATING FIRMWARE PROGRAM SECURELY AND METHOD OF UPDATING FIRMWARE PROGRAM SECURELY

(71) Applicant: KABUSHIKI KAISHA TOSHIBA, Tokyo (JP)

(72) Inventors: Shinnosuke Yamaoka, Fuchu Tokyo (JP); Mikio Hashimoto, Bunkyo Tokyo (JP); Ryuiti Koike, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 88 days.

(21) Appl. No.: 17/447,483

(22) Filed: Sep. 13, 2021

(65) Prior Publication Data

US 2022/0091839 A1  Mar. 24, 2022

(30) Foreign Application Priority Data

Sep. 23, 2020  (JP) ................. 2020-158946

(51) Int. Cl.
*G06F 8/65*  (2018.01)
*G06F 9/54*  (2006.01)

(52) U.S. Cl.
CPC ............ *G06F 8/65* (2013.01); *G06F 9/542* (2013.01)

(58) Field of Classification Search
CPC .......... G06F 8/65; G06F 9/542; G06F 21/572; G06F 21/575; G06F 8/654
See application file for complete search history.

(56) References Cited

U.S. PATENT DOCUMENTS

| 7,421,579 | B2 | 9/2008 | England et al. |
| 7,549,042 | B2 | 6/2009 | Glaum et al. |
| 8,214,653 | B1 * | 7/2012 | Marr .................. G06F 8/65 |
| | | | 713/150 |

(Continued)

FOREIGN PATENT DOCUMENTS

| JP | 2004-38968 A | 2/2004 |
| JP | 4548601 B2 | 9/2010 |

(Continued)

*Primary Examiner* — Daxin Wu
(74) *Attorney, Agent, or Firm* — Finnegan, Henderson, Farabow, Garrett & Dunner, LLP

(57) ABSTRACT

An electronic apparatus includes: a processor configured to execute a firmware program and a monitor program exclusively, switch between multiple operation modes, and start up the firmware program according to the monitor program; and nonvolatile memory which includes, storage regions for a plurality of firmware programs, a signature table that holds signatures of the firmware programs individually stored in the storage regions or a signature of a firmware program including an identification number of an update notification used for update, a firmware program storage for information specifying a firmware program selected to be executed, a first storage that holds an execution result of a firmware program selected in accordance with the monitor program, a second storage that holds the update notification acquired by the execution of the firmware program, and a third storage that holds a maximum identification number of firmware programs that have been executed.

12 Claims, 32 Drawing Sheets

(56) References Cited

U.S. PATENT DOCUMENTS

| | | | | |
|---|---|---|---|---|
| 8,607,215 B2* | 12/2013 | Natsume | ............ | G06F 11/1433 |
| | | | | 717/173 |
| 8,825,995 B2* | 9/2014 | Lee | ............ | G06F 9/4401 |
| | | | | 713/1 |
| 8,880,898 B2 | 11/2014 | Smeets | | |
| 8,887,144 B1* | 11/2014 | Marr | ............ | G06F 9/4416 |
| | | | | 717/172 |
| 8,935,530 B2* | 1/2015 | Hashimoto | ............ | H04L 9/3247 |
| | | | | 713/168 |
| 9,565,207 B1* | 2/2017 | Marr | ............ | H04L 9/3247 |
| 9,860,218 B2* | 1/2018 | Koike | ............ | G06F 21/6272 |
| 10,354,073 B2 | 7/2019 | Koike et al. | | |
| 11,520,483 B2* | 12/2022 | Kang | ............ | G06F 3/0679 |
| 2004/0143710 A1* | 7/2004 | Walmsley | ............ | G06F 21/71 |
| | | | | 711/144 |
| 2011/0040960 A1* | 2/2011 | Deierling | ............ | G06F 21/572 |
| | | | | 711/163 |
| 2011/0239058 A1* | 9/2011 | Umezuki | ............ | H04L 41/06 |
| | | | | 714/48 |
| 2013/0047144 A1* | 2/2013 | Chalmers | ............ | G06F 8/654 |
| | | | | 717/168 |
| 2013/0073851 A1* | 3/2013 | Hashimoto | ............ | H04W 12/122 |
| | | | | 713/168 |
| 2016/0234396 A1* | 8/2016 | Yasukawa | ............ | H04N 1/00973 |
| 2019/0265967 A1* | 8/2019 | Nakahara | ............ | G06F 8/65 |
| 2021/0397441 A1* | 12/2021 | He | ............ | H04L 9/3073 |

FOREIGN PATENT DOCUMENTS

| | | |
|---|---|---|
| JP | 4901095 B2 | 3/2012 |
| JP | 5038397 B2 | 10/2012 |
| JP | 2013-69053 A | 4/2013 |
| JP | 2016-144040 A | 8/2016 |
| JP | 2017-33149 A | 2/2017 |
| JP | WO2018/139296 A1 | 8/2018 |

* cited by examiner

FIG.27

UPDATE NOTIFICATION LIST

| 811 | 812-1 | 812-2 |
|---|---|---|
| #1 | a | b |
| #5 | b | e |
| #6 | e | f |
| #7 | b | f |
| #8 | a | f |

FIG.28

UPDATE PLAN

| 811 | 812-1 | 812-2 |
|---|---|---|
| #5 | b | e |
| #6 | e | f |

ELECTRONIC APPARATUS CAPABLE OF UPDATING FIRMWARE PROGRAM SECURELY AND METHOD OF UPDATING FIRMWARE PROGRAM SECURELY

CROSS-REFERENCE TO RELATED APPLICATIONS

This application is based upon and claims the benefit of priority from Japanese Patent Application No. 2020-158946, filed on Sep. 23, 2020; the entire contents of which are incorporated herein by reference.

FIELD

Embodiments described herein relate generally to an electronic apparatus and method.

BACKGROUND

Recent electronic apparatus such as information processing devices including a firmware program (hereinafter, firmware or FW) may adopt remote firmware (FM) update that serves to update the FW through communications. It is desirable for such an information processing device subjected to the remote FM update to implement higher security and higher availability.

BRIEF DESCRIPTION OF THE DRAWINGS

FIG. 27 is a schematic diagram illustrating an exemplary update notification list according to the fourth embodiment;

FIG. 28 is a schematic diagram illustrating an exemplary update plan according to the fourth embodiment;

DETAILED DESCRIPTION

Figure 1:
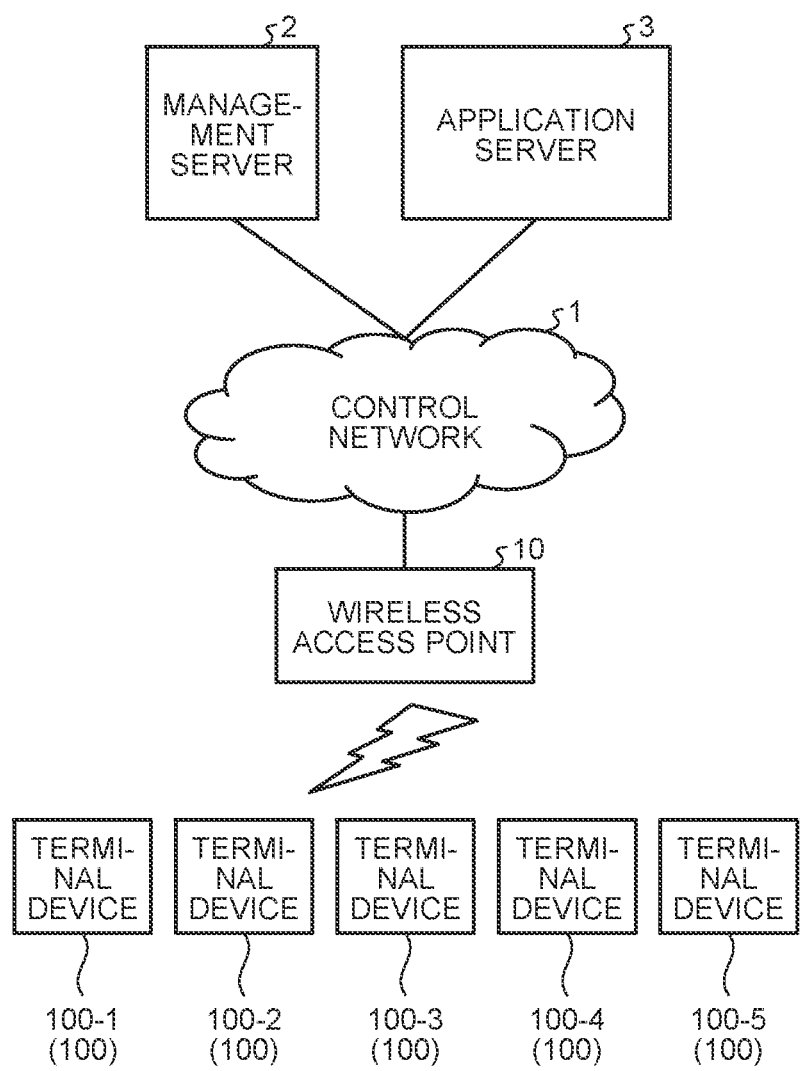
FIG. 1 is a schematic diagram illustrating an exemplary network configuration according to a first embodiment.

According to one embodiment, in general, an electronic apparatus comprising: a processor configured to be able to:

execute a firmware program and a monitor program from each other, switch between a plurality of operation modes of the monitor program, the plurality of operation mode including a first mode and a second mode, and start up the firmware program according to the monitor program; and a nonvolatile memory which includes: storage regions in which a plurality of firmware programs is stored, a signature table configured to hold signatures of the plurality of firmware programs individually stored in the storage regions or a signature of one of the firmware programs including an identification number of an update notification used for update, a firmware program storage configured to store therein information specifying a firmware program selected to be executed, in accordance with the monitor program, among the plurality of firmware programs, a first storage configured to hold a result of execution of a firmware program selected in accordance with the monitor program among the plurality of firmware programs, a second storage configured to hold the update notification acquired as a result of the execution of the firmware program, and a third storage configured to hold a maximum identification number of firmware programs that have been executed among the plurality of firmware programs, wherein in the first mode, the processor determines, according to a result of a previous execution of a firmware program, validity of a function of the firmware program; after failing to determine the validity of the function of the firmware program, selects and executes one firmware program from the plurality of firmware programs stored in the storage regions according to a given order of priority; and after succeeding in determining the validity of the function of the firmware program, performs a first verification of verifying the update notification acquired and held in the second storage, and changes an operation mode to be used from the first mode to the second mode to execute the firmware program, when the identification number of the update notification is larger than the maximum identification number, and in the second mode, after succeeding in a second verification of verifying the update notification stored in the second storage, succeeding in a third verification of verifying a firmware program acquired and stored in the storage region by the previous execution of the firmware program in response to the update notification, and succeeding in a fourth verification of confirming that the identification number is larger than the maximum identification number, the processor transfers the update notification from the second storage to an entry of the signature table corresponding to the firmware program, the processor changes the firmware program to be executed and an operation mode to be used from the second mode to the first mode and executes the firmware program, and the processor executes the firmware program again after failing in any of the second verification, the third verification, and the fourth verification.

As described above, it is preferable for an information processing device in which remote FW update is feasible to provide higher security and higher availability.

In terms of the security, there may be the following challenges. A first challenge is to prevent firmware or an update notification to be received by the information processing device from being counterfeited. If older firmware in operation has vulnerabilities, an unauthorized party may be able to access an access-prohibited region of the storage of the information processing device at the time of acquiring new firmware. Such an unauthorized access is thus to be prevented. Another challenge is to prepare a countermeasure against a rollback attack. The rollback attack refers to a form of attack to exploit vulnerabilities of the current information processing device including vulnerable, older-version firmware by taking advantage of the recovery function of the information processing device.

In terms of the availability, the following challenges may arise. For example, malfunction of remotely distributed firmware, if occurs, may cause the information processing device to fail to start up or continue communications. In view of this, the information processing device includes a failure mode in which the information processing device is inoperable. Rolling back the firmware to be executed from the current version to the older version is a typical method to deal with the failure mode. The older-version rollback firmware may, however, include a serious defect, impairing the availability of the information processing device. That is, a second challenge is to enable the information processing device to normally operate by the rollback firmware. In addition, the rollback firmware with vulnerabilities may cause degradation in the security of the information processing device after the rollback.

According to an embodiment, it is possible to provide an improved information processing device in terms of security and availability by solving at least part of the challenges for the security and at least part of the challenges for the availability.

Hereinafter, information processing devices according to embodiments will be described in detail with reference to the accompanying drawings. The embodiments are merely exemplary and unintended to limit the scope of the present invention.

First Embodiment

FIG. 1 is a schematic diagram illustrating an exemplary network configuration according to a first embodiment.

The network configuration includes a control network 1, a management server 2, an application server 3, a wireless access point 10, and one or more terminal devices 100. Each of the one or more terminal devices 100 can communicate with the management server 2 and the application server 3 via the wireless access point 10 and the control network 1. FIG. 1 depicts five terminal devices 100-1 to 100-5 as the one or more terminal devices 100. The number of terminal devices 100 communicable with the management server 2 and the application server 3 is not limited to five. Each of the one or more terminal devices 100 is an exemplary information processing device.

Each terminal device 100 is connected to the wireless access point 10 via a wireless link. The control network 1 is a network in compliance with the Internet protocol.

In updating the firmware of each terminal device 100, the management server 2 issues and distributes an update notification to the terminal devices 100 under management by broadcasting. Upon receipt of the update notification, each terminal device 100 can acquire new firmware from the management server 2. That is, the management server 2 can perform remote FW update to remotely update the firmware of each terminal device 100. The update notification and the acquisition of the firmware program will be described in detail later.

The application server 3 can distribute an application program to a desired one of the one or more terminal devices 100 or provide that with data for use in operating the application program.

Figure 2:
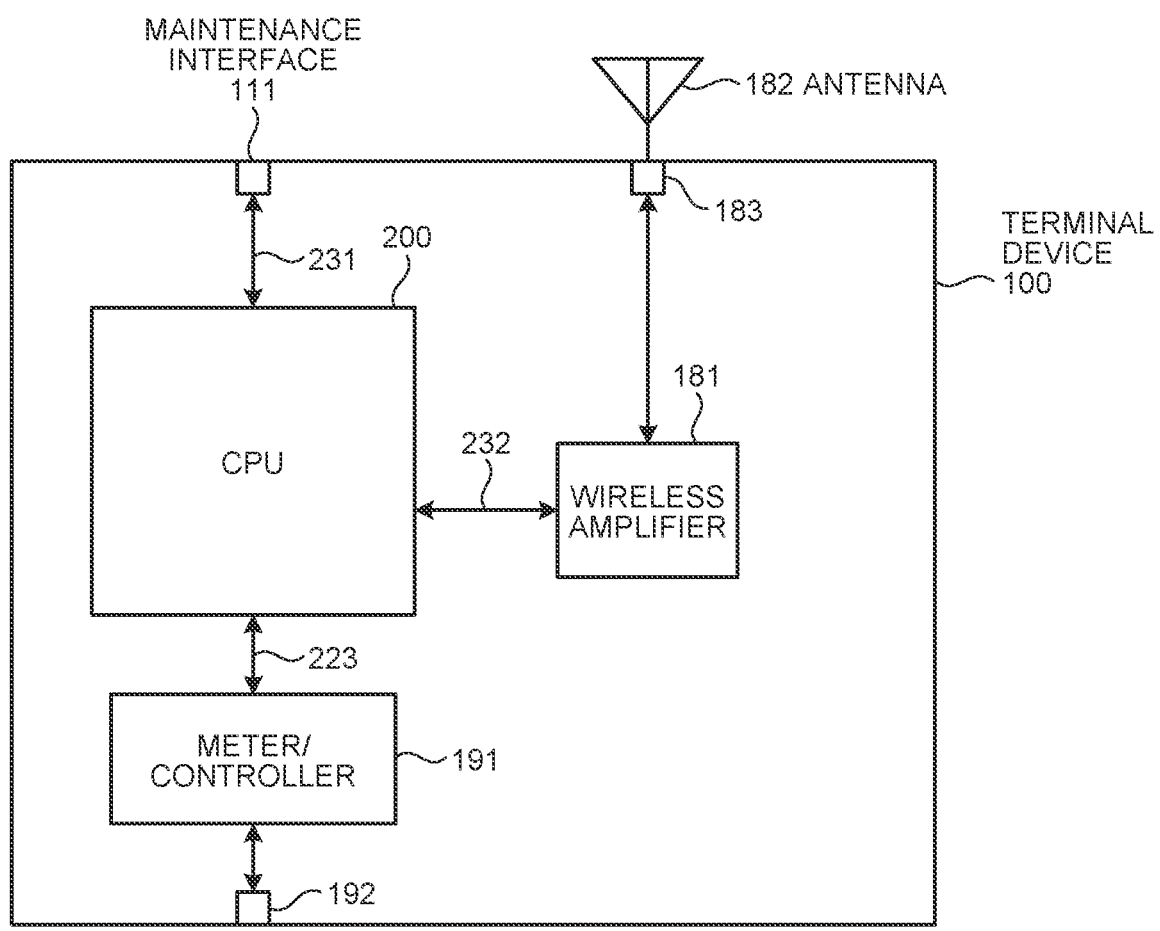
FIG. 2 is a schematic diagram illustrating an exemplary hardware configuration of a terminal device according to the first embodiment.

FIG. 2 is a schematic diagram illustrating an exemplary hardware configuration of the terminal device 100 according to the first embodiment.

A central processing unit (CPU) 200 as an exemplary processor is connected to a wireless amplifier 181 through a wireless data link 232. The wireless amplifier 181 is connected to an antenna 182 via an external input/output terminal 183. The CPU 200 is connected to a meter/controller 191 through universal asynchronous receiver-transmitter (UART) connection 223. The meter/controller 191 is connected to an external input/output terminal 192. For example, the meter/controller 191 communicates with a power meter via the external input/output terminal 192, measures power consumption of an intended device, and passes a result of the measurement to the CPU 200. The CPU 200 is connected to an external maintenance interface 111.

Figure 3:
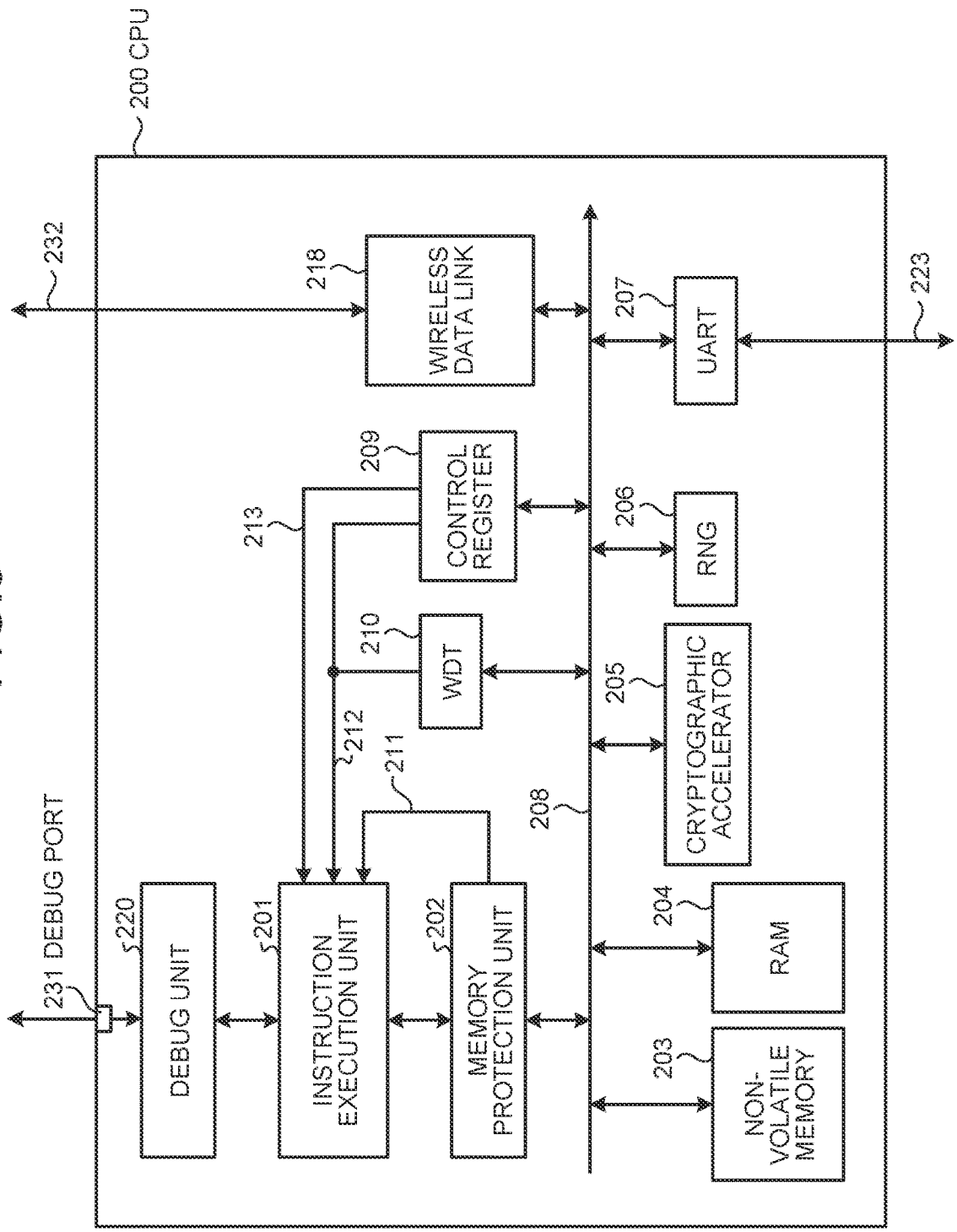
FIG. 3 is a schematic diagram illustrating an exemplary internal configuration of a CPU included in the terminal device according to the first embodiment.

FIG. 3 is a schematic diagram illustrating an exemplary internal configuration of the CPU 200 included in the terminal device 100 according to the first embodiment.

An instruction execution unit 201 is connected to an internal bus 208 via a memory protection unit 202.

The memory protection unit 202 outputs a signal indicating whether or not an instruction to be input to the instruction execution unit 201 is assigned to a read only memory (ROM) monitor program (ROM monitor program 650 in FIG. 4) stored in a nonvolatile memory 203. This signal is input to the instruction execution unit 201 via a signal line 211.

The nonvolatile memory 203 and a random access memory (RAM) 204 are connected to the internal bus 208.

A watchdog timer (WDT) 210 and a control register 209 are also connected to the internal bus 208. The control register 209 outputs a reset signal and the WDT 210 outputs a reset signal to the instruction execution unit 201 via a reset signal line 212 by a wired OR. In addition, the control register 209 outputs a non-maskable interrupt (NMI) signal to the instruction execution unit 201 via an NMI signal line 213.

A cryptographic accelerator 205 and a random number generator (RNG) 206 are also connected to the internal bus 208. A wireless data link 218 and a universal asynchronous receiver-transmitter (UART) 207 are connected to the internal bus 208.

A debug unit 220 is directly connected to the instruction execution unit 201 and is connected to the outside (the maintenance interface 111 in FIG. 2) via a debug port 231.

As configured above, the CPU 200 can exclusively execute the firmware program and the ROM monitor program of the terminal device 100.

Figure 4:
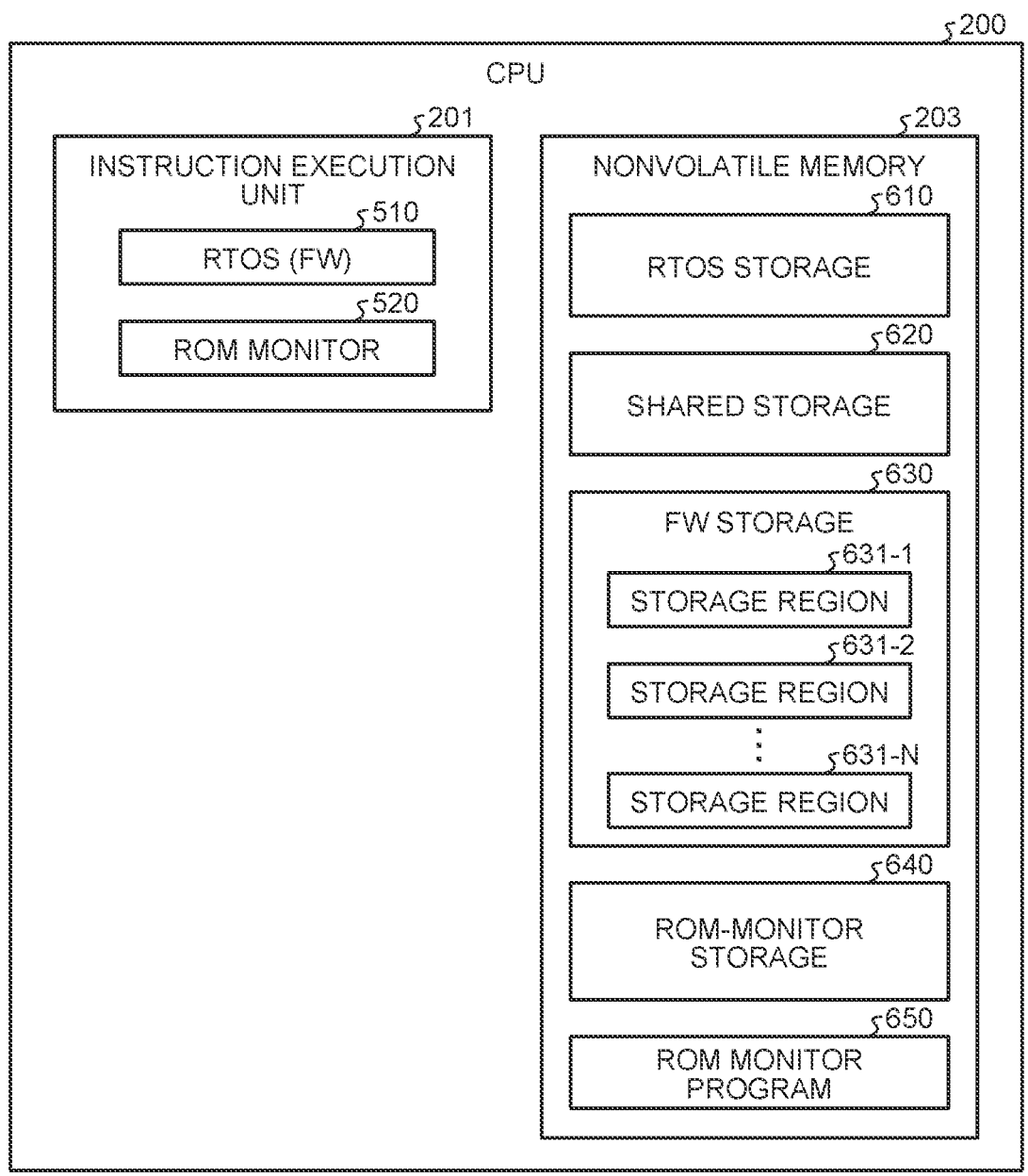
FIG. 4 is a schematic diagram illustrating a function implemented by the CPU and a schematic configuration of a nonvolatile memory in the terminal device according to the first embodiment.

FIG. 4 is a schematic diagram illustrating a function implemented by the CPU 200 and a schematic configuration of the nonvolatile memory 203 in the terminal device 100 of the first embodiment.

Programs to be executed in the terminal device 100 include the ROM monitor program 650 to be executed at the time of startup and the firmware to be initiated by the ROM monitor program 650. In the example illustrated in FIG. 4, the ROM monitor program 650 is stored in the nonvolatile memory 203. The ROM monitor program 650 may be stored in a mask ROM (not illustrated).

The instruction execution unit 201 functions as a ROM monitor 520 by executing the ROM monitor program 650. In addition, the instruction execution unit 201 functions as a real-time operating system (RTOS) 510 by executing the firmware. In the following, processing executed by the RTOS 510 may be described as processing by the firmware.

The nonvolatile memory 203 has an RTOS storage 610, a shared storage 620, an FW storage 630, and a ROM-monitor storage 640 allocated thereto. Information stored in the RTOS storage 610, the shared storage 620, the FW storage 630, and the ROM-monitor storage 640 does not disappear in a power-off state.

The FW storage 630 includes a plurality of storage regions 631. As an example, the FW storage 630 includes N storage regions 631-1 to 631-N where N is an integer of 2 or more. Each storage region 631 can store therein one piece of firmware and the FW storage 630 can thus stores therein two or more pieces of firmware.

The ROM monitor 520 has higher storage access authority than the RTOS 510. The ROM-monitor storage 640 can be referred to by the ROM monitor 520 but not by the RTOS 510. Both the RTOS 510 and the ROM monitor 520 can perform read operation and write operation to the RTOS storage 610 and the shared storage 620. However, the ROM monitor 520 performs no read operation and write operation with respect to the RTOS storage 610. The ROM monitor 520 can set an access control in units of storage regions for the purpose of restricting the RTOS 510 from writing to the FW storage 630. The RTOS 510 performs write operation following the access control setting.

The ROM monitor 520 selects one of the storage regions 631-1 to 631-N to start up the firmware stored in the selected storage region 631, thereby initiating the RTOS 510. After initiation of the RTOS 510, the ROM monitor 520 does not perform operation until re-initiation of the RTOS 510. That is, the execution of the ROM monitor program 650 and the execution of the firmware program are exclusive.

Triggered by receipt of the update notification from the management server 2, the terminal device 100 can start a firmware update operation.

Figure 5:
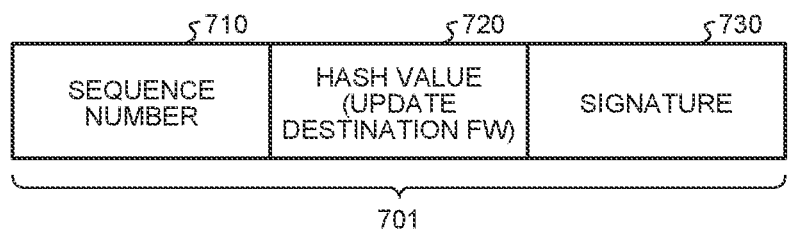
FIG. 5 is a schematic diagram illustrating an exemplary data configuration of an update notification according to the first embodiment.

FIG. 5 is a schematic diagram illustrating an exemplary data configuration of an update notification 701 according to the first embodiment. The update notification 701 includes a sequence number 710, a hash value 720 of an update firmware, and a signature 730 in combination. The signature 730 is generated by subjecting a message including the sequence number 710 and the hash value 720 to a given algorithm. A secret key of a non-symmetric key scheme is used to generate the signature 730 and is held only in the management server 2. That is, only the management server 2 can issue the authorized update notification 701. The ROM-monitor storage 640 of the terminal device 100 stores a public key being a pair with the secret key as above. The terminal device 100 (specifically, the ROM monitor 520) can verify the signature 730 according to the public key.

The sequence number 710 represents numerical information corresponding to timing at which the update notification 701 is issued. The numerical information increases every time the update notification 701 is issued. Specifically, the management server 2 adds the sequence number 710 being such numerical information to each update notification 701. In response to receipt of a new update notification 701, the terminal device 100 can determine whether or not the new update notification 701 is the latest update notification 701 by comparing the sequence number 710 of the new update notification 701 with the maximum value of the sequence numbers 710 of all the previously received update notifications 701. When the sequence number 710 of the new update notification 701 is larger than the maximum value of the sequence numbers 710 of all the previous update notifications 701, the RTOS 510 determines that the new update notification 701 is the latest update notification 701. When the sequence number 710 of the new update notification 701 is equal to or less than the maximum value of the sequence numbers 710 of all the previous update notifications 701, the RTOS 510 determines that the new update notification 701 is not the latest update notification 701.

Figure 6:
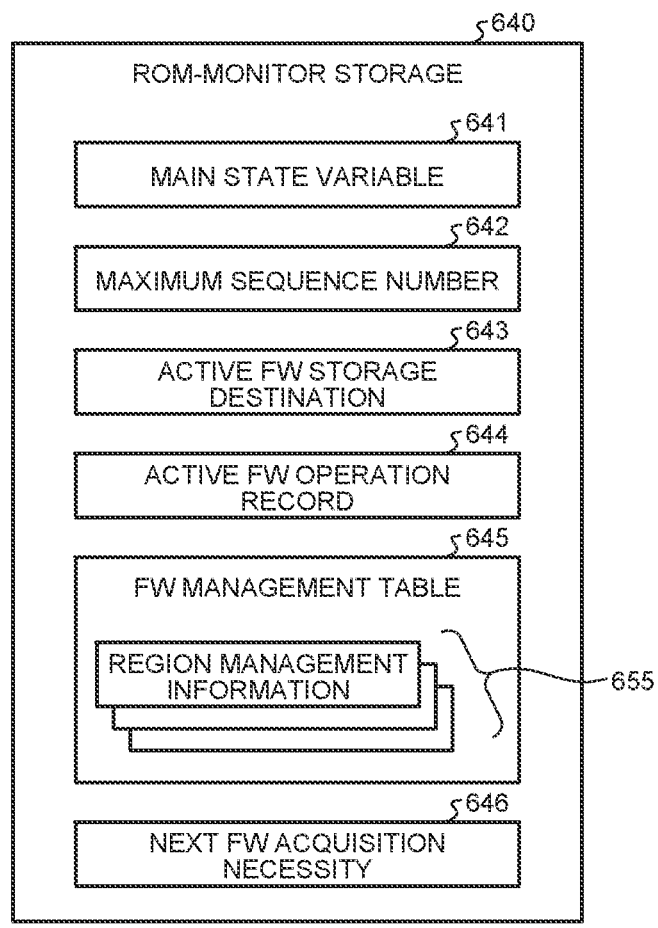
FIG. 6 is a schematic diagram illustrating an exemplary data group stored in a ROM-monitor storage according to the first embodiment.

FIG. 6 is a schematic diagram illustrating an exemplary data group stored in the ROM-monitor storage 640 according to the first embodiment.

The ROM-monitor storage 640 has recorded therein a main state variable 641, a maximum sequence number 642, an active FW storage destination 643, an active FW operation record 644, an FW management table 645, and a next FW acquisition necessity 646.

The main state variable 641 indicates one of two or more operation modes. In the first embodiment, the two or more operation modes include an update mode in which the firmware can be acquired, and a trial mode in which acquisition of the firmware is prohibited to enable determination on whether or not the firmware being currently executed is normally operating.

The maximum sequence number 642 represents a maximum value among the sequence numbers 710 added to all the previous update notifications 701.

The active FW storage destination 643 represents a variable for specifying the firmware previously operated by the ROM monitor 520. Among the N storage regions 631 of the FW storage 630, identification information of one storage region 631 having previously stored the firmware is set in the active FW storage destination 643. Herein, the N storage regions 631 are individually specified by unique region numbers, and the region numbers indicating the respective storage regions 631 are set in the active FW storage destination 643. After setting the region numbers in the active FW storage destination 643, the ROM monitor 520 starts up the firmware stored in the storage region 631 indicated by the region number set as the active FW storage destination 643. The execution of the firmware ends by restart processing, and then the ROM monitor 520 starts up. The ROM monitor 520 can recognize the firmware executed before the restart by referring to the active FW storage destination 643.

The active FW operation record 644 represents a variable indicating whether or not the firmware has previously operated normally. In booting the same firmware as the previously operated firmware, the ROM monitor 520 sets the active FW operation record 644 to 1 after recognizing that the previous firmware has normally operated. After recognizing an operation failure in the previous firmware or in booting a different firmware from the previous firmware, the ROM monitor 520 sets the active FW operation record 644 to zero.

The FW management table 645 represents information for managing the firmware stored in the FW storage 630. A specific data configuration of the FW management table 645 will be described later.

The next FW acquisition necessity 646 represents a variable indicating necessity or non-necessity of acquisition of new firmware at the time of executing the firmware next. In response to an event that the firmware operated before itself receives the update notification 701, the ROM monitor 520 sets the next FW acquisition necessity 646 to 1 since the ROM monitor 520 is to acquire new firmware corresponding to the update notification 701.

Figure 7:
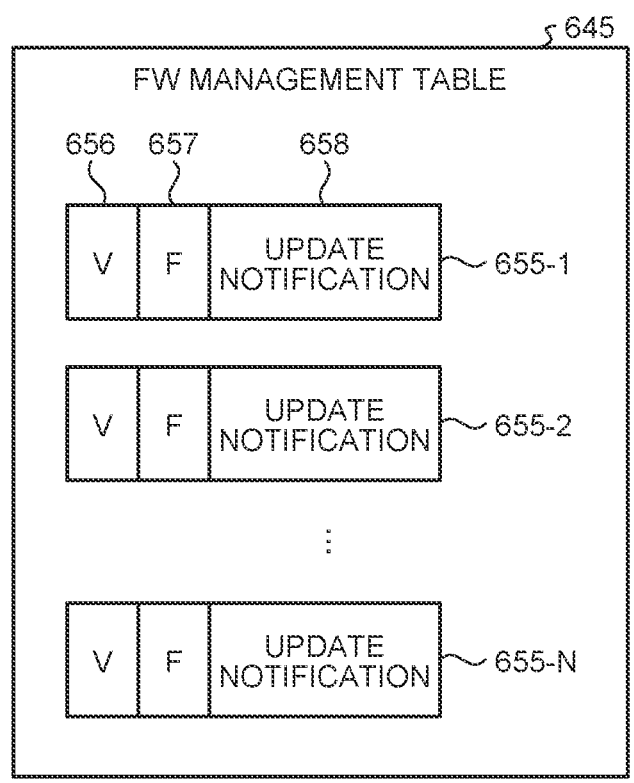
FIG. 7 is a schematic diagram illustrating an exemplary configuration of an FW management table according to the first embodiment.

FIG. 7 is a schematic diagram illustrating an exemplary configuration of the FW management table 645 according to the first embodiment. The FW management table 645 has recorded therein the same number of pieces of region management information 655 as the number of storage regions 631 of the FW storage 630. Herein, the FW management table 645 has recorded therein N pieces of region management information 655-1 to 655-N. The pieces of region management information 655 correspond to the storage regions 631 of the FW storage 630 one to one. The pieces of region management information 655 each include a flag field 656 (V) to which a valid flag can be set, a priority field 657 (F) to which priority can be set, and an update notification field 658 in which the update notification 701 for the firmware stored in the corresponding storage region 631 can be recorded.

Figure 8:
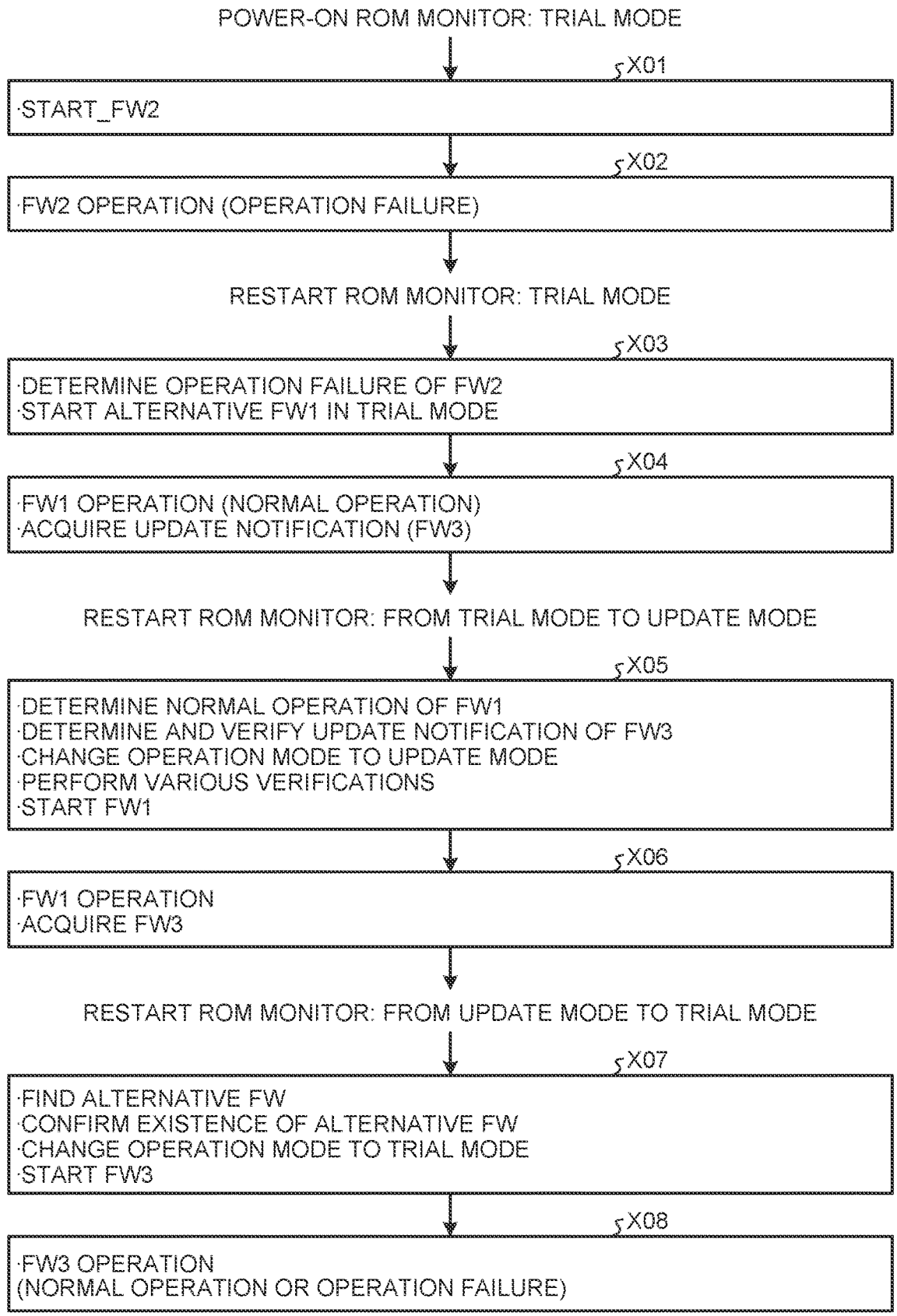
FIG. 8 is a sequence diagram illustrating an exemplary operation of the terminal device according to the first embodiment.

Next, an exemplary operation of the terminal device 100 according to the first embodiment will be described with reference to FIG. 8. FIG. 8 is a sequence diagram illustrating an exemplary operation of the terminal device 100 according to the first embodiment.

Upon power-on of the terminal device 100, the ROM monitor 520 starts operation. The ROM monitor 520 acquires the operation mode by referring to the main state variable 641. Data from the previously executed firmware may remain in the shared storage 620. Examples of the data that can remain in the shared storage 620 include operation result information and the update notification 701. The ROM monitor 520 can determine a next operation mode from the data remaining in the shared storage 620.

In FIG. 8 operations with odd step numbers represent operations of the ROM monitor 520 after power-on or restarting. Operations with even step numbers represent operations of the RTOS 510, that is, firmware.

The RTOS 510 being the firmware in operation can spontaneously restart the CPU 200 by operating given hardware. The control is transferred to the ROM monitor 520 by the restart of the CPU 200, and the ROM monitor 520 restarts. The ROM monitor 520 also restarts at the time of recovery from power supply interruption.

For example, in Step X01 after power-on, the ROM monitor 520 refers to the main state variable 641 and recognizes that the firmware is due to operate in the trial mode. The ROM monitor 520 starts up firmware FW2 in the trial mode.

In Step X02, the firmware FW2 finds its own operation failure by self-diagnosis, and stores the occurrence of the operation failure in the shared storage 620 as the operation result information. The firmware FW2 then restarts the CPU 200.

In Step X03, the ROM monitor 520 recognizes the operation failure in the firmware FW2 from the operation result information written in the shared storage 620, and selects firmware FW1 as determined as normally operating as alternative firmware. That is, the ROM monitor 520 records the region number of the storage region 631 storing the firmware FW1 as the active FW storage destination 643. Then, the ROM monitor 520 starts up the firmware FW1 with the trial mode maintained.

In Step X04, the firmware FW1 finds that it is normally operating by self-diagnosis, and writes the fact that the firmware FW1 is normally operating to the shared storage 620 as the operation result information. The firmware FW1 receives the update notification 701 for new firmware FW3 from the management server 2. The firmware FW1 writes the update notification 701 to the shared storage 620 and restarts the CPU 200.

In Step X05, the ROM monitor 520 recognizes that the firmware FW2 has normally operated from the operation result information written in the shared storage 620. The ROM monitor 520 then sets the active FW operation record 644 to 1 indicating the normal operation. After finding the update notification 701 in the shared storage 620, the ROM monitor 520 verifies the update notification 701 by the signature 730. That is, the ROM monitor 520 determines the authenticity of the update notification 701 by the signature 730. The ROM monitor 520 also verifies the update notification 701 by the sequence number 710. That is, the ROM monitor 520 determines whether or not the sequence number 710 is larger than the maximum sequence number 642. After determining the results of both verifications as a pass, that is, determining that the update notification 701 is authentic and the update notification 701 is the latest update notification issued from the management server 2, the ROM monitor 520 sets the next FW acquisition necessity 646 to 1 and sets the main state variable 641 to the update mode. As a result, the operation mode changes from the trial mode to the update mode. The ROM monitor 520 sets one storage region 631 to be writable to be able to store the new firmware FW3 in the FW storage 630. The ROM monitor 520 writes an FW acquisition request to the shared storage 620. Then, the ROM monitor 520 starts up the firmware FW1 determined as normally operating. The ROM monitor 520 can recognize the normal operation of the firmware FW1 by referring to the active FW operation record 644.

In Step X06, the firmware FW1 starts up in the update mode and acquires new firmware FW3 from the management server 2 in response to the FW acquisition request in the shared storage 620. The firmware FW1 stores the firmware FW3 in the writable storage region 631 in the FW storage 630. The firmware FW1 restarts the CPU 200.

In Step X07, the ROM monitor 520 verifies the update notification 701 stored in the shared storage 620 using the signature 730 and the sequence number 710, as in Step X05. After determining the results of both verifications as a pass, the ROM monitor 520 further verifies the firmware FW3 stored in the storage region 631 by the hash value 720 included in the update notification 701. That is, the ROM monitor 520 verifies the integrity of the firmware FW3. After determining the result of the integrity verification as a pass, the ROM monitor 520 records the update notification 701 in the shared storage 620 in the update notification field 658 of the corresponding region management information 655 in the FW management table 645, and sets a valid bit to the flag field 656 of the region management information 655. The valid bit indicates that the authenticity of the firmware stored in the storage region 631 corresponding to the region management information 655 is ensured. The ROM monitor 520 determines that the FW management table 645 contains the region management information 655 related to the new firmware FW3 and the region management information 655 related to the firmware FW1 determined as being normally operating. The ROM monitor 520 then sets the main state variable 641 to the trial mode. Thereby, the operation mode changes from the update mode to the trial mode. In addition, the ROM monitor 520 sets all the storage regions 631 included in the FW storage 630 to be unwritable. The ROM monitor 520 starts up the firmware FW3.

In Step X08, the firmware FW3 starts up in the trial mode and can perform self-diagnosis as to whether or not the firmware FW3 is normally operating.

After determining an operation failure of the firmware in the trial mode, the ROM monitor 520 restarts and starts up alternative firmware. The ROM monitor 520 selects alternative firmware from pieces of firmware verified as normally operating. This can improve the possibility of operation recovery, and ensure reliable rollback. That is, the availability can be improved.

Typically, the information processing device capable of performing rollback may possibly start up very old firmware with great vulnerabilities as a result of rollback. In the present embodiment, the alternative firmware as rollback firmware is limited to firmware stored in the FW storage 630. Newly acquired firmware is ensured to be the latest firmware through verification by the sequence number. The firmware executed in the trial mode is limited to the firmware stored in the FW storage 630 or the latest firmware, and other firmware is excluded. Even if old falsified firmware is distributed, the old firmware can be prevented from being executed through a combination of verification by the signature 730 in the update notification 701, verification by the hash value 720 of the FW, and verification by the sequence number 710. The pieces of firmware stored in the FW storage 630 are discarded in order from the one with an operation failure as determined and the oldest one, and are replaced with new firmware, which can reduce the possibility of selecting very old firmware with great vulnerabilities as alternative firmware.

For example, as for the firmware FW2 with the authenticity ensured, whether the firmware FW2 can normally operate may not be determined. Thus, the firmware FW3 may not normally operate after startup in X07. After determining that the firmware fails to normally operate, the ROM monitor 520 starts alternative firmware (for example, the firmware FW1 in FIG. 8) determined to normally operate. Thereby, the terminal device 100 can continue normal operation and receive a next update notification 701 irrespective of an operation failure in the new firmware FW3.

Further, the newly distributed firmware FW3 may have serious vulnerabilities. Examples of the serious vulnerabilities include execution of an optional program, that is, receipt and execution of a malicious program via a network. If the firmware FW3 has vulnerabilities that executes an optional program, an attacker may take advantage of the vulnerabilities and rewrite (including erase) the contents of the nonvolatile memory 203. There is a possibility that the alternative firmware may be erased from the storage region 631 when set to writable. It is conceivable to set all the storage regions 631 to be unwritable as a countermeasure for preventing the erasure of the alternative firmware. However, setting all the storage regions 631 to be unwritable makes it impossible to store new firmware therein.

In the first embodiment, the ROM monitor 520 sets all the storage regions 631 to be unwritable in principle. In the trial mode, the ROM monitor 520 cannot perform write operation to any storage region 631 in spite of startup of any firmware. The ROM monitor 520 sets one storage region 631 to be writable only after determining that the received update notification 701 is an authorized notification, that is, authentic and the latest notification, and starts up the firmware in the update mode. The firmware starts up in the update mode and can acquire and store new firmware in the storage region 631 set as writable.

In this manner, in the first embodiment, the ROM monitor 520 can store new firmware, and prevent destruction of alternative firmware due to execution of an optional program.

The following will describe the terminal device 100 according to the first embodiment in detail.

Figure 9:
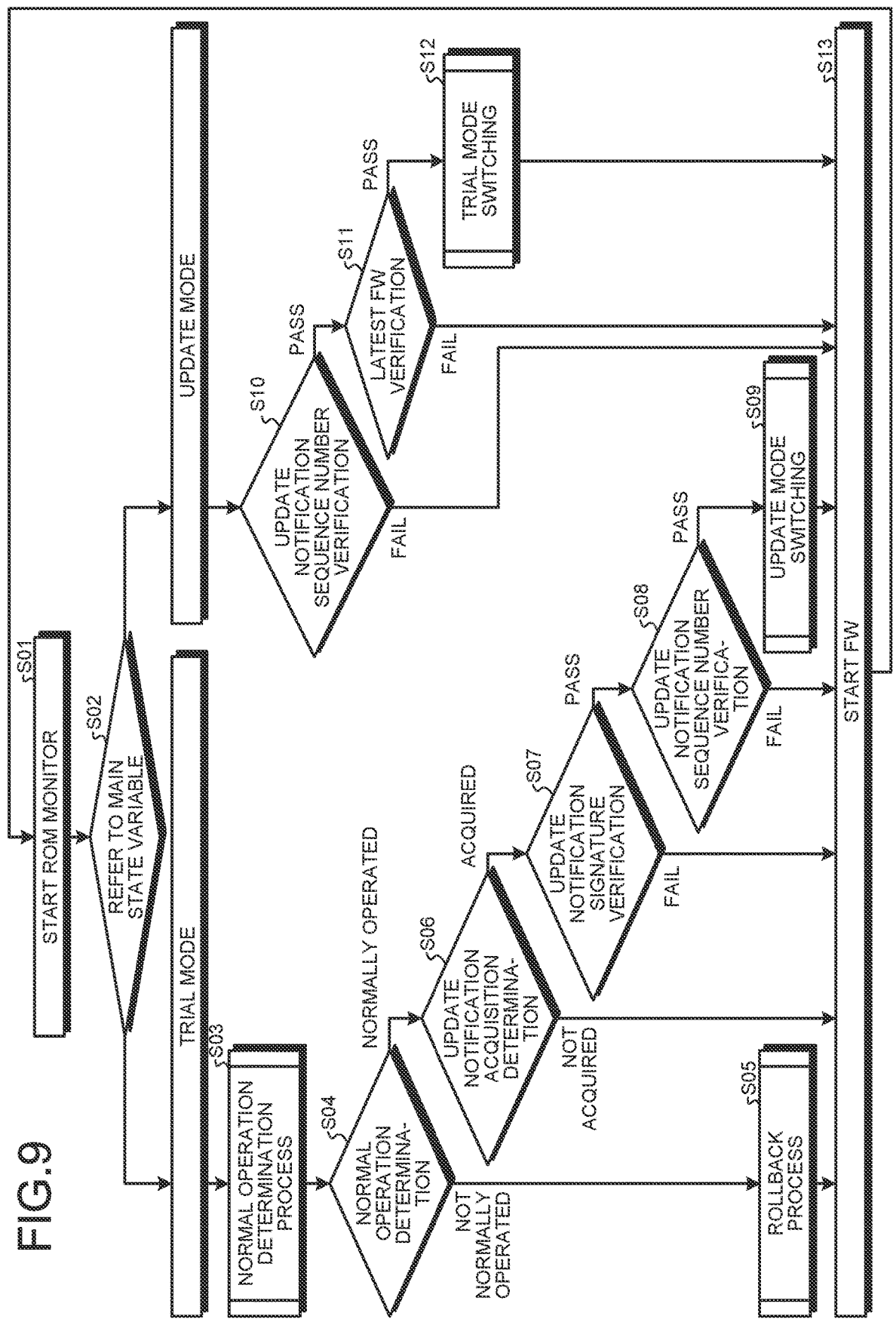
FIG. 9 is a flowchart illustrating an operation of a ROM monitor in detail according to the first embodiment.

FIG. 9 is a flowchart illustrating an operation of the ROM monitor 520 in detail according to the first embodiment.

After startup in S01, the ROM monitor 520 refers to the main state variable 641 (S02). At the main state variable 641 indicating the trial mode, the ROM monitor 520 executes a normal-operation determination (S03). In S03, the ROM monitor 520 refers to the operation result information in the shared storage 620.

In S04, the ROM monitor 520 determines whether or not firmware having operated most previously (that is, firmware having operated most previously, specified by the active FW storage destination 643) has normally operated. Hereinafter, the firmware specified by the active FW storage destination 643 is referred to as active firmware. Active firmware that has operated most previously at the time of startup of the ROM monitor 520 is referred to as previous firmware.

After determining that the previous firmware has not normally operated, the ROM monitor 520 executes a rollback process in S05. In the rollback process, the ROM monitor 520 switches the active firmware in the FW storage 630 from the previous firmware to the alternative firmware. More specifically, the ROM monitor 520 overwrites the region number recorded as the active FW storage destination 643 with the region number indicating the storage region 631 storing the alternative firmware.

After S05, the ROM monitor 520 starts up the firmware (S13). In S13, the firmware stored in the storage region 631 indicated by the active FW storage destination 643 starts up.

After determining in S04 that the previous firmware has normally operated, the ROM monitor 520 determines whether to have acquired the update notification in S06. When the previous firmware has acquired the update notification 701, the update notification 701 is stored in the shared storage 620. With no update notification 701 found in the shared storage 620, the ROM monitor 520 determines that the update notification has not been acquired and executes the processing of S13. With the update notification 701 found in the shared storage 620, the ROM monitor 520 determines that the update notification has been acquired and executes the processing of S07.

In S07, the ROM monitor 520 verifies the signature in update notification. In the update notification signature verification, the ROM monitor 520 verifies the authenticity of the update notification 701 using the signature 730 included in the update notification 701 and the public key stored in the ROM-monitor storage 640. Thereby, the ROM monitor 520 prevents use of possibly altered update notifications in the subsequent processing. After determining the result of the authenticity verification as a fail, the ROM monitor 520 executes the processing of S13. After determining the result of the authenticity verification as a pass, the ROM monitor 520 executes the processing of S08.

In S08, the ROM monitor 520 verifies the sequence number in the update notification. In the update notification sequence number verification, the ROM monitor 520 determines whether or not the sequence number 710 included in the update notification 701 is larger than the maximum sequence number 642. This makes it possible to determine whether or not the update notification 701 is the latest update notification. It is also made possible to prevent reuse of the previously distributed update notification. After determining the sequence number 710 included in the update notification 701 as not exceeding the maximum sequence number 642, that is, determining the result of the verification using the sequence number 710 as a fail, the ROM monitor 520 executes the processing of S13. After determining the sequence number 710 included in the update notification 701 as exceeding the maximum sequence number 642, that is, determining the result of the verification using the sequence number 710 as a pass, the ROM monitor 520 executes the processing of S09.

In S09, the ROM monitor 520 executes update mode switching. The ROM monitor 520 switches the main state variable 641 from the trial mode to the update mode. The ROM monitor 520 then executes the processing of S13.

In S13, the firmware starts up. The firmware spontaneously restarts the CPU 200, and the ROM monitor 520 starts up (S01) and refers to the main state variable 641 again (S02).

At the main state variable 641 indicating the update mode, that is, restart of the ROM monitor 520 after the main state variable 641 is set to the update mode in S09, the ROM monitor 520 verifies the sequence number in the update notification (S10). The processing of S10 is similar to the processing of S08. Even when the active firmware starts up before the start of the update mode and the attacker compromises the active firmware and replaces the update notification 701 in the shared storage 620 with another update notification, the replacement is detectable through the verification in S10. After determining the result of the verification using the sequence number 710 as a fail, the ROM monitor 520 executes the processing of S13. After determining the result of the verification using the sequence number 710 as a pass, the ROM monitor 520 executes the processing of S11.

In S11, the ROM monitor 520 verifies the integrity of the latest FW. The update notification 701 includes the hash value 720 of the update firmware. In addition, the previous active firmware has started up in the update mode and completed acquisition of the update firmware. The ROM monitor 520 verifies, using the hash value 720, the integrity of the update firmware acquired by the previous active firmware. From the result of the verification as a pass, it can be understood that the update firmware is authorized firmware. This can prevent execution of unauthorized firmware if written to the FW storage 630. After determining the result of the verification using the hash value 720 as a fail, the ROM monitor 520 executes the processing of S13. After determining the result of the verification using the hash value 720 as a pass, the ROM monitor 520 executes the processing of S12.

In S12, the ROM monitor 520 executes trial mode switching. The ROM monitor 520 switches the main state variable 641 from the update mode to the trial mode. Then, the ROM monitor 520 executes the processing of S13.

Figure 10:
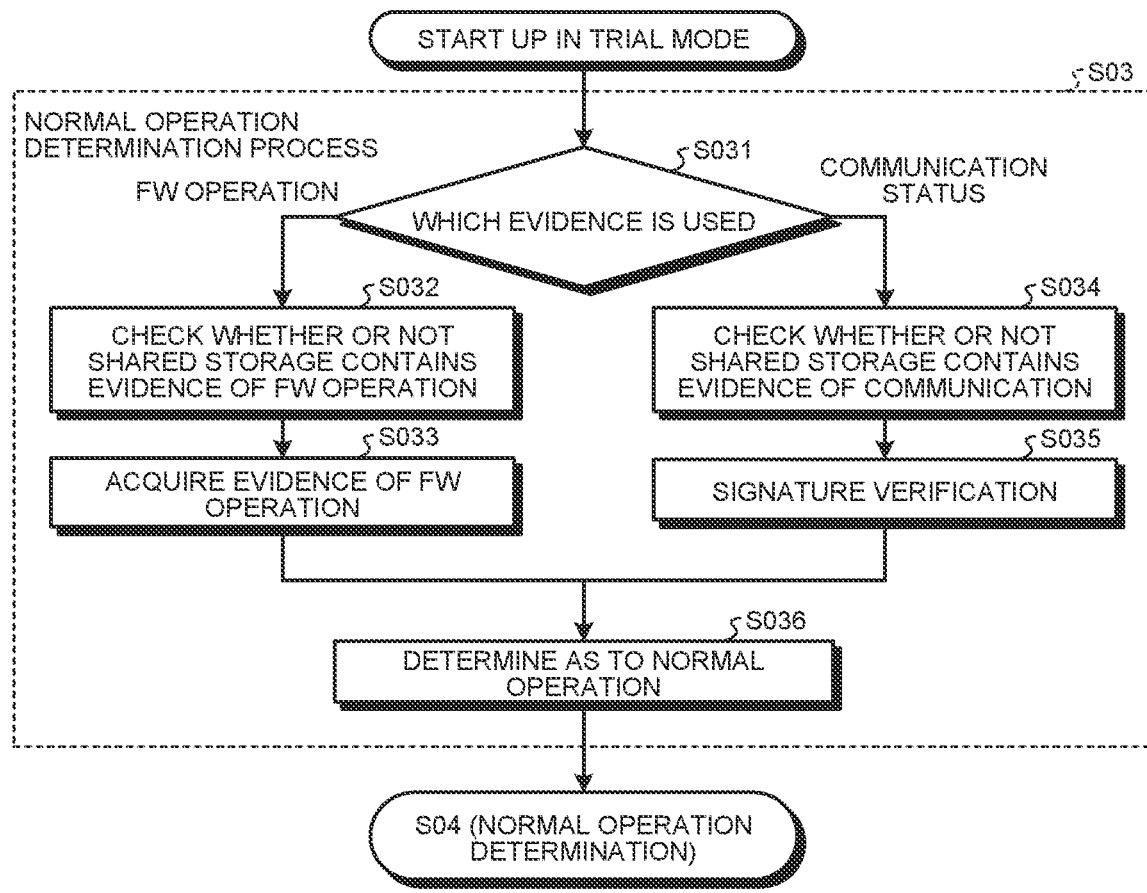
FIG. 10 is a flowchart illustrating normal-operation determination in detail according to the first embodiment.

FIG. 10 is a flowchart illustrating the normal-operation determination in detail (S03 of FIG. 9) according to the first embodiment.

In the first embodiment, the ROM monitor 520 is configured to be able to select an evidence for use in the determination. The operation of the previous firmware and communications between the previous firmware and an external device (for example, the management server 2) are prepared as selectable evidences.

In the normal-operation determination, first, the ROM monitor 520 determines which of the evidences is used in the normal-operation determination (S031).

After selecting the firmware operation in S031, the ROM monitor 520 checks whether or not the shared storage 620 contains an evidence for the firmware operation in (S032). For example, in the case of non-operation of the previous firmware due to a failure or interruption of the operation, the ROM monitor 520 stores the operation result information indicative of non-operation or interruption of the operation in the shared storage 620 as an evidence. In S032, the ROM monitor 520 checks whether the shared storage 620 contains these pieces of operation result information.

Subsequently, in S033, the ROM monitor 520 collects an evidence (operation result information) for the operation of the previous firmware.

In the case of selecting communications in S031, the ROM monitor 520 checks whether or not the shared storage 620 contains an evidence for communications (S034). For example, the previous firmware succeeds in establishing communications with a given party, receives a message from the party, and writes the message to the shared storage 620 as an evidence.

After S034, the ROM monitor 520 performs signature verification of the evidence (S035). The ROM monitor 520 acquires a communication status of the previous firmware from a result of the signature verification. The result of the signature verification as a pass signifies successful communications. The result of the signature verification as a fail signifies a failure of communications. A replay attack to the message can be dealt with by the techniques disclosed in JP 5543949 B2.

Based on the information obtained in S033 or S035, the ROM monitor 520 determines whether or not the previous active firmware has normally operated (S036). In the case of selecting the firmware operation in S031, the ROM monitor 520 uses the evidence acquired in S033 in S036. If there is an evidence that the previous firmware has failed in operating or stopped operating due to a failure, the ROM monitor 520 determines that the previous firmware has not normally operated. With no evidence that the previous firmware has failed in operating or stopped operating due to a failure, the ROM monitor 520 determines that the previous firmware has normally operated. In the case of selecting the communication in S031, in S036 the ROM monitor 520 uses the result of the signature verification in S035. From the result of the signature verification as a fail, the ROM monitor 520 determines that the previous firmware has not normally operated. From the result of the signature verification as a pass, the ROM monitor 520 determines that the previous firmware has normally operated. After completion of S036, the normal-operation determination in S03 ends, and the ROM monitor 520 proceeds to the normal-operation determination in S04.

The selectable evidences are not limited to the two examples as above. Both of the two evidences may be used in the normal-operation determination. In addition, the evidence acquiring method is not limited to the above example.

Figure 11:
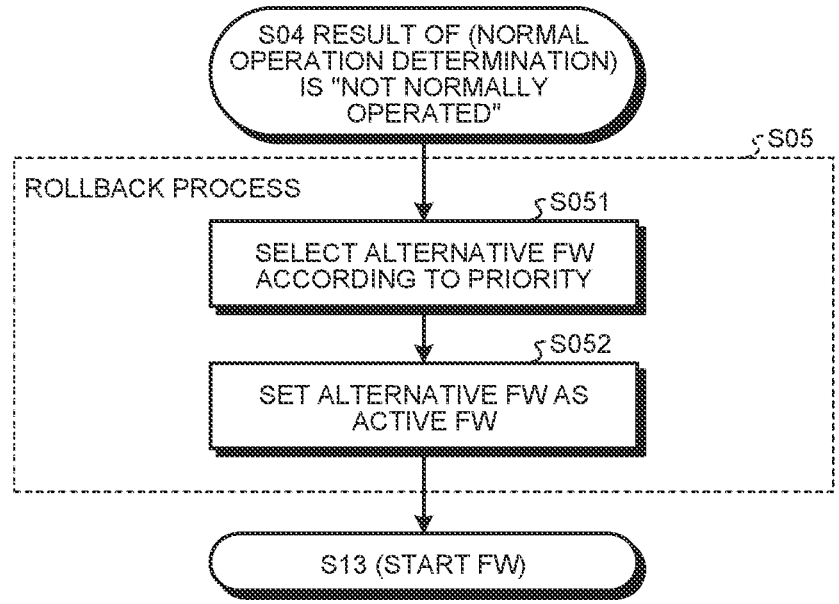
FIG. 11 is a flowchart illustrating a rollback process in detail according to the first embodiment.

FIG. 11 is a flowchart illustrating the rollback process (S05 in FIG. 9) in detail according to the first embodiment.

In the rollback process, the ROM monitor 520 first searches the pieces of region management information 655 recorded in the FW management table 645 in descending order of priority assigned to the priority field 657 in the region management information 655. The ROM monitor 520 specifies the region management information 655 with second highest priority following the region management information 655 on the active firmware, and selects firmware corresponding to the specified region management information 655 as the alternative firmware (S051).

Subsequent to S051, the ROM monitor 520 sets the selected alternative firmware as the active firmware (S052). That is, the ROM monitor 520 sets the region number indicating the storage region 631 storing the alternative firmware as the active FW storage destination 643. As a result, the ROM monitor 520 completes the rollback process, proceeding to S13.

Figure 12:
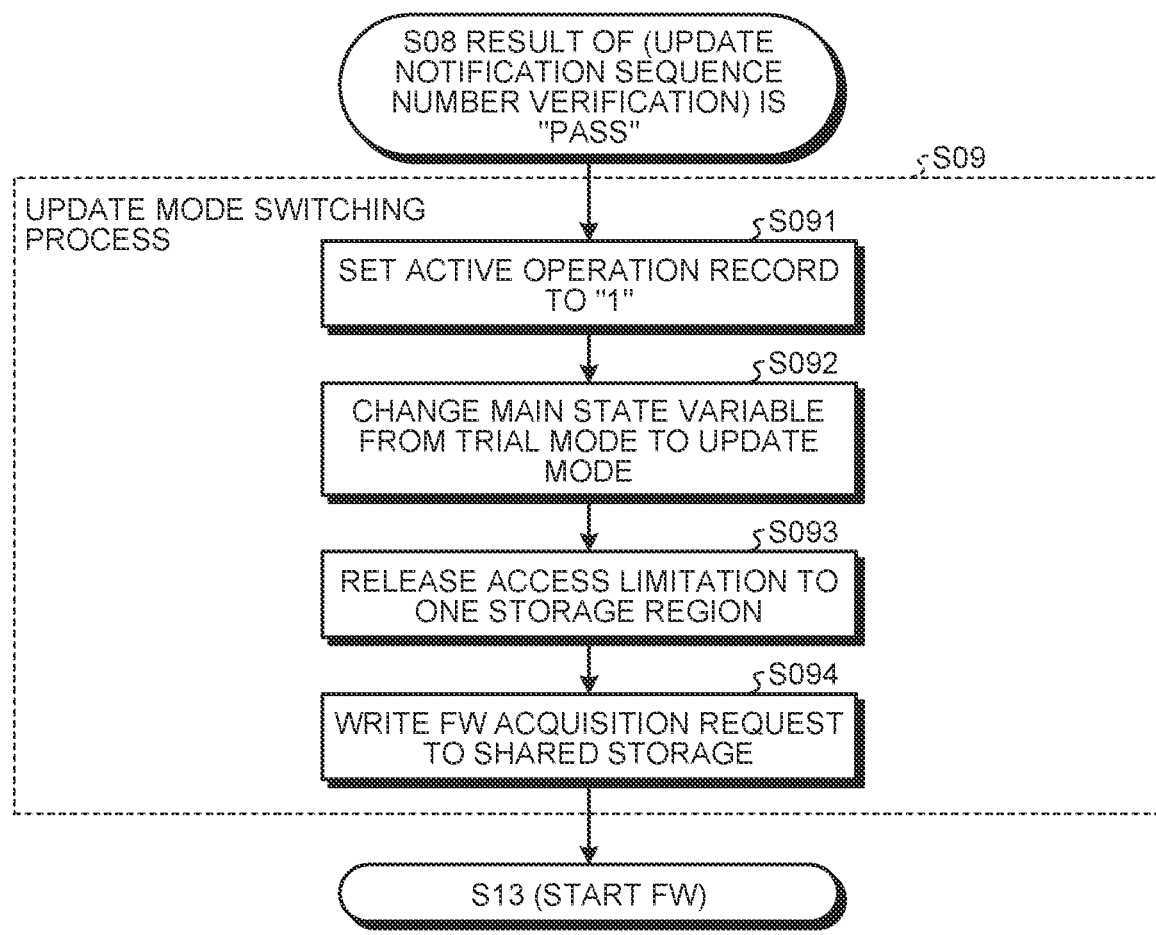
FIG. 12 is a flowchart illustrating update mode switching in detail according to the first embodiment.

FIG. 12 is a flowchart illustrating the update mode switching (S09 of FIG. 9) in detail according to the first embodiment.

In the update mode switching, as having determined that the previous firmware has normally operated, the ROM monitor 520 sets the active FW operation record 644 to 1 (S091). Thereby, the fact that the previous firmware has normally operated is stored.

In S092, the ROM monitor 520 changes the main state variable 641 from the trial mode to the update mode.

In S093, the ROM monitor 520 releases an access limitation to one storage region 631 among the N storage regions 631. That is, the ROM monitor 520 enables the firmware to perform write operation to the one storage region 631. The storage region 631 set writable can be selected in accordance with, for example, the priority assigned to each firmware. That is, the ROM monitor 520 can set the storage region 631 indicated by the region management information 655 with the lowest priority to be writable, referring to the priority field 657 of the region management information 655 recorded in the FW management table 645. The method of selecting the storage region 631 to be set writable is not limited thereto.

In S94, the ROM monitor 520 writes a FW acquisition request to the shared storage 620. This allows the firmware to acquire new firmware following the FW acquisition request in response to a startup of next firmware (that is, the firmware specified by the active FW storage destination 643). The ROM monitor 520 completes the update mode switching and proceeds to S13.

Figure 13:
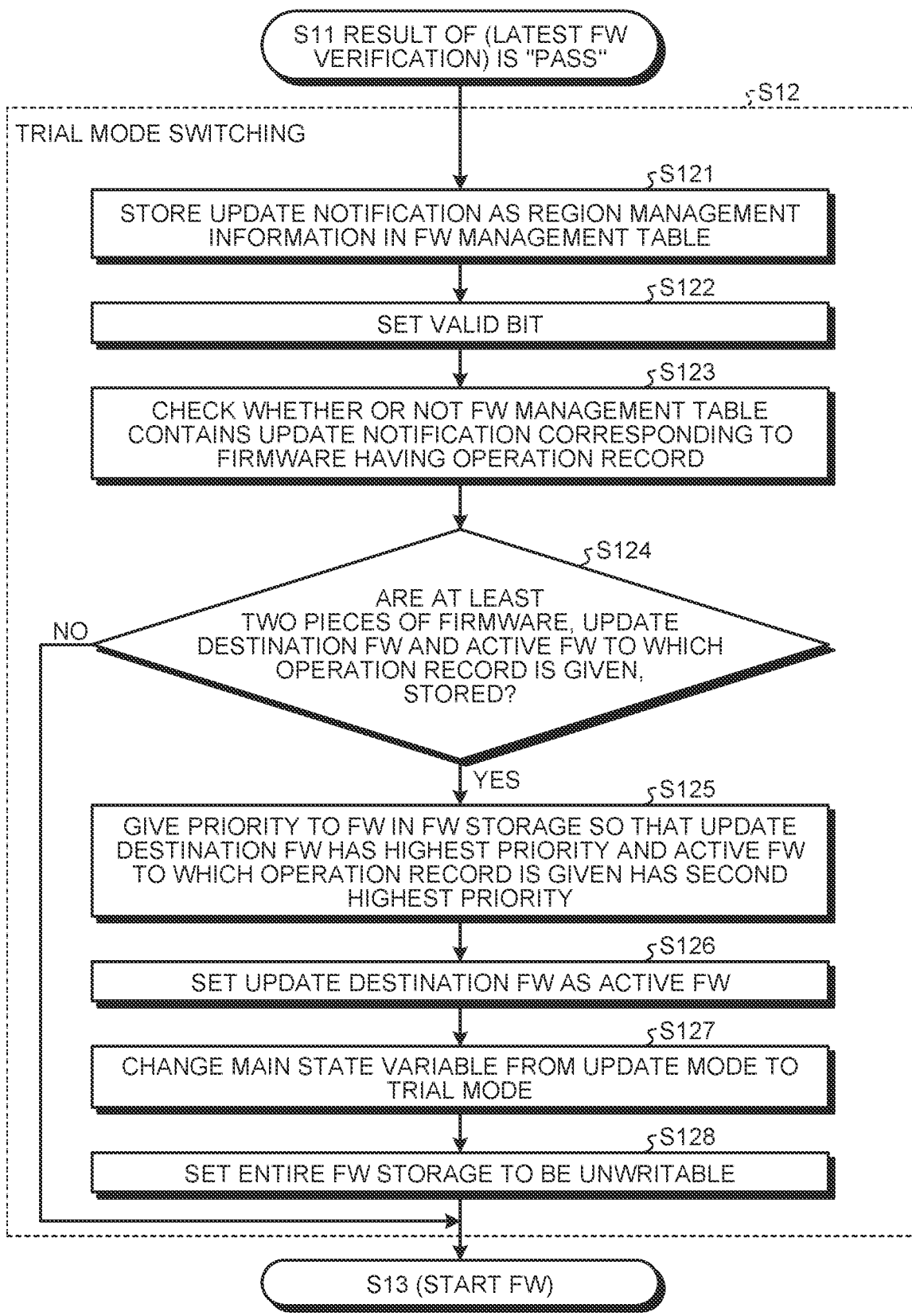
FIG. 13 is a flowchart illustrating trial mode switching in detail according to the first embodiment.

FIG. 13 is a flowchart illustrating the trial mode switching (S12 of FIG. 9) in detail according to the first embodiment.

In the trial mode switching, the ROM monitor 520 transfers the update notification 701 from the shared storage 620 to the FW management table 645 in the ROM-monitor storage 640 for storage as one piece of region management information 655 (S121).

Subsequently, in S122, the ROM monitor 520 sets a valid bit to the flag field 656 of the region management information 655 stored in S121. As a result, the region management information 655 indicates that the new firmware acquired by the previous firmware in the update mode is authentic.

In S123, the ROM monitor 520 refers to the FW management table 645 to check whether or not it contains an update notification corresponding to the firmware given the operation record in S91.

In S124, the ROM monitor 520 determines whether or not the FW storage 630 stores at least two pieces of firmware, i.e., the update firmware and the active firmware given the operation record, that is, the active firmware determined as normally operating in S91. With one or both of the update firmware and the active firmware given the operation record not found (S124: No), the ROM monitor 520 completes the trial mode switching.

With both of the update firmware and the active firmware given the operation record found (S124: Yes), the ROM monitor 520 gives priority to the firmware in the FW storage 630 so that the update firmware has the highest priority and the active firmware given the operation record has the second highest priority following the update firmware (S125). This allows the active firmware given the operation record to be selected as the alternative firmware. The ROM monitor 520 records the priority of each firmware in the priority field 657 of the corresponding region management information 655.

A method of giving priority to firmware other than the update firmware and the active firmware given the operation record is not limited to a particular method. For example, with respect to a plurality of pieces of firmware determined as normally operating in addition to the update firmware and the active firmware given the operation record, the ROM monitor 520 can set priority such that the larger the sequence number 710 included in the corresponding update notification 701, the higher the priority given to the pieces of firmware determined as normally operating. In addition, the ROM monitor 520 can give priority to each firmware such that the firmware determined as normally operating is given higher priority than the firmware not determined as normally operating.

In S126 subsequent to S125, the ROM monitor 520 sets the new firmware as the active firmware. That is, the ROM monitor 520 sets the region number storing the storage region 631 the new firmware as the active FW storage destination 643.

In S127, the ROM monitor 520 changes the main state variable 641 from the update mode to the trial mode.

In S128, the ROM monitor 520 sets the entire FW storage 630 to be unwritable. The ROM monitor 520 completes the trial mode switching and proceeds to S13.

As described above, the ROM monitor 520 of the first embodiment performs the following operation.

In the trial mode of the ROM monitor 520 being a first operation mode, the ROM monitor 520 determines validity of a function of a first FW previously executed from a content of a first storage holding a result of execution of the first FW. In failing to determine the validity of the function of the first FW, the ROM monitor 520 selects and executes alternative FW from one or more pieces of FW stored in a verified FW storage region according to given priority regardless of an identification number stored in a third storage. After determining the validity of the function of the first FW, the ROM monitor 520 verifies an FW update notification acquired and stored in a second storage by the first FW. When an identification number of the FW update notification is larger than the maximum identification number held in the third storage, the ROM monitor 520 changes an operation mode to a second mode to execute the first FW.

In the second operation mode, the ROM monitor transfers the FW update notification from the second storage to an entry of a signature table corresponding to the storage region of the third FW, after having successfully verified the FW update notification stored in the second storage and a third FW acquired and stored in the FW storage region by the previously executed first FW according to the FW update notification, and determined that the identification number of the update notification is larger than the identification number stored in the third storage. Only after succeeding in all the verifications in the second operation mode, the ROM monitor 520 changes the FW to be executed to the third FW and changes the operation mode to a first trial mode for execution of the FW. In failing in any of the verifications in the second operation mode, the ROM monitor 520 executes the first FW.

As a result, the information processing device can attain three effects of resisting failures and attacks, as follows. First, signature verification is always performed by the monitor program in order to allow the FW stored in the storage region to be executable. This enables detection of a fraud and prevents execution of counterfeit FW in either of the situations that a counterfeit FW is acquired and that the acquired FW contains security vulnerabilities and has been subjected to cyber attack and altered.

Second, if the update FW contains a defect overlooked before the distribution, the monitor program checks the validity of the update FW, and alternatively executes FW with an older identification number only after failing to determine the validity. Thereby, the information processing device can maintain the function irrespective of a defect in the update FW. The alternative FW is previously verified and stored FW, so that the information processing device can avoid the execution of the counterfeit FW.

Third, having executed the FW with an older identification number, the information processing device verifies a new update notification acquired by the FW concerned and the update FW upon satisfaction of the condition that the identification numbers of the update notification and the update FW are larger than the maximum identification number of the previously executed FW. Thereby, the information processing device can avoid execution of older-version FW possibly containing great security vulnerabilities.

The three effects have a trade-off relationship in terms of availability and integrity, therefore, a mechanism for implementing all of the effects is not obvious, however, the mechanism according to this disclosure can achieve all of the effects.

In addition, according to the first embodiment, the FW storage 630 includes the plurality of storage regions 631. In the trial mode, all of the storage regions 631 are set to be unwritable. In the update mode, only one storage region 631 is selected from the storage regions 631 and set to be writable. Fourth firmware starts up in the update mode and acquires and writes third firmware to the storage region 631 set writable.

Thus, the FW storage 630 is writable only in a limited situation that the firmware determined as normally operating starts up in the update mode. Thus, the information processing device can prevent unauthorized firmware from rewriting or erasing the contents of the FW storage 630.

Second Embodiment

In the first embodiment, the previous firmware having fatal vulnerabilities may be selected as a rollback destination as long as the previous firmware normally operates.

In a second embodiment, an update notification includes information on rollback firmware. This enables a management server to designate firmware having no vulnerabilities or less vulnerabilities as the rollback destination.

The same elements as those of the first embodiment will not be described or will be briefly described. Hereinafter, a terminal device according to the second embodiment will be denoted by a terminal device 100a.

Figure 14:
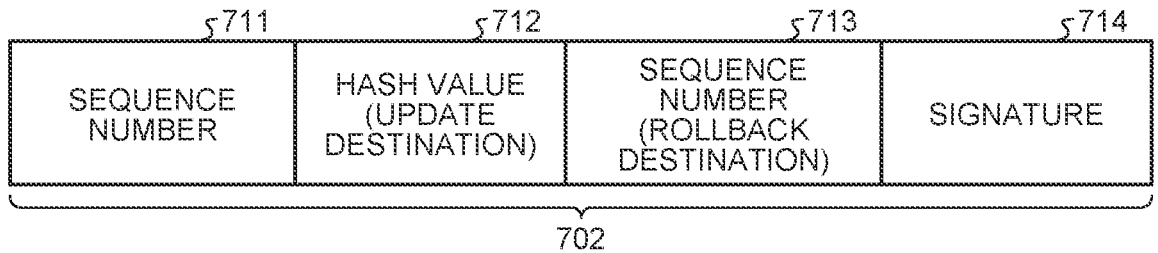
FIG. 14 is a schematic diagram illustrating an exemplary data configuration of an update notification according to a second embodiment.

FIG. 14 is a schematic diagram illustrating an exemplary data configuration of an update notification 702 in the second embodiment. The update notification 702 has a data configuration including a combination of a sequence number 711, a hash value 712 of update firmware, a sequence number 713 of the update notification 702 at the time of distribution of rollback firmware, and a signature 714. The signature 714 is generated by subjecting a message including the sequence number 711, the hash value 712, and the sequence number 713 to a given algorithm. The update notification 702 in the second embodiment is different from the update notification 701 in the first embodiment in including the sequence number 713.

Owing to the update notification 702 having the data configuration as above, a management server 2 can designate the rollback firmware. For example, the management server 2 periodically collects operation records of a large number of terminal devices 100a to specify secure firmware, that is, firmware that normally operates and has as few vulnerabilities as possible among previously distributed firmware. Before distributing new firmware, the management server 2 adds the sequence number 713, i.e. the sequence number 711 of the previous update notification corresponding to the secure firmware to the update notification 702 for the new firmware. Thereby, the management server 2 can designate the secure firmware determined as normally operating as the rollback destination.

The method of designating the rollback firmware is not limited to the method using the sequence number 713. For example, the update notification 702 may have a data configuration including a hash value of the rollback firmware instead of the sequence number 713.

Figure 15:
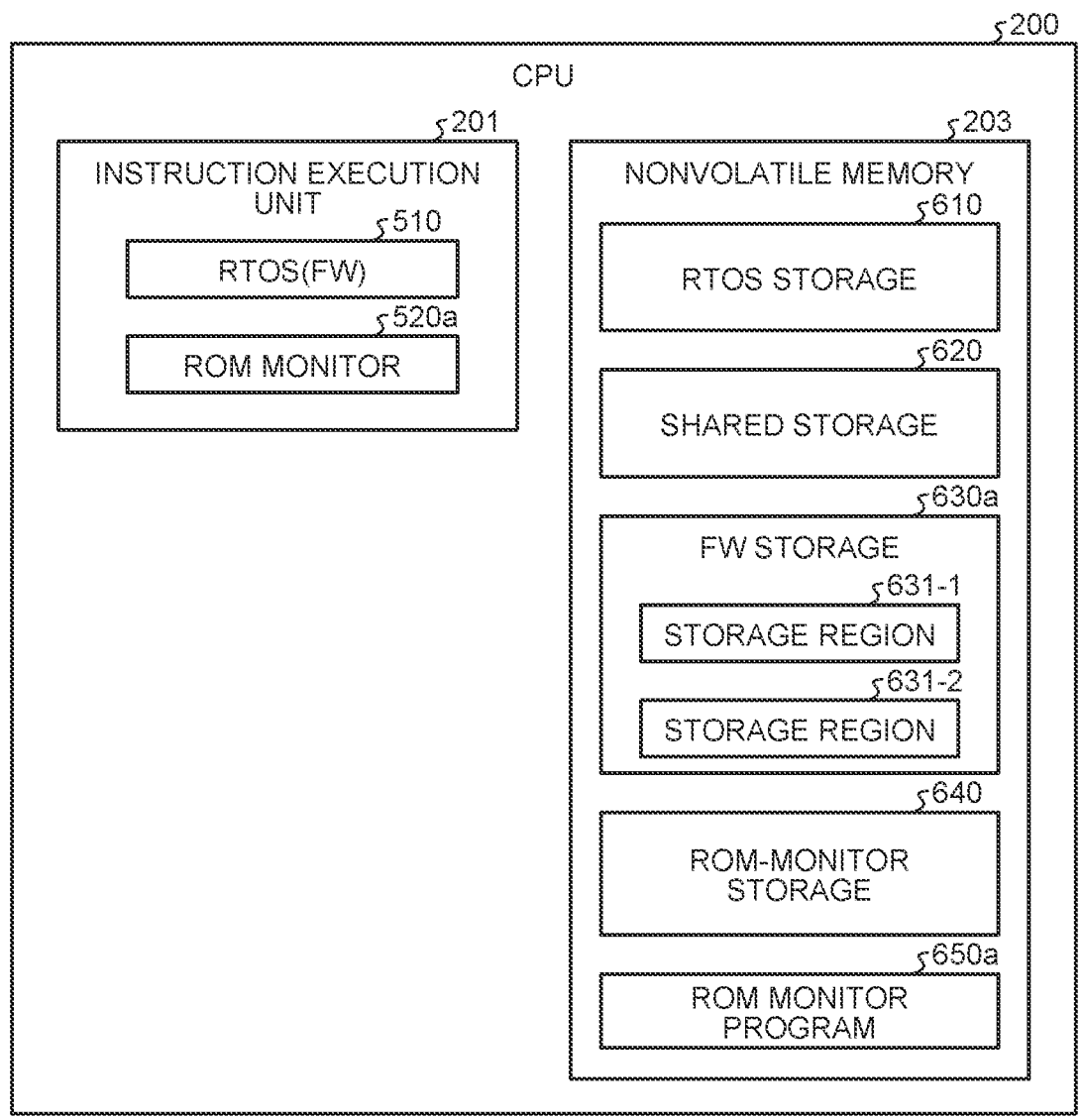
FIG. 15 is a schematic diagram illustrating a function implemented by a CPU and a schematic configuration of a nonvolatile memory in a terminal device according to the second embodiment.

FIG. 15 is a schematic diagram illustrating a function implemented by a CPU 200 and a schematic configuration of a nonvolatile memory 203 in the terminal device 100a according to the second embodiment.

An instruction execution unit 201 functions as a ROM monitor 520a by executing a ROM monitor program 650a. In addition, the instruction execution unit 201 functions as an RTOS 510 by executing firmware.

The nonvolatile memory 203 has an RTOS storage 610, a shared storage 620, an FW storage 630a, and a ROM-monitor storage 640 allocated thereto.

The FW storage 630a includes two storage regions 631, that is, a storage region 631-1 and a storage region 631-2. One piece of firmware can be stored in each of the two storage regions 631. The FW storage 630a of the second embodiment is different from that of the first embodiment in including only two storage regions 631.

Figure 16:
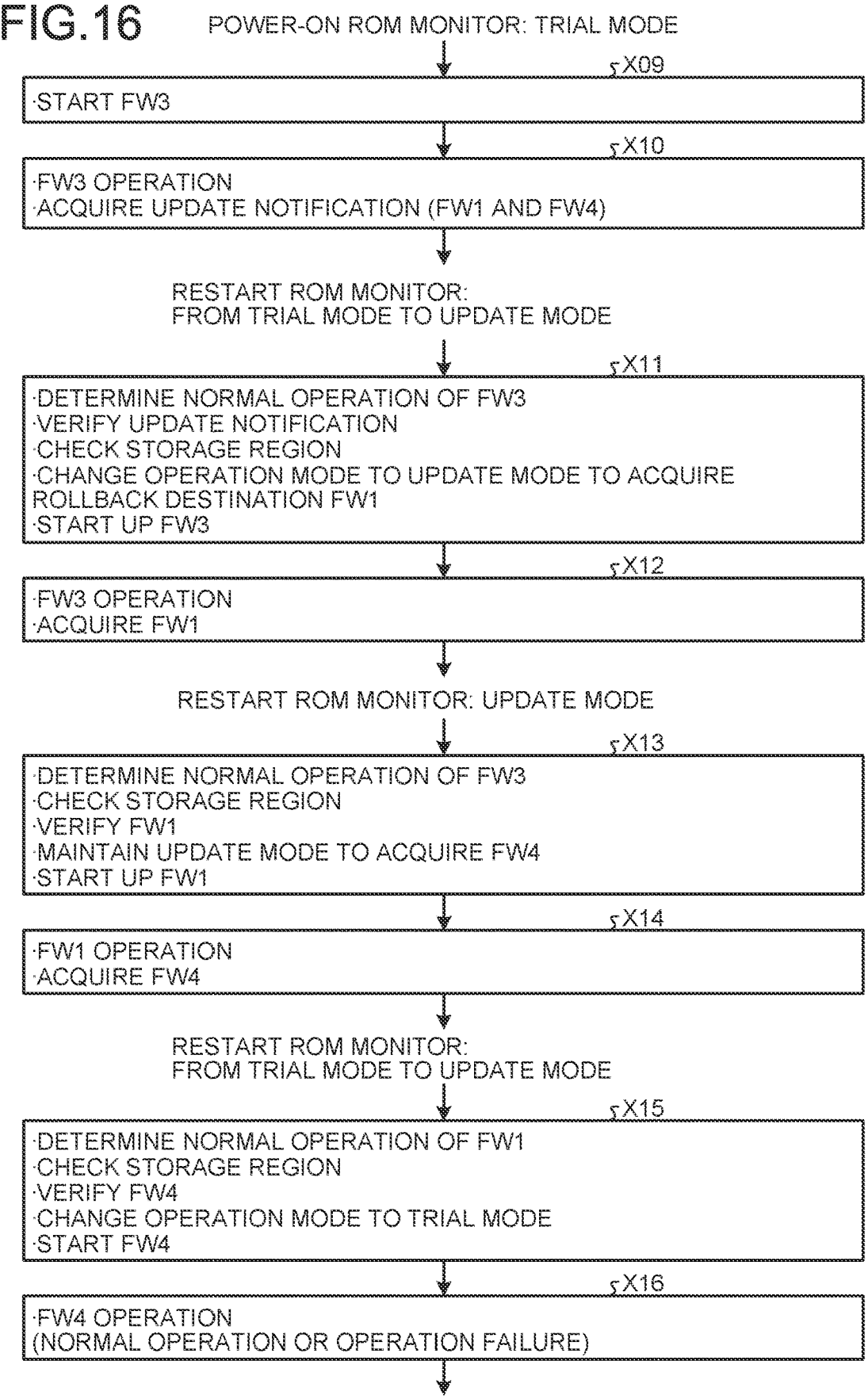
FIG. 16 is a sequence diagram illustrating an exemplary operation of the terminal device according to the second embodiment.

Next, an exemplary operation of the terminal device 100a in the second embodiment will be described with reference to FIG. 16. FIG. 16 is a sequence diagram illustrating an exemplary operation of the terminal device 100a in the second embodiment.

In Step X09 after power-on, the ROM monitor 520a refers to a main state variable 641 and recognizes that the firmware is due to operate in the trial mode. The ROM monitor 520a starts up firmware FW3 in the trial mode.

In Step X10, the firmware FW3 receives the update notification 702 for new firmware FW4. The update notification 702 received in Step X10 designates firmware FW1 as rollback firmware. The update notification 702 for update firmware FWi and designating firmware FWj as the rollback firmware is referred to as an update notification (FWj and FWi). In Step X10, the firmware FW3 receives an update notification (FW1 and FW4). The firmware FW3 stores the update notification (FW1 and FW4) in the shared storage 620. Then, the firmware FW3 restarts the CPU 200.

In Step X11, the ROM monitor 520a determines that the firmware FW3 has normally operated from operation result information written in the shared storage 620. The ROM monitor 520a verifies the update notification (FW1 and FW4) using the signature 714 and the sequence number. After determining results of both verifications as a pass, the ROM monitor 520a checks whether or not the FW storage 630 stores the update firmware FW4 and the rollback firmware FW1. The ROM monitor 520a then finds that the FW storage 630 stores not both the firmware FW1 and the firmware FW4 but only the firmware FW3 as the active firmware and firmware FW2 distributed immediately before the firmware FW3. Thus, the ROM monitor 520a is to acquire the firmware FW1 designated as the rollback destination. Having determined that the firmware FW3 normally operates, the ROM monitor 520a can use the firmware FW3 to acquire the firmware FW1. The ROM monitor 520a sets one of the two storage regions 631, the one storing no firmware FW3 (that is, the storage region 631 storing the firmware FW2) to be writable. Then, the ROM monitor 520a sets the next FW acquisition necessity 646 to 1. The ROM monitor 520a allows the next FW acquisition necessity 646 to include information representing which one of the update FW and the rollback FW designated in the update notification is to be acquired next. The ROM monitor 520a then sets the main state variable 641 to the update mode. As a result, the operation mode is changed from the trial mode to the update mode. The ROM monitor 520a writes an FW acquisition request to the shared storage 620. The FW acquisition request may include information representing firmware to be acquired (herein, the rollback firmware FW1). The ROM monitor 520a starts up the firmware FW3 determined as normally operating.

In Step X12, the firmware FW3 starts up in the update mode and acquires the firmware FW1 from the management server 2 in response to the FW acquisition request in the shared storage 620. When the terminal device 100a does not have the update notification 702 upon issuance of the firmware FW1, the firmware FW3 also acquires the update notification 702 upon issuance of the firmware FW1 (that is, the update notification 702 indicated by the sequence number 713). The firmware FW3 stores the acquired firmware FW1 in the storage region 631 set writable in the FW storage 630. Then, the firmware FW3 restarts the CPU 200.

In Step X13, the ROM monitor 520a determines that the firmware FW3 has normally operated. The ROM monitor 520a checks whether or not the FW storage 630 stores the firmware FW1 and the firmware FW4, as in Step X11. As a result, the ROM monitor 520a finds that the FW storage 630 stores the rollback firmware FW1 but not yet the update firmware FW4. The ROM monitor 520a performs verification of the firmware FW1 and succeeds in the verification. The ROM monitor 520a sets a region number indicating the storage region 631 storing the firmware FW1 to the active FW storage destination 643, and allows the next FW acquisition necessity 646 to include information representing the firmware FW4. The ROM monitor 520a writes the FW acquisition request to the shared storage 620. The FW acquisition request may include information representing firmware to be acquired (herein, the firmware FW4). The ROM monitor 520a changes the storage region 631 storing the firmware FW3 from unwritable to writable, sets the storage region 631 storing the firmware FW1 to be unwritable, and starts up the firmware FW1. To continue acquiring firmware, the ROM monitor 520a maintains in the update mode.

In Step X14, the firmware FW1 starts up in the update mode and acquires the new firmware FW4 from the management server 2 in response to the FW acquisition request in the shared storage 620. The firmware FW1 stores the acquired firmware FW4 in the storage region 631 set writable in the FW storage 630. Then, the firmware FW1 restarts the CPU 200.

In Step X15, the ROM monitor 520a determines that the firmware FW1 has normally operated. As in Step X11, the ROM monitor 520a checks whether or not the FW storage 630 stores the new firmware FW4 and the rollback firmware FW1. As a result, the ROM monitor 520a finds that the FW storage 63 stores both the rollback firmware FW1 and the new firmware FW4. The ROM monitor 520a performs verification of the firmware FW4 and succeeds in the verification. The ROM monitor 520a records, as region management information 655, the update notification 702 acquired in Step X10 in an FW management table 645, and sets a valid bit to a flag field 656 of the region management information 655. The ROM monitor 520a enables use of the firmware FW1 as alternative firmware in accordance with the update notification 702 acquired in Step X10. The ROM monitor 520a then sets the main state variable 641 to the trial mode. Thereby, the operation mode is changed from the update mode to the trial mode. In addition, the ROM monitor 520a sets all the storage regions 631 of the FW storage 630 to be unwritable. The ROM monitor 520a starts up the firmware FW4.

In Step X16, the firmware FW4 starts up in the trial mode and starts operating.

The above sequence may occur in an assumed situation as follows. It is found that the firmware FW3 and the firmware FW2 distributed before the firmware FW3 have functionally improved with respect to the firmware FW1 and normally operate but still have serious security vulnerabilities. That is, in continuous operation the firmware FW2 and the firmware FW3 may be possibly attacked. Thus, during the operation of the firmware FW3, the management server 2 designates the firmware FW1 as a rollback destination and updates to the firmware FW4 with vulnerabilities corrected. However, since the terminal device 100a has only two storage regions 631, the firmware FW1 is erased during the update from the firmware FW2 to the firmware FW3. Thus, for updating to the firmware FW4, the terminal device 100a acquires the firmware FW1 as the rollback destination in addition to the firmware FW4.

The assumption on the functions and vulnerabilities of the firmware FW1, the firmware FW2, and the firmware FW3 is different from that in the first embodiment. In the first embodiment, the firmware FW2 does not normally operate, and the firmware FW1 and the firmware FW3 are caused to be executed in the trial mode. Meanwhile, in the second embodiment, the firmware FW2 normally operates and is then updated to the firmware FW3, therefore, the firmware FW1 is erased at the time of updating the firmware FW3.

In the second embodiment as described above, the ROM monitor 520a determines the priority of the firmware based on information on new firmware and information on the rollback firmware contained in the update notification 702. Unlike the first embodiment, the ROM monitor 520a may not set the previously operated firmware as the rollback firmware. Thus, the ROM monitor 520 may need to acquire the rollback firmware in addition to new firmware. The update notification 702 includes, as information for designating the rollback firmware, the sequence number 713 indicating the update notification 702 for the rollback firmware. The ROM monitor 520 can verify the rollback firmware using the hash value 712 included in the update notification 702 indicated by the sequence number 713.

Next, the operation of the terminal device 100a according to the second embodiment will be described in detail.

Figure 17:
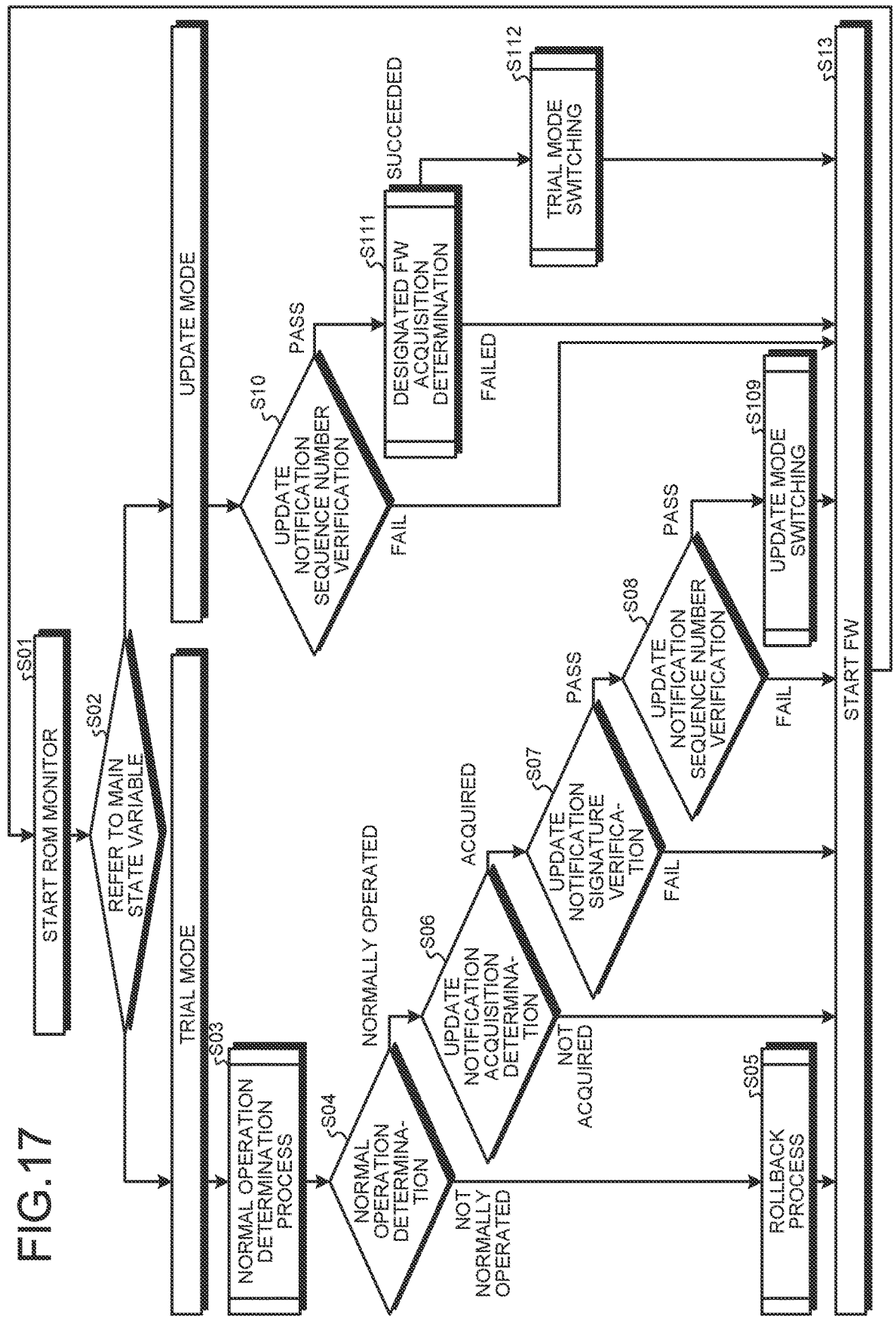
FIG. 17 is a flowchart illustrating an operation of a ROM monitor in detail according to the second embodiment.

FIG. 17 is a flowchart illustrating the operation of the ROM monitor 520a in detail according to the second embodiment.

The ROM monitor 520a of the second embodiment is different in operation from the ROM monitor 520 of the first embodiment illustrated in FIG. 9 in executing S109 instead of S09, executing S111 instead of S11, and executing S112 instead of S12. The following will describe a difference in operation from the first embodiment.

In update mode switching in S109, the ROM monitor 520a determines whether to acquire new firmware or to acquire the rollback firmware prior to the new firmware depending on whether or not the FW storage 630 stores the rollback firmware.

Figure 18:
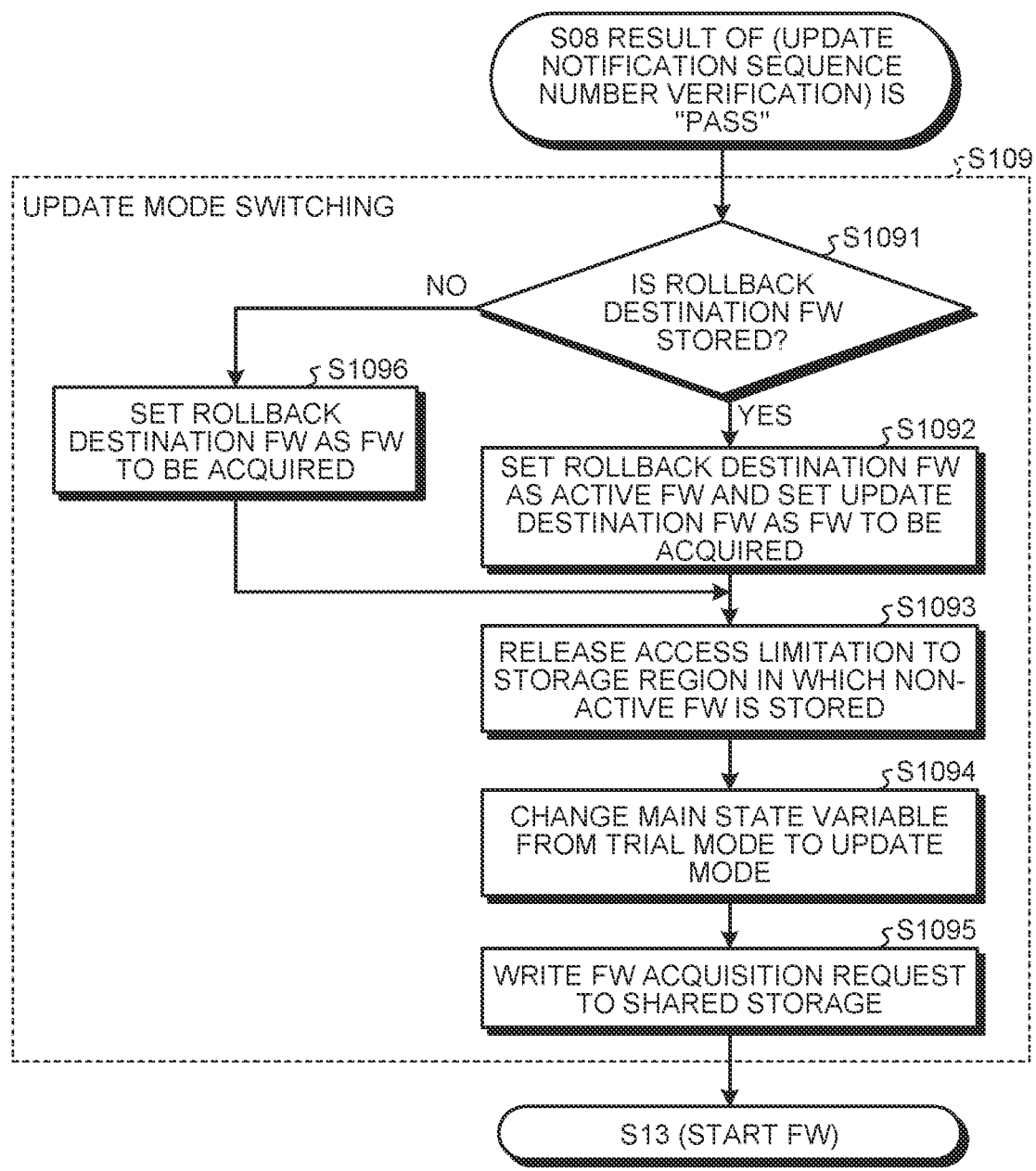
FIG. 18 is a flowchart illustrating update mode switching in detail according to the second embodiment.

FIG. 18 is a flowchart illustrating the update mode switching (S109 of FIG. 17) in detail according to the second embodiment.

In the update mode switching, the ROM monitor 520a first specifies the rollback firmware by the sequence number 713 included in the update notification 702, and determines whether or not the FW storage 630 stores the rollback firmware (S1091).

When the FW storage 630 stores the rollback firmware (S1091: Yes), the ROM monitor 520a sets the rollback firmware as the active firmware and sets new firmware as the one to be acquired (S1092).

In S1093 the ROM monitor 520a releases an access limitation to one of the two storage regions 631, the one storing firmware being not the active firmware (that is, non-active firmware). That is, the ROM monitor 520a sets the storage region 631 storing the non-active firmware to be writable.

In S1094, the ROM monitor 520a changes the main state variable 641 from the trial mode to the update mode.

Subsequently, in S1095 the ROM monitor 520a writes the FW acquisition request to the shared storage 620. The FW acquisition request may include information representing firmware to be acquired. Thereby, the firmware (that is, the active firmware) upon next startup can acquire the firmware to be acquired according to the FW acquisition request. The ROM monitor 520a completes the update mode switching, and proceeds to S13.

When the FW storage 630 stores no rollback firmware (S1091: No), the ROM monitor 520a sets the rollback firmware as the one to be acquired (S1096). The ROM monitor 520a then proceeds to S1093.

In the case of updating to the designated rollback firmware, it is assumed that existing firmware other than the designated rollback firmware may have some defect. When the FW storage 630 stores no rollback firmware, the terminal device 100a of the second embodiment acquires the rollback firmware prior to the update firmware and acquires the update firmware according to the rollback firmware. Thus, the terminal device 100a can acquire the update firmware without using the defective firmware, if any, other than the rollback firmware.

In S111 in FIG. 17, a determination on designated firmware acquisition is made.

Figure 19:
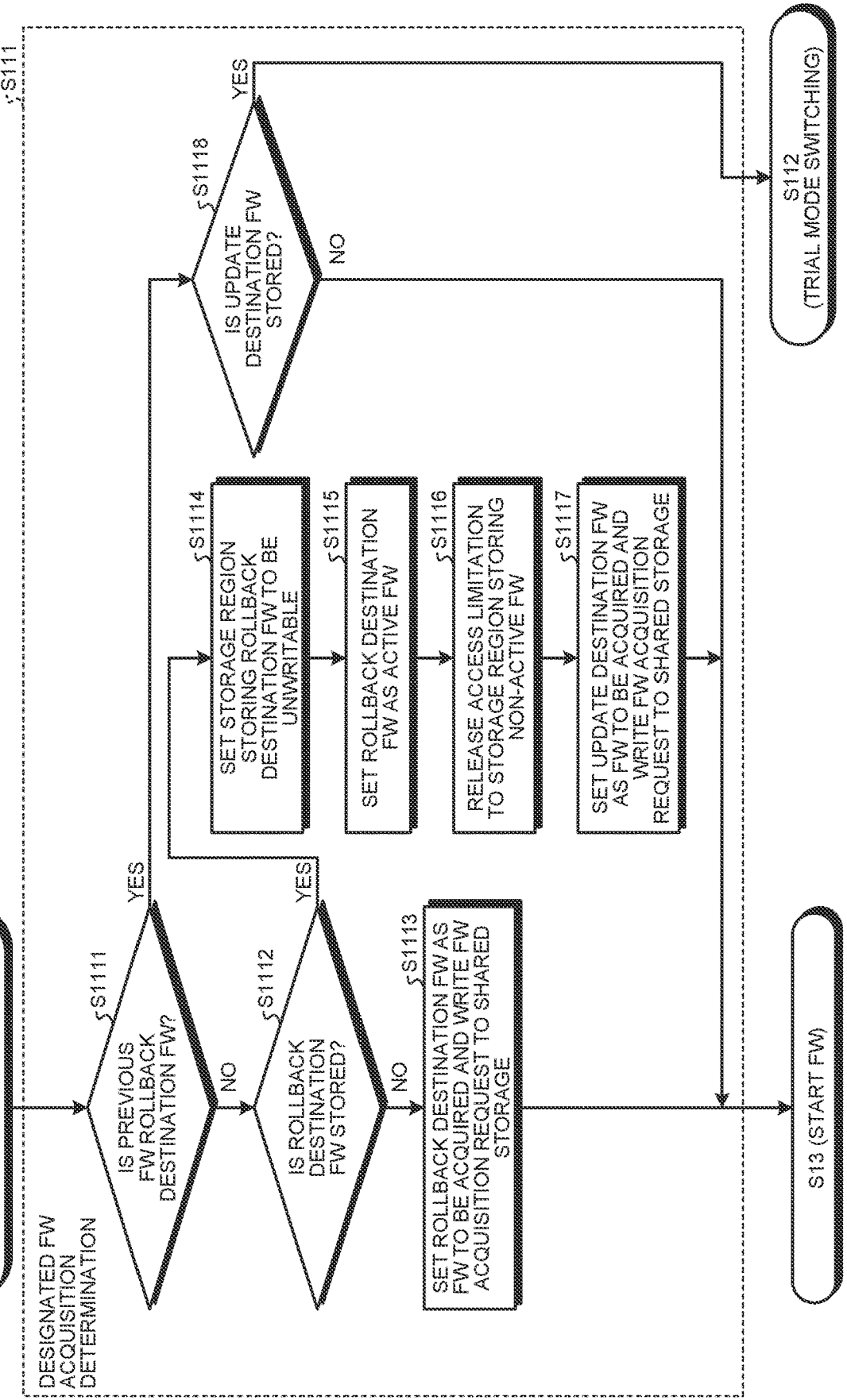
FIG. 19 is a flowchart illustrating designated firmware acquisition determination in detail according to the second embodiment.

FIG. 19 is a flowchart illustrating the designated firmware acquisition determination (S111 of FIG. 17) in detail according to the second embodiment.

In the determination on designated firmware acquisition, the ROM monitor 520a first determines whether or not the previous firmware is the rollback firmware (S1111).

When the previous firmware is not the rollback firmware (S1111: No), the ROM monitor 520a determines whether or not the FW storage 630 stores the rollback firmware (S1112).

When the FW storage 630 stores no rollback firmware (S1112: No), the ROM monitor 520a sets the rollback firmware as the one to be acquired and writes the FW acquisition request to the shared storage 620 (S1113). The ROM monitor 520a completes the determination on the designated firmware acquisition, and proceeds to S13.

When the FW storage 630 stores the rollback firmware (S1112: Yes), the ROM monitor 520a sets the storage region 631 storing the rollback firmware to be unwritable (S1114), and sets the rollback firmware as the active firmware (S1115).

Subsequently, in S1116 the ROM monitor 520a releases the access limitation to the storage region 631 storing the non-active firmware.

In S1117 the ROM monitor 520a sets the update firmware as the one to be acquired, and writes the FW acquisition request to the shared storage 620. While maintaining in the update mode, the ROM monitor 520a completes the determination on designated firmware acquisition and proceeds to S13.

When the previous firmware is the rollback firmware (S1111: Yes), the ROM monitor 520a determines whether or not the FW storage 630 stores the update firmware (S1118).

When the FW storage 630 stores no update firmware (S1118: No), while maintaining the update firmware as the one to be acquired and the update mode, the ROM monitor 520a completes the determination on designated firmware acquisition and proceeds to S13.

When the FW storage 630 stores the update firmware (S1118: Yes), the ROM monitor 520a proceeds to trial mode switching (S112 in FIG. 17).

In this manner, the ROM monitor 520a determines whether or not the FW storage 630 stores the update firmware and the rollback firmware. After finding no storage of either of them, the ROM monitor 520a maintains the update mode and acquires the firmware concerned.

In S1112 the ROM monitor 520a can verify the integrity of the rollback firmware. The rollback firmware stored in the FW storage 630 may fail in the integrity verification. In such a case the ROM monitor 520a proceeds to S1113. After determining the result of the integrity verification of the rollback firmware as a pass, the ROM monitor 520a proceeds to S1114.

To verify the integrity of the rollback firmware, the ROM monitor 520a can use a hash value included in the update notification 702 for the rollback firmware, that is, the update notification 702 indicated by the sequence number 713.

In S1118 the ROM monitor 520a can verify the integrity of the update firmware. If the update firmware stored in the FW storage 630 fail in the verification, the ROM monitor 520a proceeds to S13 while maintaining the update firmware as the one to be acquired and the update mode as the operation mode. After determining the result of the integrity verification of the update firmware as a pass, the ROM monitor 520a proceeds to the trial mode switching (S112 in FIG. 17).

The hash value included in the update notification 702 can be used in verifying the integrity of the update firmware.

Figure 20:
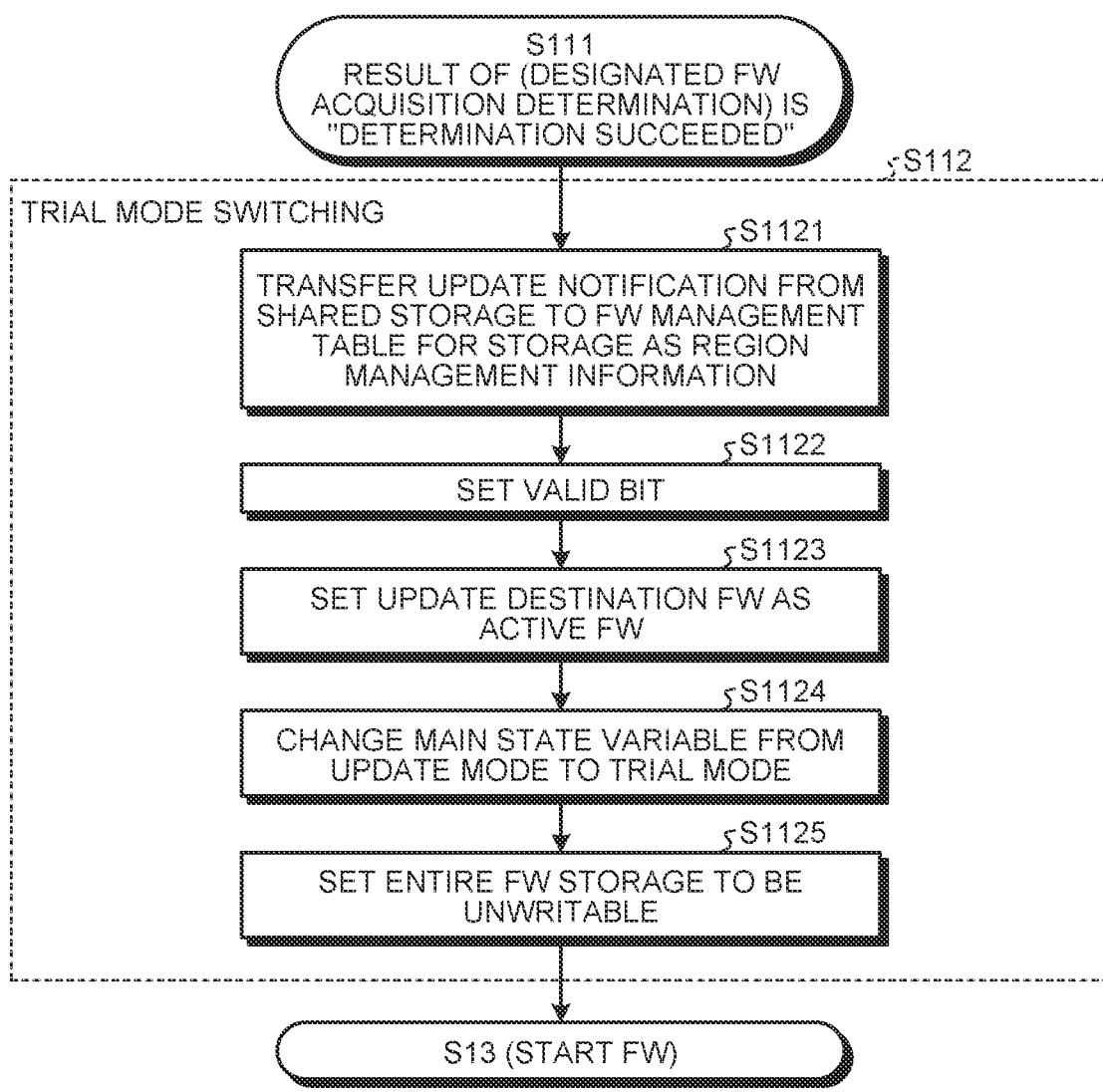
FIG. 20 is a flowchart illustrating trial mode switching in detail according to the second embodiment.

FIG. 20 is a flowchart illustrating the trial mode switching (S112 of FIG. 17) in detail according to the second embodiment.

In the trial mode switching, the ROM monitor 520a transfers the update notification 702 from the shared storage 620 to the FW management table 645 in the ROM-monitor storage 640 for storage as one piece of region management information 655 (S1121).

In S1122, the ROM monitor 520a sets a valid bit to the flag field 656 of the region management information 655 stored in S1121. As a result, the region management information 655 indicates that the update firmware acquired by the previous firmware in the update mode is authentic.

In S1123 the ROM monitor 520a sets the update firmware as the active firmware. That is, the ROM monitor 520a sets the region number of the storage region 631 storing the update firmware to the active FW storage destination 643.

In S1124 the ROM monitor 520a changes the main state variable 641 from the update mode to the trial mode.

In S1125 the ROM monitor 520a sets the entire FW storage 630 to be unwritable. The ROM monitor 520a completes the trial mode switching.

In the second embodiment, at the start of the trial mode switching, the FW storage 630 stores only the update firmware and the rollback firmware. Thus, the priority of each firmware is uniquely defined. That is, the update firmware has the highest priority, and the rollback firmware has second highest priority following the new firmware. The ROM monitor 520a may or may not record the order of priority in the priority field 657.

Thus, according to the second embodiment, the update notification 702 includes an explicit designation of fifth firmware as the rollback firmware, in addition to the update firmware.

The management server 2 thus designates firmware having no vulnerabilities or less vulnerabilities as the rollback destination, to be able to acquire the update firmware by operation of the firmware having no vulnerabilities or less vulnerabilities.

Specifically, in the second embodiment, the ROM monitor 520a starts up second firmware being the previous firmware determined as normally operating in the update mode if the FW storage 630a stores no rollback firmware (fifth firmware). The second firmware starts up in the update mode and acquires the fifth firmware. The ROM monitor 520a verifies the acquired fifth firmware. After determining a result of the verification as a pass, the ROM monitor 520a starts the fifth firmware in the update mode as fourth firmware determined as normally operating. The fourth firmware starts up in the update mode and acquires third firmware being the update firmware.

Thus, the management server 2 designates firmware having no vulnerabilities or less vulnerabilities as the rollback destination to be able to acquire the update firmware by the operation of the firmware having no vulnerabilities or less vulnerabilities.

It is typically considered that the alternative FW is set to the latest FW distributed immediately before the update FW. However, by explicitly designating the alternative FW, the management server 2 can acquire and execute alternative FW instead of the FW with the latest identification number having security vulnerabilities.

Third Embodiment

In the second embodiment, the FW storage 630a includes only two storage regions 631. While one of the two storage regions 631 is occupied by firmware being executed, only the other storage region 631 is available. Thus, the terminal device 100a holding no rollback firmware is to restart every time each of the rollback firmware and the update firmware is acquired.

In the third embodiment, an FW storage 630 includes three or more storage regions 631. That is, a terminal device allows two or more storage regions 631 to be set available. The terminal device holding no rollback firmware acquires and stores both the rollback firmware and the update firmware in the storage region 631. As a result, the terminal device decreases in the number of re-startup as compared with the second embodiment.

In the third embodiment, the terminal device includes a larger number of storage regions 631 than that in the second embodiment. However, the terminal device can simplify the update procedure and decrease a communication traffic in rolling back to the second or older previous versions.

Hereinafter, the same or like elements as those of another embodiment (the first embodiment or the second embodiment) will not be described or will be briefly described. In the following, the terminal device according to the third embodiment is referred to as a terminal device 100b. The terminal device 100b receives an update notification 702 (see FIG. 14) having the same data configuration as that of the second embodiment from a management server 2.

Figure 21:
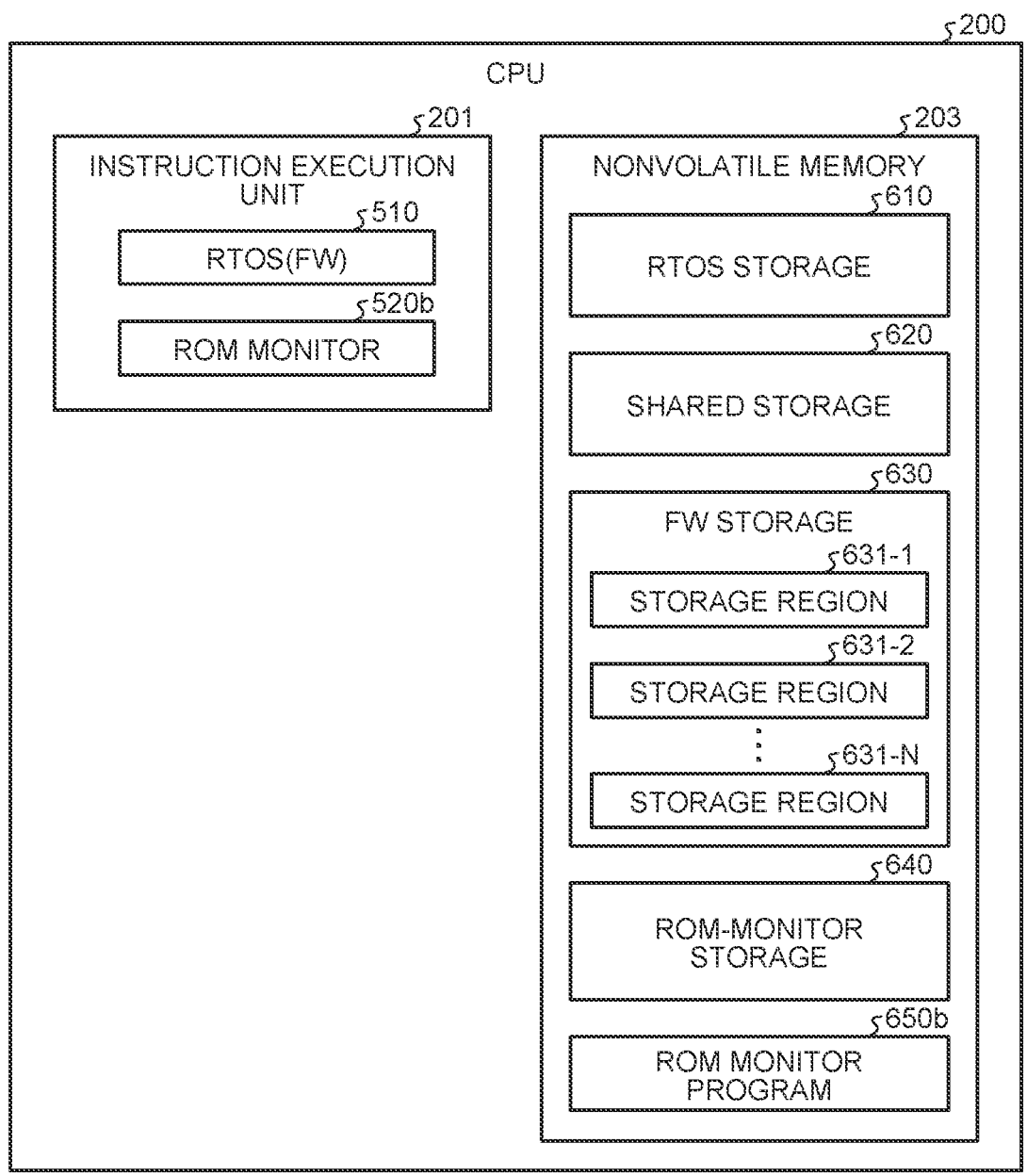
FIG. 21 is a schematic diagram illustrating a function implemented by a CPU and a schematic configuration of a nonvolatile memory in a terminal device according to a third embodiment.

FIG. 21 is a schematic diagram illustrating a function implemented by a CPU 200 and a schematic configuration of a nonvolatile memory 203 in the terminal device 100b according to the third embodiment.

An instruction execution unit 201 functions as a ROM monitor 520b by executing a ROM monitor program 650b. In addition, the instruction execution unit 201 functions as an RTOS 510 by executing firmware.

The nonvolatile memory 203 has an RTOS storage 610, a shared storage 620, an FW storage 630, and a ROM-monitor storage 640 allocated thereto.

The FW storage 630 includes a plurality of storage regions 631, for example, N storage regions 631-1 to 631-N. That is, the FW storage 630 has the same configuration as that of the first embodiment.

Figure 22:
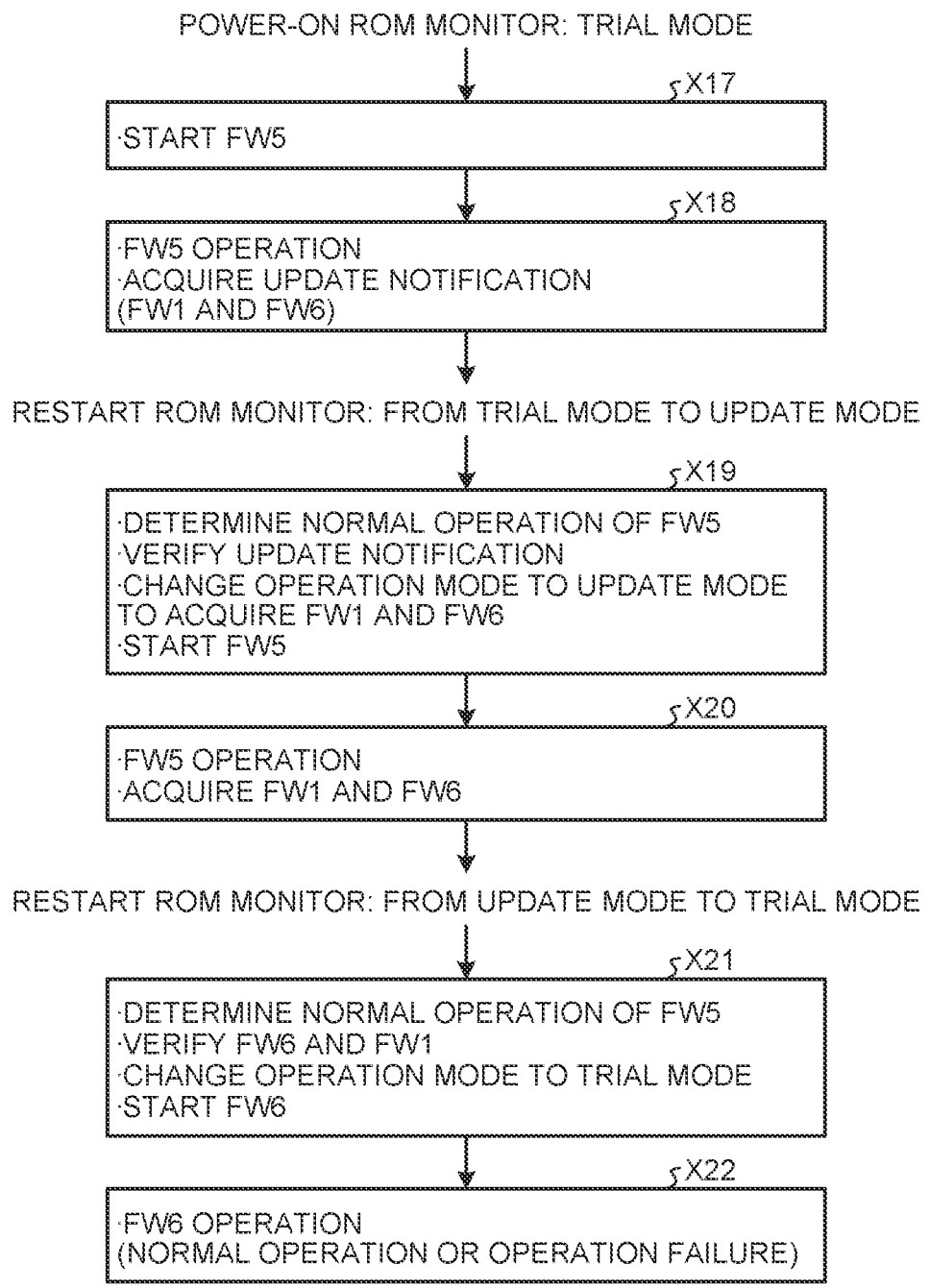
FIG. 22 is a sequence diagram illustrating an exemplary operation of the terminal device according to the third embodiment.

Next, an exemplary operation of the terminal device 100b according to the third embodiment will be described with reference to FIG. 22. FIG. 22 is a sequence diagram illustrating an exemplary operation of the terminal device 100b according to the third embodiment.

In Step X09 after power-on, the ROM monitor 520b refers to a main state variable 641 and recognizes that the firmware is due to operate in the trial mode. The ROM monitor 520b starts up firmware FW5 in the trial mode.

In Step X18, the firmware FW5 starts up in the trial mode and receives an update notification (FW1 and FW6) corresponding to the update notification 702 for update firmware FW6. The update notification 702 designates firmware FW1 as the rollback firmware. The firmware FW5 stores the update notification 702 in a shared storage 620. Then, the firmware FW5 restarts the CPU 200.

In Step X19, the ROM monitor 520b determines that the firmware FW5 has normally operated from operation result information written in the shared storage 620. In addition, the ROM monitor 520b verifies the update notification (FW1 and FW6) using a signature 714 and using a sequence number 711. When results of both verifications are a pass, the ROM monitor 520b sets two storage regions 631 to be writable or sets the firmware FW1 and the firmware FW5 as the ones to be acquired, to change the operation mode from the trial mode to the update mode. The ROM monitor 520b then starts up the firmware FW5 as determined as normally operating.

In Step X20, the firmware FW5 starts up in the update mode and acquires the firmware FW1 and the firmware FW6 from the management server 2. The firmware FW5 stores the acquired firmware FW1 and firmware FW6 in the FW storage 630. The firmware FW5 restarts the CPU 200.

In Step X21, the ROM monitor 520b verifies the acquired firmware FW1 and firmware FW6. The ROM monitor 520b then changes the operation mode from the update mode to the trial mode. The ROM monitor 520b sets the firmware FW1 as the alternative firmware and starts up the firmware FW6.

In Step X22, the firmware FW6 starts up in the trial mode and starts operating.

The above sequence may occur in an assumed situation as follows. Until Step X17, the terminal device 100b is in operation with the firmware FW4 set as the rollback firmware and the firmware FW5 set as the active firmware. It is then found that the firmware FW2 to the firmware FW5 have serious security vulnerabilities. Because of this, as an update plan, the firmware FW1 is set as the rollback firmware and the firmware FW6 having vulnerabilities corrected is set as the update firmware for update. As a result, the management server 2 issues the update notification (FW1 and FW6). However, the terminal device 100b holds the firmware FW3, the firmware FW4, and the firmware FW5 but not the firmware FW1. Thus, the terminal device 100b acquires the firmware FW6 and reacquires the firmware FW1.

The assumption on the functions and vulnerabilities of the firmware FW3 and the firmware FW4 is different from that in the second embodiment. In the second embodiment, the firmware FW3 is considered as having vulnerabilities, and the firmware FW1 and the firmware FW4 are executed in the trial mode. In the third embodiment, the firmware FW3 normally operates and is updated to the firmware FW4 and the firmware FW5, therefore, the firmware FW1 is assumed to be erased.

In the second embodiment, the firmware is to start up in the update mode twice at the time of acquiring the rollback firmware and at the time of acquiring the update firmware (see X11 and X13 in FIG. 16). To the contrary, in the third embodiment, the firmware is to start up in the update mode only once (see X19 in FIG. 22).

Figure 23:
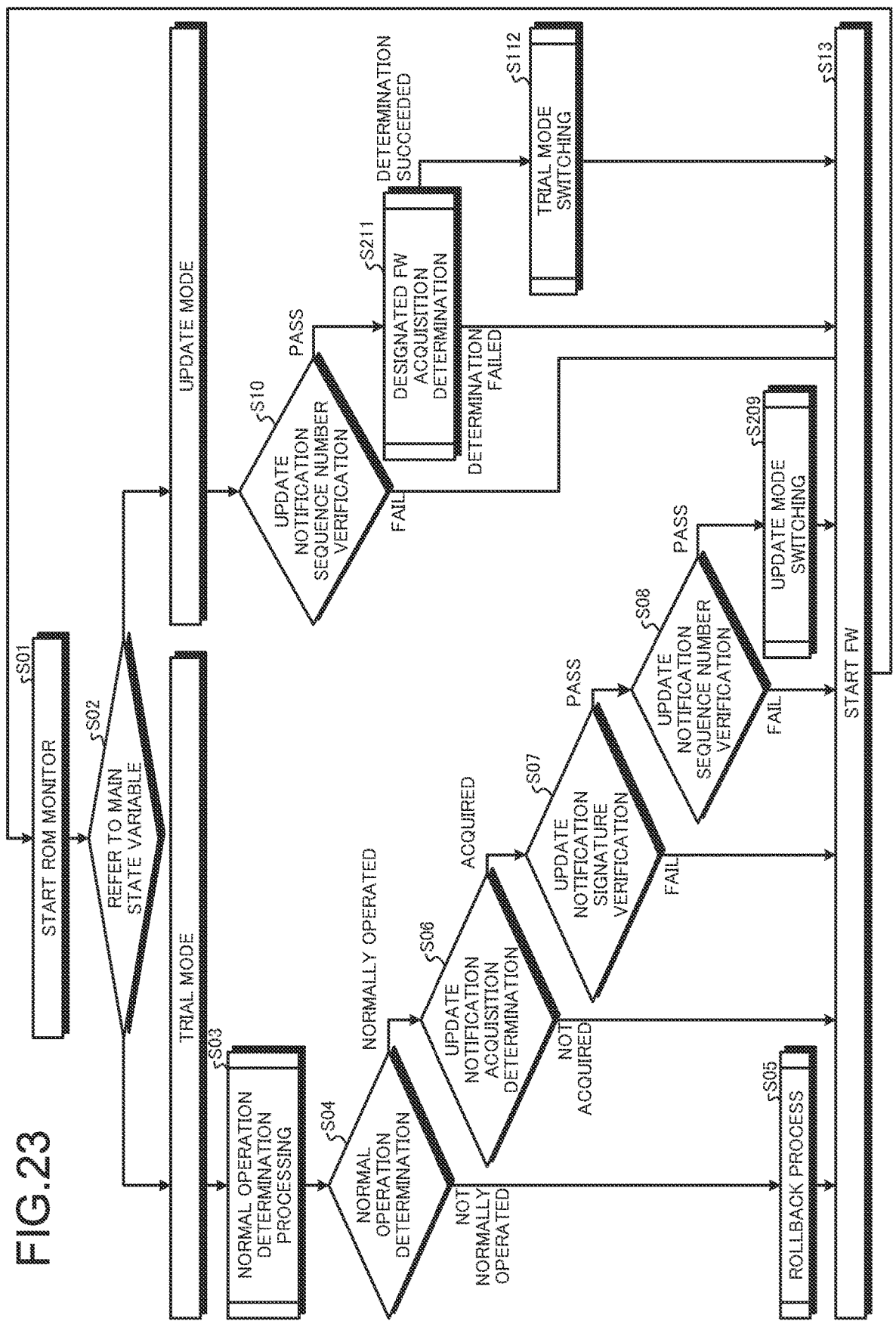
FIG. 23 is a flowchart illustrating an operation of a ROM monitor in detail according to the third embodiment.

FIG. 23 is a flowchart illustrating an operation of the ROM monitor 520b in detail according to the third embodiment.

The operation of the ROM monitor 520b of the third embodiment is different from the operation of the ROM monitor 520b of the second embodiment illustrated in FIG. 17 in executing S209 instead of S109 and executing S211 instead of S111. The following will describe a difference in operation from the second embodiment.

Figure 24:
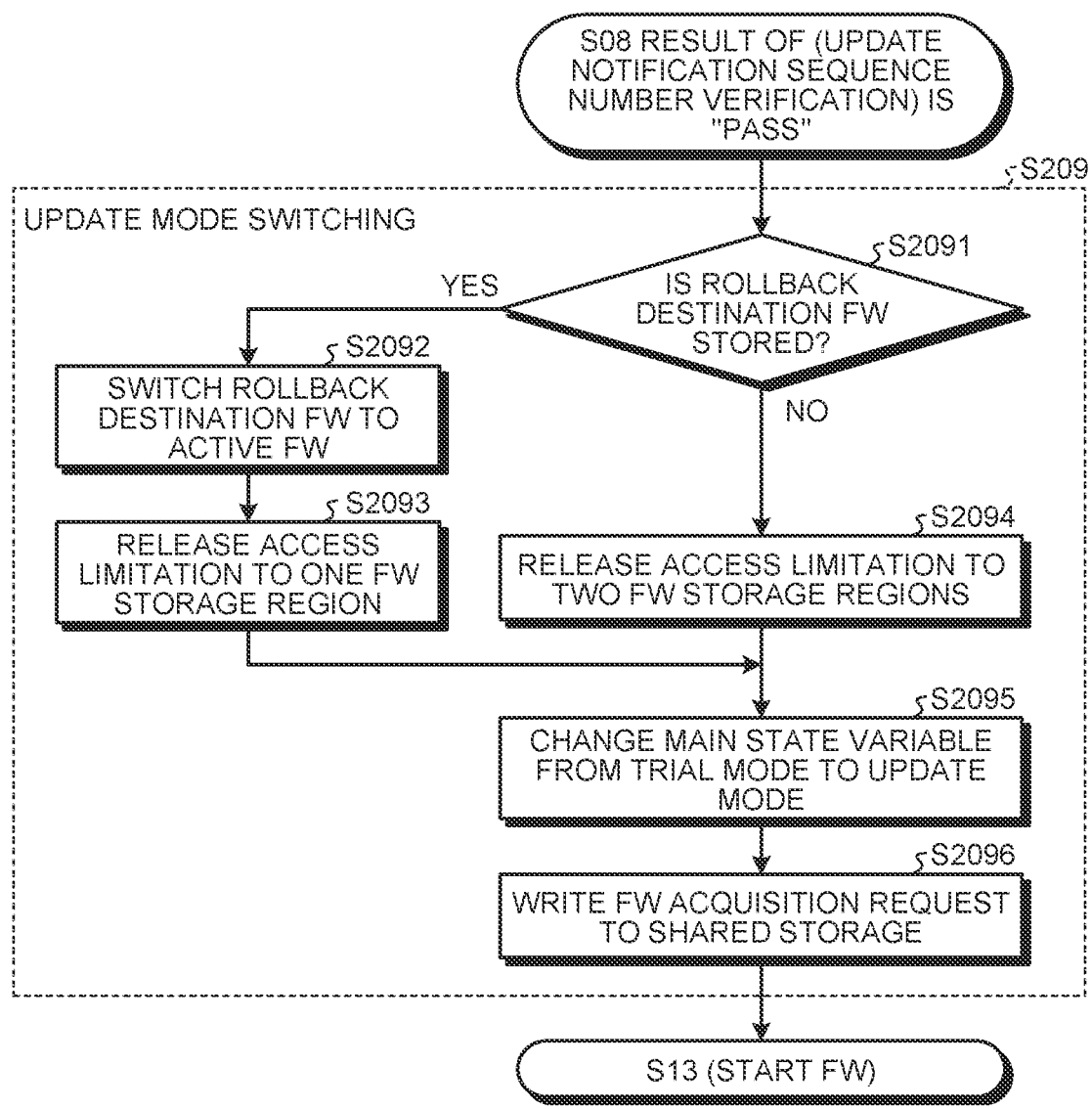
FIG. 24 is a flowchart illustrating update mode switching in detail according to the third embodiment.

FIG. 24 is a flowchart illustrating update mode switching (S209 in FIG. 23) in detail according to the third embodiment.

In the update mode switching, the ROM monitor 520b first specifies the rollback firmware by the sequence number 713 included in the update notification 702, and determines whether or not the FW storage 630 stores the rollback firmware (S2091).

When the FW storage 630 stores the rollback firmware (S2091: Yes), the ROM monitor 520b sets the rollback firmware as the active FW (S2092).

In S2093, the ROM monitor 520b releases an access limitation to one storage region 631. The ROM monitor 520b selects, for example, the storage region 631 storing firmware with the lowest priority from among the N storage regions 631, and sets the selected storage region 631 to be writable.

When the FW storage 630 stores no rollback firmware (S2091: No), the ROM monitor 520b releases an access limitation to two storage regions 631 (S2094). The ROM monitor 520b selects, for example, two storage regions 631 storing two pieces of firmware with the lowest priority from among the N storage regions 631, and sets the selected two storage regions 631 to be writable.

After S2093 or S2094, the ROM monitor 520b changes the main state variable 641 from the trial mode to the update mode (S2095).

In S2096 the ROM monitor 520b writes an FW acquisition request to the shared storage 620. The ROM monitor 520b completes the update mode switching and proceeds to S13.

As in the second embodiment, the FW acquisition request may include information representing firmware to be acquired. For example, in the case of executing S2095 after S2093, the ROM monitor 520b adds information representing new firmware to the FW acquisition request. In the case of executing S2095 after S2094, the ROM monitor 520b adds, to the FW acquisition request, information representing the rollback firmware and information representing the new firmware. The firmware starts up in the update mode at later timing to be able to specify firmware to be acquired, following the FW acquisition request.

Figure 25:
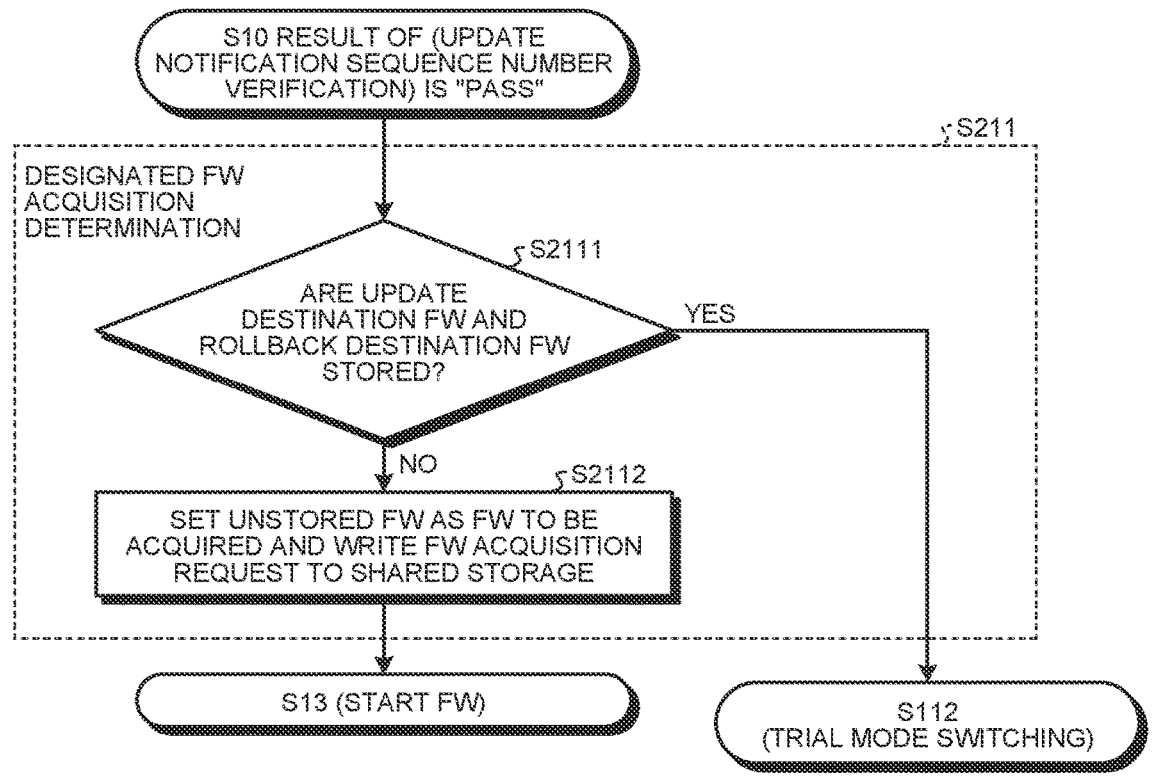
FIG. 25 is a flowchart illustrating designated firmware acquisition determination in detail according to the third embodiment.

FIG. 25 is a flowchart illustrating determination on designated firmware acquisition in detail (S211 of FIG. 23) according to the third embodiment.

In the determination on designated firmware acquisition, the ROM monitor 520b determines whether or not the FW storage 630 stores both the update firmware and the rollback firmware, based on the update firmware information and the rollback firmware information included in the update notification 702 (S2111).

When the FW storage 630 does not store either of the update firmware and the rollback firmware (S2111: No), the ROM monitor 520b sets the not yet stored firmware as the one to be acquired and writes the FW acquisition request to the shared storage 620 (S2112). The ROM monitor 520b completes the determination on designated firmware acquisition and proceeds to S13.

When the FW storage 630 stores both the update firmware and the rollback firmware (S2111: Yes), the ROM monitor 520b completes the determination on designated firmware acquisition and proceeds to S112.

In S2111 the ROM monitor 520b can verify the integrity of the update firmware and the integrity of the rollback firmware. If the rollback firmware stored in the FW storage 630 fails in the integrity verification, the ROM monitor 520b proceeds to S2112, to set the rollback firmware as the one to be acquired. Likewise, if the update firmware stored in the FW storage 630 fails in the integrity verification, the ROM monitor 520b proceeds to S2112 to set the update firmware as the one to be acquired. After determining both the results of the integrity verification of the rollback firmware and the update firmware as a pass, the ROM monitor 520b proceeds to S112.

The terminal device 100b may not be able to acquire the authorized firmware FW1 and firmware FW6 due to a communication failure or an attacker's replacement. The terminal device 100b verifies the integrity of each of the firmware FW1 and the firmware FW6 in response to the update notification (FW1 and FW6), and repeats acquiring the firmware FW1 and the firmware FW6 until both pass the integrity verification.

According to the third embodiment as described above, after determining that the FW storage 630 stores no rollback firmware (fifth firmware), the ROM monitor 520b starts up second firmware being the previous firmware determined as normally operating, in the update mode. The second firmware starts up in the update mode and acquires third update firmware and fifth firmware.

The management server 2 thus designates firmware having no vulnerabilities or less vulnerabilities as the rollback destination, to be able to acquire the update firmware by operation of the firmware having no vulnerabilities or less vulnerabilities.

In addition, it is possible to reduce the number of re-startup as compared with the second embodiment.

Fourth Embodiment

The first to third embodiments are on the premise that the terminal devices 100, 100a, and 100b are constantly connected to the network and continuously operate. A fourth embodiment assumes a situation that a terminal device stops operating for a certain period, and then becomes connected to the network again to update firmware. The firmware of the terminal device does not reflect update made during the operation stop period, therefore, it needs to be updated to the latest firmware. To this end, update of one or more pieces of firmware in response to one or more update notifications issued during the operation stop period may include a failed firmware update. Thus, continuous firmware update is not preferable. In view of this, the fourth embodiment will describe a terminal device configured to adopt update skip procedure not to perform the failed firmware update. This makes it possible to simplify the operation for the firmware update as compared with performing all the previous update steps.

Meanwhile, omitting intermediate update steps signifies a skip in the update procedure, increasing the number of possible combinations of update procedures. The increased number of combinations of update procedures may include a combination of pieces of firmware having serious vulnerabilities. In such a case the terminal device may fall into a significantly vulnerable state. In addition, the operation stop period varies depending on the circumstances of the users, and the terminal devices are in different states at the time of starting update. In comparison with sequential firmware updates, a large number of variations may be considered.

In addition, considering that necessary update steps differ depending on the application of the terminal device as described below, variations and complexity further increases. It is difficult to ultimately eliminate a failure caused by such complexity since such a failure is relevant to the usage of the terminal device. However, the ROM monitor of the terminal device can check and exclude an inadvertent failure, if it arises from an operation depending on the application. The present embodiment discloses means for implementation, i.e., a procedure for creating and executing a safe update plan with reference to a list of previous update notifications issued commonly to terminal devices from the vendor of the terminal devices and a list of intermediate update steps designated depending on the application.

A typical assumable operational situation in the fourth embodiment will be described. The fourth embodiment assumes a situation that the terminal device such as a consumer device is used under the condition that the terminal device connected to the network having weakness in terms of management stringency or the terminal device has weakness in terms of operation continuity. For the firmware update immediately after returning from the operation stop period, the terminal device acquires the update notification previously issued and the firmware, but does not use a dedicated network for the purpose of cost reduction. The terminal device acquires the firmware by means of P2P file transfer, for example. The P2P transfer cannot ensure the order of acquiring a plurality of pieces of firmware. The acquired pieces of firmware previously issued potentially include firmware having a significant defect even if the firmware is authorized firmware. Even through the firmware check by the sequence number in the first embodiment, the terminal device may be placed in an unavailable state for a long period of time by applying the acquired firmware in an ad hoc manner. A first challenge of the fourth embodiment is to provide a check for avoiding update to firmware having such a defect.

In addition, in the firmware update of the terminal device that has resumed operating from the operation stop state, it is efficient to omitting unnecessary intermediate steps for the update to the latest firmware, if possible. However, before the update to the latest firmware, several intermediate steps of firmware operation may be required to change data and settings of other terminal devices or services operating in cooperation. This varies depending on a status of cooperation between the terminal device and another device or service, that is, a use form, and is important in terms of maintaining service continuity and improving service convenience. Skipping an intermediate step may cause resetting of service cooperation, deteriorating service convenience. A second challenge of the fourth embodiment is to provide appropriate use of the intermediate steps that vary depending on the application.

Figure 36:
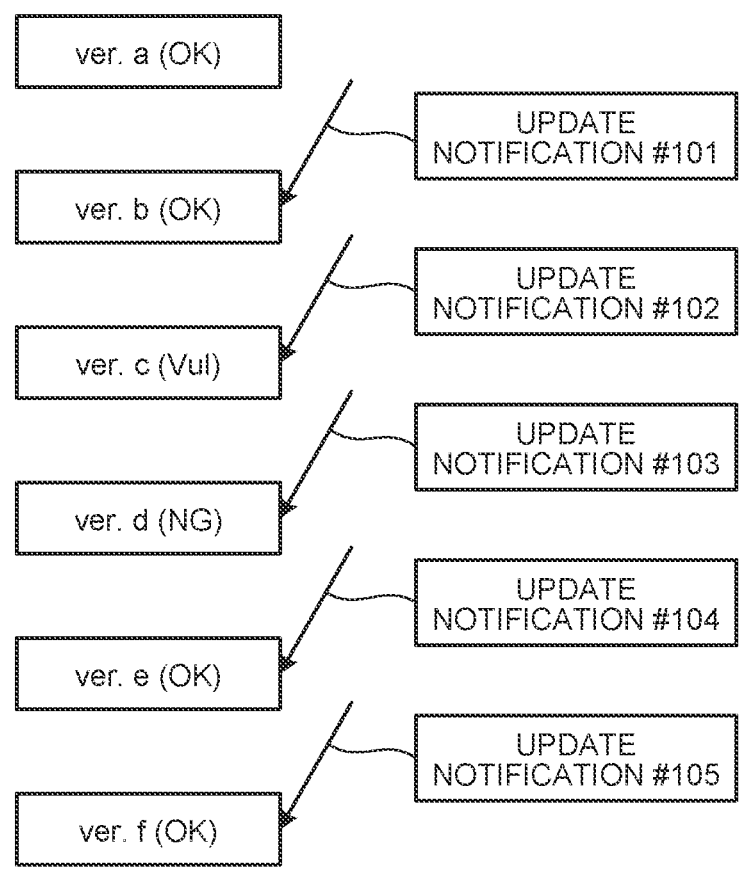
FIG. 36 is a schematic diagram illustrating a firmware update procedure by the terminal device after an operation stop period in the first embodiment.

An assumable situation will be described specifically with reference to FIG. 36. FIG. 36 is a schematic diagram illustrating a firmware update procedure of the terminal device 100a to update firmware after the operation stop period in the first embodiment. During the operation stop period, in response to five update notifications 701 with sequence numbers #101 to #105, five firmware updates occur. During operation of version-A firmware, the firmware of the terminal device 100a is updated to version-B firmware, version-C firmware, version-D firmware, version-E firmware, and version-F firmware in this order by the firmware updates in order of sequence number. Hereinafter, the update notification 701 given "x" as a sequence number 811 is referred to as an update notification #x where x is an integer of zero or more.

In FIG. 36, a version determined as normally operating is marked with (OK). A version determined as having serious vulnerabilities is marked with (Vul). A version determined as incapable of startup is marked with (NG).

The five arrows indicate firmware updates. The end point of each arrow represents new firmware distributed at the time of firmware update. The start point of each arrow represents rollback firmware designated by the update notification. In the first embodiment, the rollback firmware is not designated by the update notification, so that the start points of the arrows are not connected to any version of firmware.

Consider that during the operation of the version-A firmware the terminal device 100a enters an operation stop state, and resumes operating when the version-F firmware is the latest firmware. In the following a state of the terminal device 100a in which the version-A firmware is in operation is referred to as an initial state.

The terminal device 100a of the first embodiment can perform firmware update as long as the firmware operates normally. That is, there is no limitation on the order of firmware update. Thus, the terminal device 100a in the initial state can most efficiently update the firmware to the version-F by acquiring the update notification #105 and performing firmware update according to the update notification #105.

It is assumed that an intermediate step of executing the version-B firmware be necessary. The terminal device 100a performs the firmware update corresponding to the update notification #105 in the initial state. In such a case terminal device 100a requires version-B firmware later. However, after the firmware update corresponding to the update notification #105, the terminal device 100a does not perform firmware update corresponding to the update notification #101 for acquiring the version-B firmware because the firmware fails in the verification by the sequence number 811. This may require resetting of application cooperation.

The terminal device 100a acquires the update notification #101, the update notification #102, the update notification #103, the update notification #104, and the update notification #105 issued during the operation stop period in this order and performs the firmware update in the same order. In this case the terminal device 100a can skip a necessary intermediate step (that is, execution of the version-B firmware). However, the terminal device 100a holds the version-C firmware having vulnerabilities or the version-D firmware incapable of startup for a certain period. This places the terminal device 100a in a very vulnerable state.

As described above, to allow skipping the update intermediate step, there is room for improvement with respect to the first challenge in the firmware update procedure of the first embodiment not including designation of the rollback destination.

Figure 37:
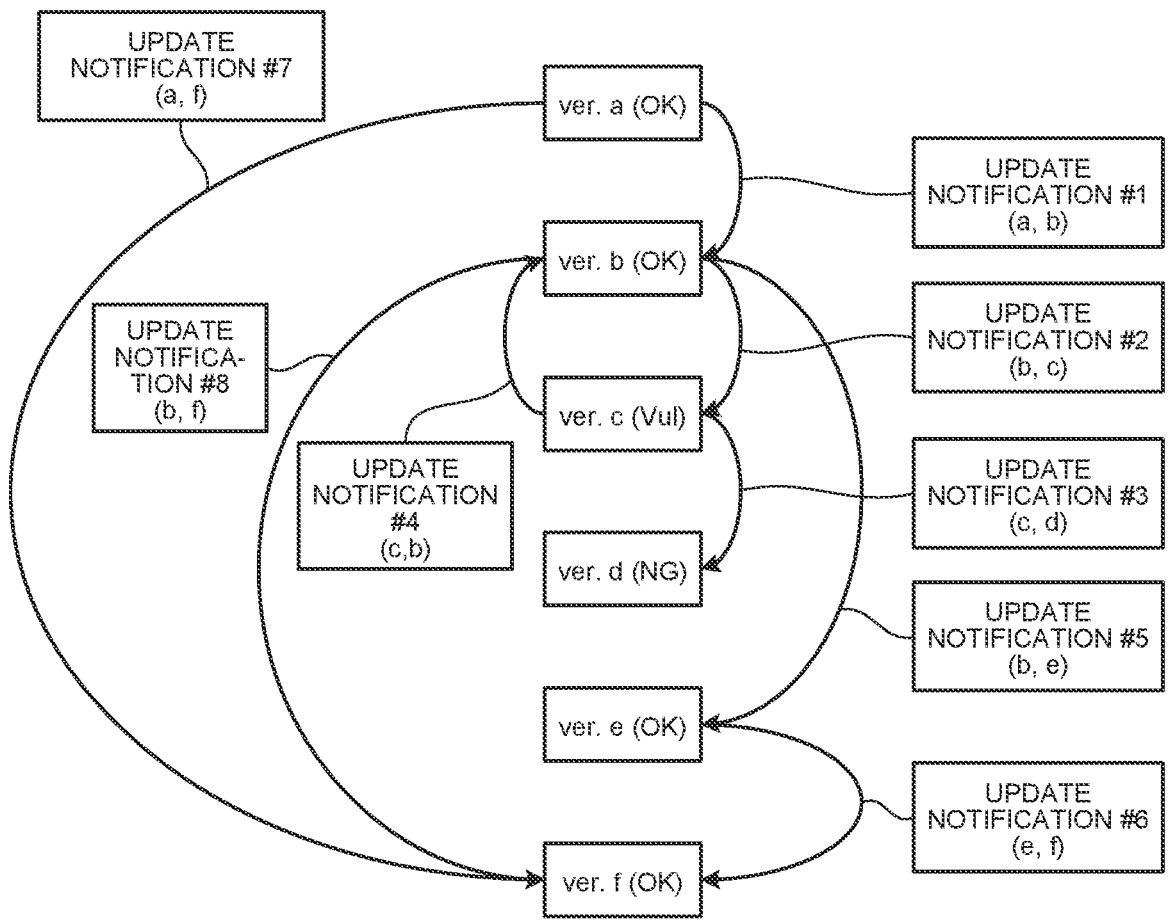
FIG. 37 is a schematic diagram illustrating a firmware update procedure using the update notification in the fourth embodiment.

In the fourth embodiment, the update notification can specify the version prior to execution of the firmware update. FIG. 37 is a schematic diagram illustrating a firmware update procedure using the update notification of the fourth embodiment. The update notification of the fourth embodiment is referred to as an update notification 802.

The update notification 802 specifies a version of the rollback firmware. Herein, eight update notifications 802 including update notifications #1 to #8 are issued during the operation stop period. In FIG. 37, an update notification #x (y and z) represents a sequence number x, a version-y of the rollback firmware, and a version-z of new firmware. The end points of the arrows indicate the version of the update firmware, and the start points of the arrows indicate the version of the rollback firmware.

In the fourth embodiment, the update notification #4 (c and b) is an exemplary update notification 802 for updating the firmware from the vulnerable version-C to the older version-B. The update notification 802 will be described in detail later.

By the update notification #5, the firmware is updated from the version-B to the version-E, and by the update notification #6, the firmware is updated from the version-E to the version F. Further, after issuance of the update notification #6, the update notification #7 (a and f) is issued for the purpose of efficiently updating the terminal device having the version-A firmware.

As a result of updating the firmware in order of sequence number, the terminal device holds the vulnerable version-C and the version-D with an operation failure. However, by the subsequent firmware update corresponding to the update notification #4, the terminal device can be returned to operate the safe version-B.

The firmware update corresponding to the update notification #5 is not applicable to the terminal device unless the terminal device holds the version-B firmware. However, the update notification #7 is additionally issued to efficiently update the firmware of the terminal device that does not execute the version-B firmware as described above. Because of this, the terminal device having the version-A firmware can hold the version F firmware being the latest firmware by immediately updating the firmware corresponding to the update notification #7. In the update procedure from the version-A to the version F skipping the version-B firmware, the update notification #7 is not issued if there is a problem in common data structure compatibility.

Meanwhile, the update notification #8 is issued when execution or non-execution of the version-B firmware as an intermediate update step depends on the application purpose of the terminal device.

The device vendor that provides the basic function of the terminal device provides the update notification including skipping such as the update notification #7. The fourth embodiment is on the premise that the operator determines whether to apply the update including skipping, according to the uses form of the individual terminal devices, as function sharing.

In the example illustrated in FIG. 37, in the initial state, that is, in the operation of the version-A firmware, whether to sequentially update the firmware three times corresponding to the update notification #1, the update notification #5, and the update notification #6 or to update the firmware corresponding to the update notification #7 skipping the intermediate step depends on the application of the terminal device. However, it is desirable to exclude the firmware update not including an update to the version F, for example, the firmware update to the version-C and to the version-D, which are not to be executed.

A third challenge of the fourth embodiment is to allow the operator to designate an essential intermediate step depending on the application, and provide the ROM monitor with a function of creating an update plan to correctly perform the intermediate step, thereby providing safe and efficient update including skipping to solve the first and second challenges.

In the fourth embodiment, the terminal device additionally includes a plan update mode as the operation mode in addition to the trial mode and the update mode. The plan update mode is for acquiring an update notification list and an essential intermediate step list. In the plan update mode, the ROM monitor can create and check the update plan. The update notification list contains two or more update notifications issued as of now and is supplied by the vendor of the terminal device. The ROM monitor can verify whether or not the firmware has been altered by signature with reference to the update notification list. In addition, the operator supplies information (essential intermediate step list) on intermediate steps for applying the firmware update to the terminal device. Suppose that a certain terminal device determines a gap between the current state and the latest update after acquiring the latest update notification. In such a case the terminal device creates an update plan for updating to the latest version while avoiding a vulnerable state through a necessary intermediate step. By additionally including the plan update mode, the terminal device can acquire the update notification list that serves to assist the terminal device of an older version to update. The terminal device of the older version can efficiently update the firmware.

Hereinafter, the fourth embodiment will be described. The terminal device according to the fourth embodiment is referred to as a terminal device 100c. Hereinafter, the same or like features as those of the third embodiment will be omitted or briefly described.

Figure 26A:
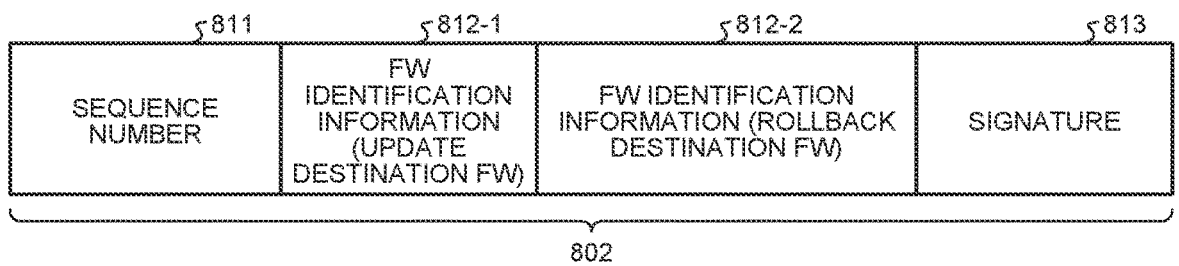
FIGS. 26A and 26B are schematic diagrams illustrating an exemplary data configuration of an update notification according to a fourth embodiment.
Figure 26B:
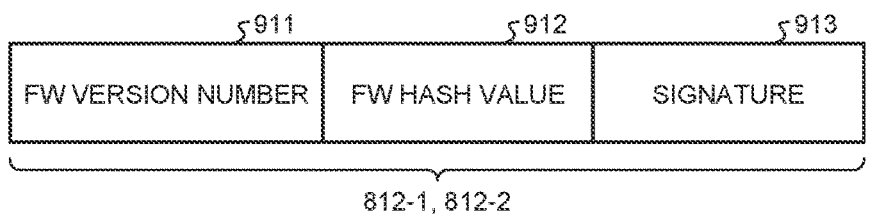

FIGS. 26A and 26B are schematic diagrams illustrating an exemplary data configuration of the update notification 802 according to the fourth embodiment.

As illustrated in FIG. 26A, the update notification 802 has a data configuration including a combination of a sequence number 811, update firmware identification information 812-1, rollback firmware identification information 812-2, and a signature 813. The signature 813 is generated by subjecting a message including the sequence number 811, the update firmware identification information 812-1, and the rollback firmware identification information 812-2 to a given algorithm. A secret key of a non-symmetric key scheme is used to generate the signature 813 and is held only in the management server 2. Thus, only the management server 2 can issue the authorized update notification 802. A ROM-monitor storage 640c of the terminal device 100c stores therein a public key being a pair with the secret key.

As illustrated in FIG. 26B, each of the firmware identification information 812-1 and the firmware identification information 812-2 includes a firmware version number 911, a firmware hash value 912, and a signature 913. The signature 913 is generated by subjecting information including the version number 911 and the hash value 912 to a given algorithm. A secret key of a non-symmetric key scheme is used to generate the signature 913 and is held only in the management server 2. A ROM-monitor storage 640c of the terminal device 100c stores therein a public key being a pair with the secret key.

The fourth embodiment differs from the second embodiment and the third embodiment in that the update destination and the rollback destination are designated in the same format. By this format, the vendor of the terminal device 100c can designate a new version FW having vulnerabilities as the rollback destination and designate an older version FW as the update destination, when they intends to. This is represented by the update notification #4 illustrated in FIG. 37.

To continuously perform the firmware update, the terminal device 100c creates an update plan from a plurality of update notifications 802. The update notification list for use in creating the update plan includes all update notifications excluding the update notification 802 for update to firmware having fatal vulnerabilities or firmware having not started up. A vendor signature of the terminal device 100c may be added to the entire update notification list.

FIG. 27 is a schematic diagram illustrating an exemplary update notification list according to the fourth embodiment. In the example illustrated in FIG. 27, the update notification list contains five update notifications 802 among eight update notifications 802 illustrated in FIG. 37, except for the update notifications #2 to #4 that designate the version-C having the vulnerabilities or the version-D having an operation failure as determined, as the update destination or the rollback destination. FIG. 27 omits showing the signature 813 included in each update notification 802.

FIG. 28 is a schematic diagram illustrating an exemplary update plan according to the fourth embodiment. The update plan includes two or more update notifications 802 selected from the update notification list. The two or more update notifications 802 are selected to update the firmware in a stepwise manner from the firmware version of the terminal device 100c to a version designated by the latest update notification 802 via a version designated as the intermediate step.

More specifically, among the two or more update notifications 802 included in the update plan, two or more update notifications 802 are individually selected such that two update notifications 802 indicating two firmware updates to be continuously performed satisfy the following relationship. That is, regarding an update notification 802 for certain firmware update (a first update notification 802) and an update notification 802 for firmware update to be performed next (a second update notification 802), the firmware designated as the update firmware by the first update notification 802 is designated as the rollback firmware by the second update notification 802. That is, the update plan represents the order of update of two or more pieces of firmware. The firmware update condition for two continuous firmware updates are referred to as a continuation condition.

The firmware designated as the update firmware by the second update notification 802 is acquired during the operation of the firmware designated as the update firmware by the first update notification 802 (that is, the firmware designated as the rollback firmware by the second update notification 802). Thus, the firmware designated as the rollback firmware by each update notification 802 can be considered as firmware designated as update source firmware.

The update plan illustrated in FIG. 28 includes the update notification #5 for the firmware update from the version-B firmware that operates in the initial state to the version-E firmware, and the update notification #6 for the firmware update from the version-E firmware to the version-F firmware.

Figure 29:
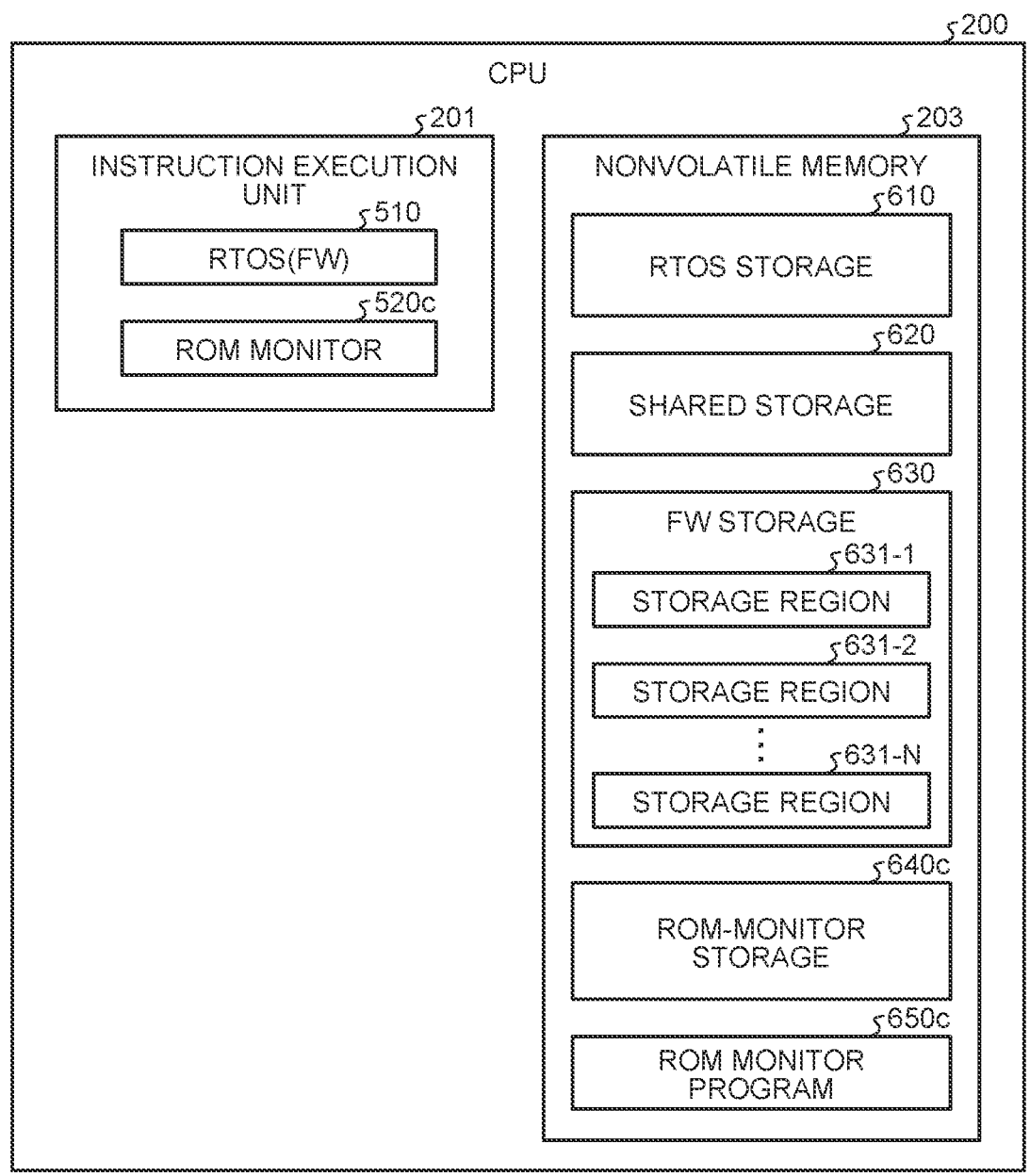
FIG. 29 is a schematic diagram illustrating a function implemented by a CPU and a schematic configuration of a nonvolatile memory in a terminal device according to the fourth embodiment.

FIG. 29 is a schematic diagram illustrating a function implemented by a CPU 200 and a schematic configuration of a nonvolatile memory 203 in the terminal device 100c according to the fourth embodiment.

An instruction execution unit 201 functions as a ROM monitor 520c by executing a ROM monitor program 650c. In addition, the instruction execution unit 201 functions as an RTOS 510 by executing firmware.

The nonvolatile memory 203 has an RTOS storage 610, a shared storage 620, an FW storage 630, and a ROM-monitor storage 640c allocated thereto.

Figure 30:
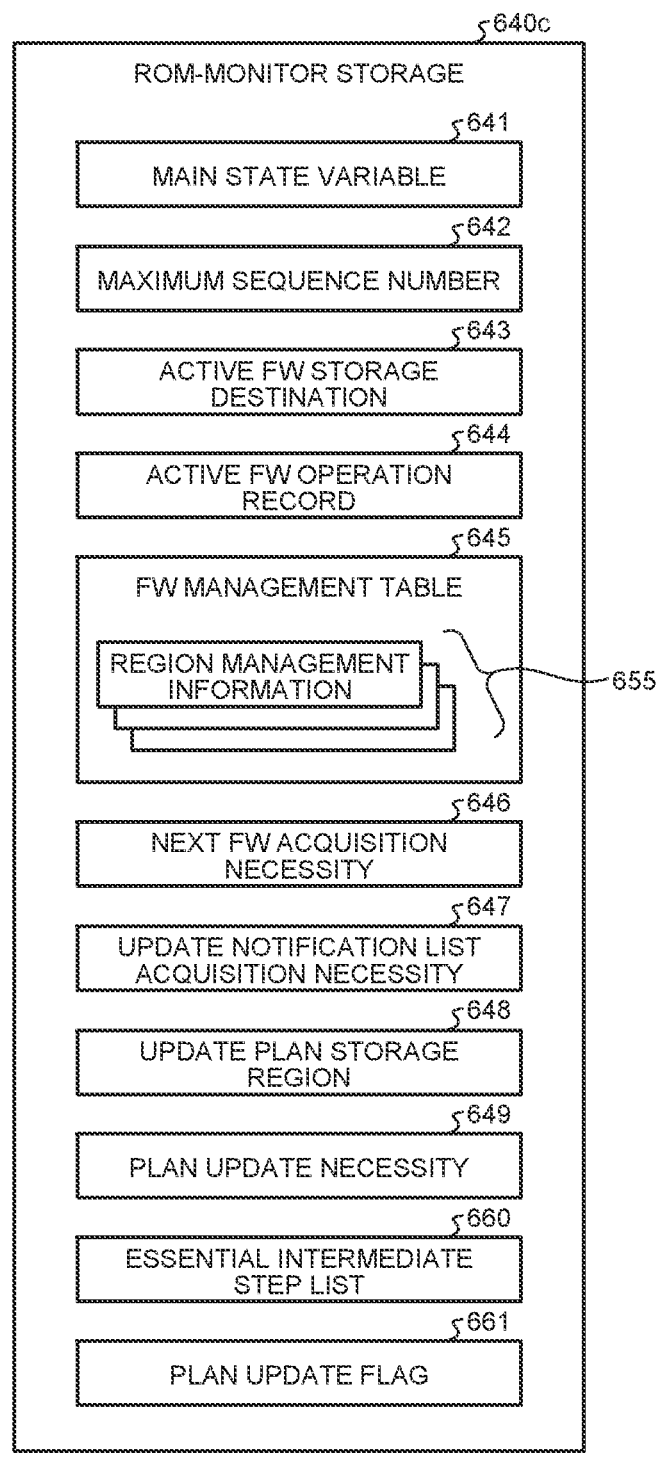
FIG. 30 is a schematic diagram illustrating an exemplary data group stored in a ROM-monitor storage according to the fourth embodiment.

FIG. 30 is a schematic diagram illustrating an exemplary data group stored in the ROM-monitor storage 640c according to the fourth embodiment.

As in the first embodiment, The ROM-monitor storage 640c stores therein a main state variable 641, a maximum sequence number 642, an active FW storage destination 643, an active FW operation record 644, an FW management table 645, and a next FW acquisition necessity 646.

In the fourth embodiment, the ROM-monitor storage 640c further stores therein an update notification list acquisition necessity 647, a plan update necessity 649, an essential intermediate step list 660, and a plan update flag 661. The ROM-monitor storage 640c has an update plan storage region 648 for storing the update plan allocated thereto.

Figure 31:
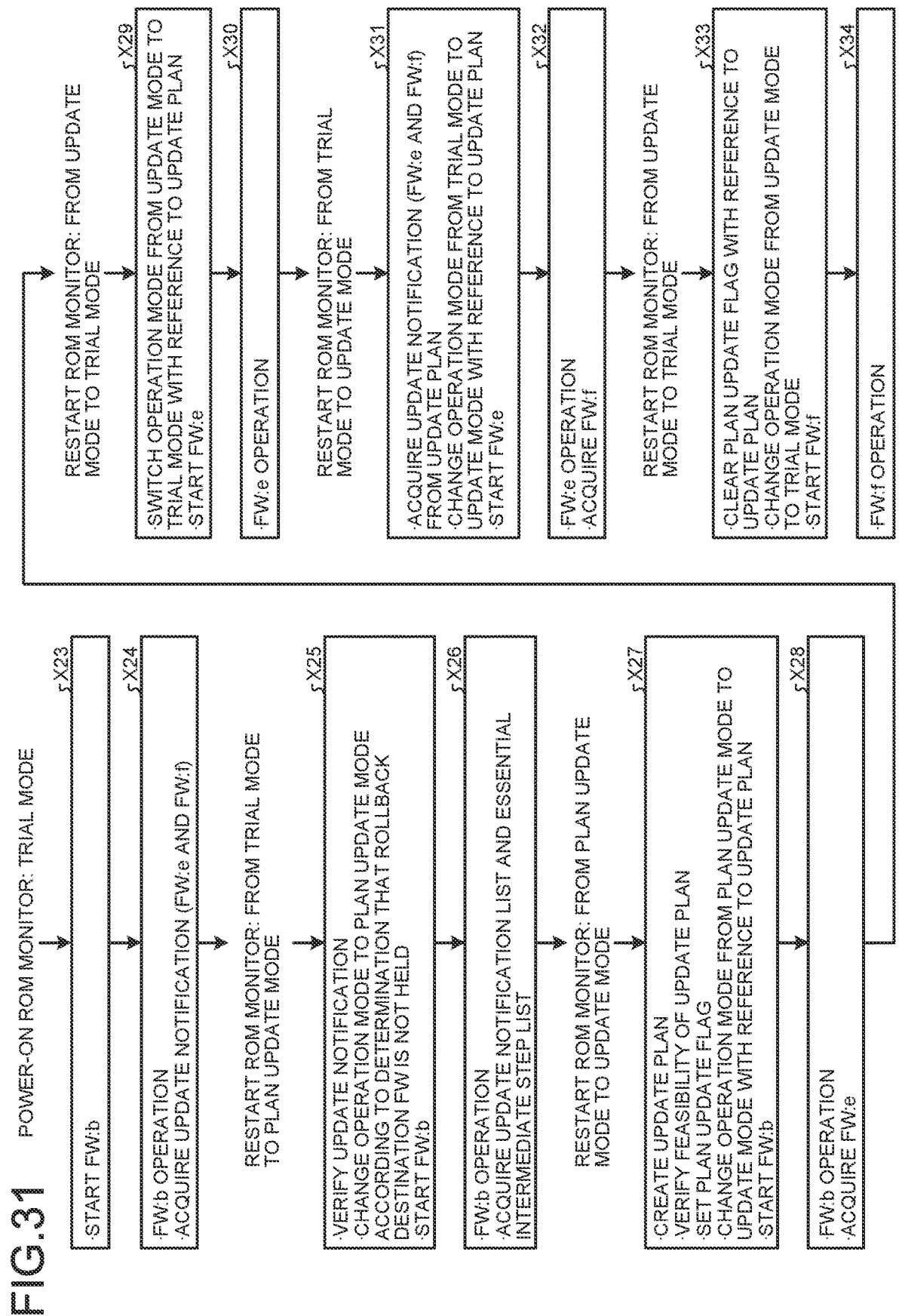
FIG. 31 is a sequence diagram illustrating an exemplary operation of the terminal device according to the fourth embodiment.

FIG. 31 is a sequence diagram illustrating an exemplary operation of the terminal device 100c according to the fourth embodiment. Referring to FIG. 31, version-X firmware is referred to as firmware FW:x.

Upon power-on of the terminal device 100c, in Step X23 the ROM monitor 520c starts up version-B firmware in the trial mode.

In Step X24, the version-B firmware starts up in the trial mode and acquires the latest update notification (FW:e and FW:f) and restarts the CPU 200. The update notification (FW:e and FW:f) designates the version-E firmware as the rollback firmware and designates the version F firmware as the update firmware.

In Step X25, the ROM monitor 520c determines that the version-B firmware being the previous firmware normally operates. The ROM monitor 520c verifies the update notification (FW:e and FW:f) using the sequence number 811 and the signature 813. The ROM monitor 520c then determines whether or not the terminal device 100c holds each piece of firmware designated by the update notification (FW:e and FW:f), that is, the version-E firmware and the version F firmware. After determining that the terminal device 100c does not hold the version-E firmware designated as the rollback destination, the ROM monitor 520c sets a flag to the acquisition necessity 647 in the update notification list and changes the main state variable 641 to the plan update mode. The ROM monitor 520c starts up the version-B firmware again.

In Step X26, the version-B firmware starts up in the plan update mode and acquires the update notification list and the essential intermediate step list, stores the update notification list and the essential intermediate step list in the shared storage 620, and restarts the CPU 200.

In Step X27, the ROM monitor 520c determines that the version-B firmware being the previous firmware normally operates. The ROM monitor 520c checks the authenticity of the update notification list acquired in Step X26 and the update notifications included in the update notification list. The ROM monitor 520c creates the update plan based on the update notification list and the essential intermediate step list. Then, the ROM monitor 520c evaluates the feasibility of the update plan. After succeeding in evaluating the feasibility, the ROM monitor 520c writes the update plan to the update plan storage region 648 of the ROM-monitor storage 640c, writes the essential step list to the ROM-monitor storage 640c, and sets the plan update flag 661.

With the plan update flag 661 set, the ROM monitor 520c sequentially reads the update notifications from the update plan, and updates the firmware according to the read update notifications. The plan update flag 661 is cleared upon completion of the firmware updates corresponding to all the update notifications held in the update plan.

In Step X27, the version-E firmware is designated as an intermediate step. In addition, following the update plan, the firmware is updated from the version-B to the version-E, and from the version-E to the version F. That is, the update plan has an update notification (FW:b and FW:e) and the update notification (FW:e and FW:f) recorded in this order.

In Step X27, the ROM monitor 520c selects an update notification (FW:b and FW:e) from the update plan, and sets one storage region 631 to be writable. Then, the ROM monitor 520c sets the FW acquisition request flag 666, sets the main state variable 641 to the update mode, and starts up the version-B firmware.

Subsequently, according to the update plan, the ROM monitor 520c acquires the version-E firmware by the version-B firmware having started up in the update mode (Step X28), starts up the version-E firmware in the trial mode (Step X29), checks the operation of the version-E firmware having started up in the trial mode (Step X30), acquires the update notification (FW:e and FW:f) from the update plan and starts up the version-E firmware in the update mode (Step X31), acquires the version F firmware by the version-E firmware having started up in the update mode (Step X32), and starts up the version F firmware in the trial mode (Step X33). In Step X34, the version F firmware having started up in the trial mode starts operating.

For example, an application of the terminal device 100c that implements a function of collecting sensing data by firmware is considered. In this application, the version-E firmware can convert a sensing data format acquired according to the firmware of a version older than the version-E into a format useable in the version-E or later versions (for example, the version F firmware). If the firmware is updated from the version-B to the version F skipping the version-E firmware, the operator is to manually change the sensing data format in the terminal device 100c that is executing the version F firmware. According to the fourth embodiment as illustrated in FIG. 31, in response to the designation of the version-E as the essential intermediate step, the terminal device 100c updates the firmware to the version F via the version-E. The version-E firmware automatically converts the sensing data format, which eliminates the necessity for the operator to perform the format conversion.

In the fourth embodiment, the plan update mode and the plan update flag 661 serving as an auxiliary state variable are prepared in order to update the plan for the terminal device 100c to the latest state at once. In the plan update mode, the ROM monitor 520c acquires the update notification list for the plan update, creates the update plan, and sets the plan update flag 661. With the plan update flag 661 set, the terminal device 100c sequentially updates the pieces of firmware according to the update notifications contained in the update plan created in advance instead of acquiring the update notification 802 by the firmware (in other words, the RTOS 510), and clears the plan update flag 661 upon completion of the application of all the update plans.

Figure 32:
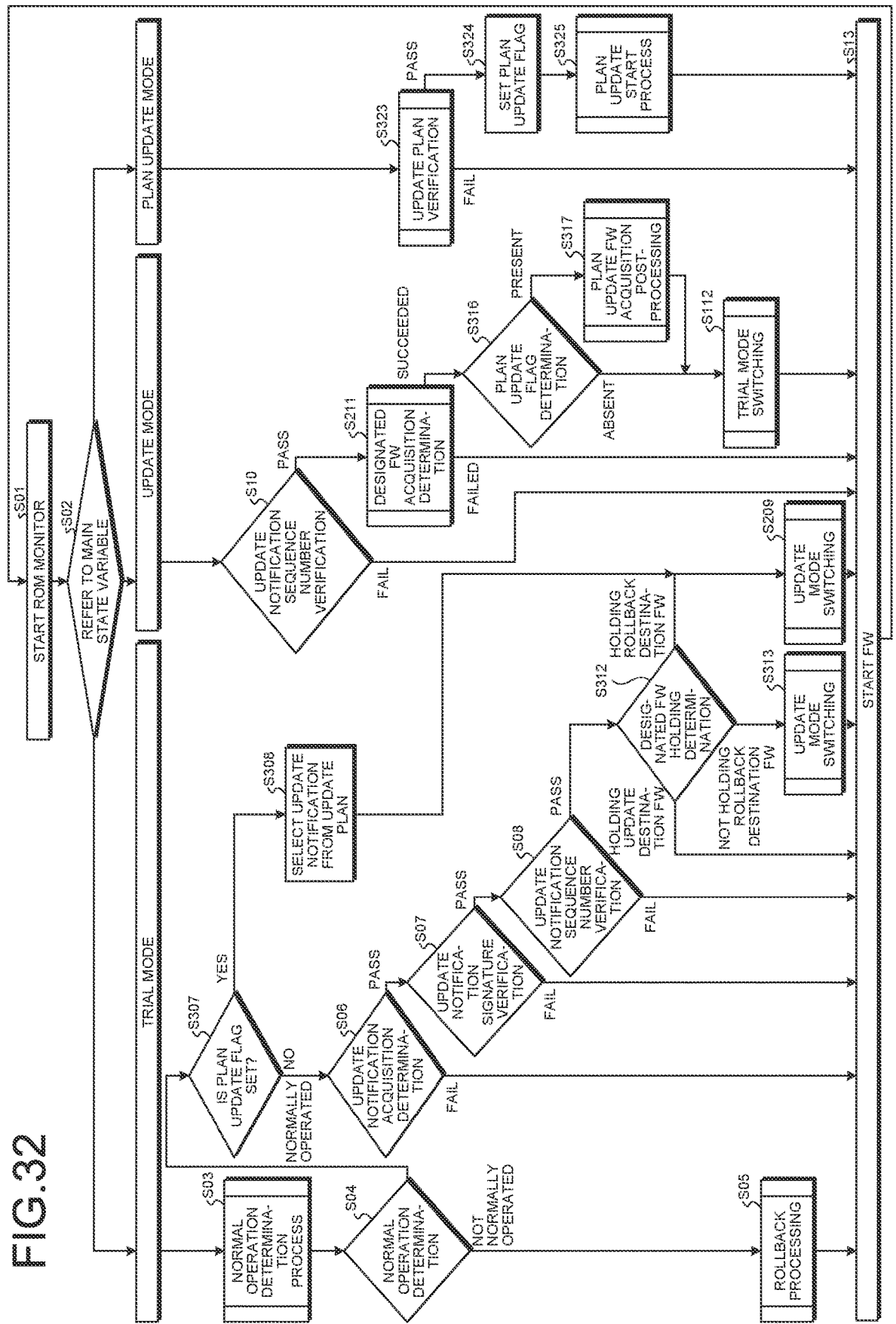
FIG. 32 is a flowchart illustrating an operation of a ROM monitor in detail according to the fourth embodiment.

FIG. 32 is a flowchart illustrating an operation of the ROM monitor 520c in detail according to the fourth embodiment.

The ROM monitor 520c of the fourth embodiment is different in operation from the ROM monitor 520c of the third embodiment illustrated in FIG. 23 in additionally including processing of S312 and S313, processing in the plan update mode including S323 to S325, processing of S316 and S317, and the processing of S307 and S308. The following will describe a difference in operation from the third embodiment. The features of the fourth embodiment may be identical to the second embodiment except for the difference from the third embodiment.

The ROM monitor 520c executes processing of S12 and S13 in the update mode. When a result of the verification of update notification sequence number in S08 is a pass, the ROM monitor 520c determines as to holding of designated firmware in S312. In S312, the ROM monitor 520c makes a determination as to switching of the operation mode according to the update notification 802. More specifically, the ROM monitor 520c determines whether or not the terminal device 100c holds the rollback firmware and the update firmware designated by the update notification 802. After determining that the terminal device 100c holds the rollback firmware, the ROM monitor 520c proceeds to S209 to switch the operation mode to the update mode. After determining that the terminal device 100c holds no rollback firmware, the ROM monitor 520c proceeds to plan update mode switching in S313 to switch the operation mode to the plan update mode. Further, when the terminal device 100c holds the update firmware designated by the update notification, the ROM monitor 520c proceeds to S13 without switching the operation mode.

Figure 33:
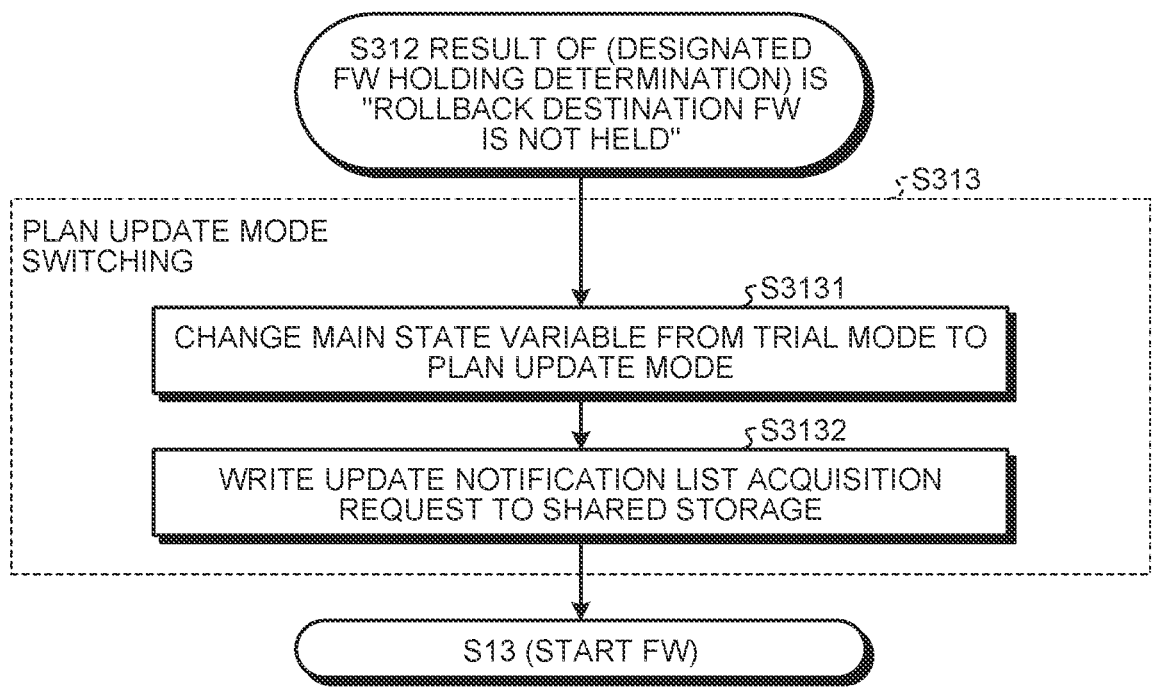
FIG. 33 is a flowchart illustrating plan update mode switching in detail according to the fourth embodiment.

FIG. 33 is a flowchart illustrating the plan update mode switching (S313 in FIG. 32) in detail according to the fourth embodiment.

In the plan update mode switching, the ROM monitor 520c first changes the main state variable 641 from the trial mode to the plan update mode (S3131).

In S3132 the ROM monitor 520c writes an update notification list acquisition request to the shared storage 620. This completes the plan update mode switching. Upon completion of the plan update mode switching, the ROM monitor 520c proceeds to S13.

In Step X25 illustrated in FIG. 31, since the terminal device 100c does not hold the version-E firmware designated as the rollback destination, the ROM monitor 520c changes the operation mode from the trial mode to the plan update mode through the plan update mode switching illustrated in FIG. 33.

In the fourth embodiment as described above, the ROM monitor 520c determines the state of the terminal device 100c, and transitions to the plan update mode when it is not possible to update the currently held firmware to the firmware according to the latest update notification 802.

As illustrated in FIG. 32, in the plan update mode the ROM monitor 520c first verifies the update plan (S323).

Figure 34:
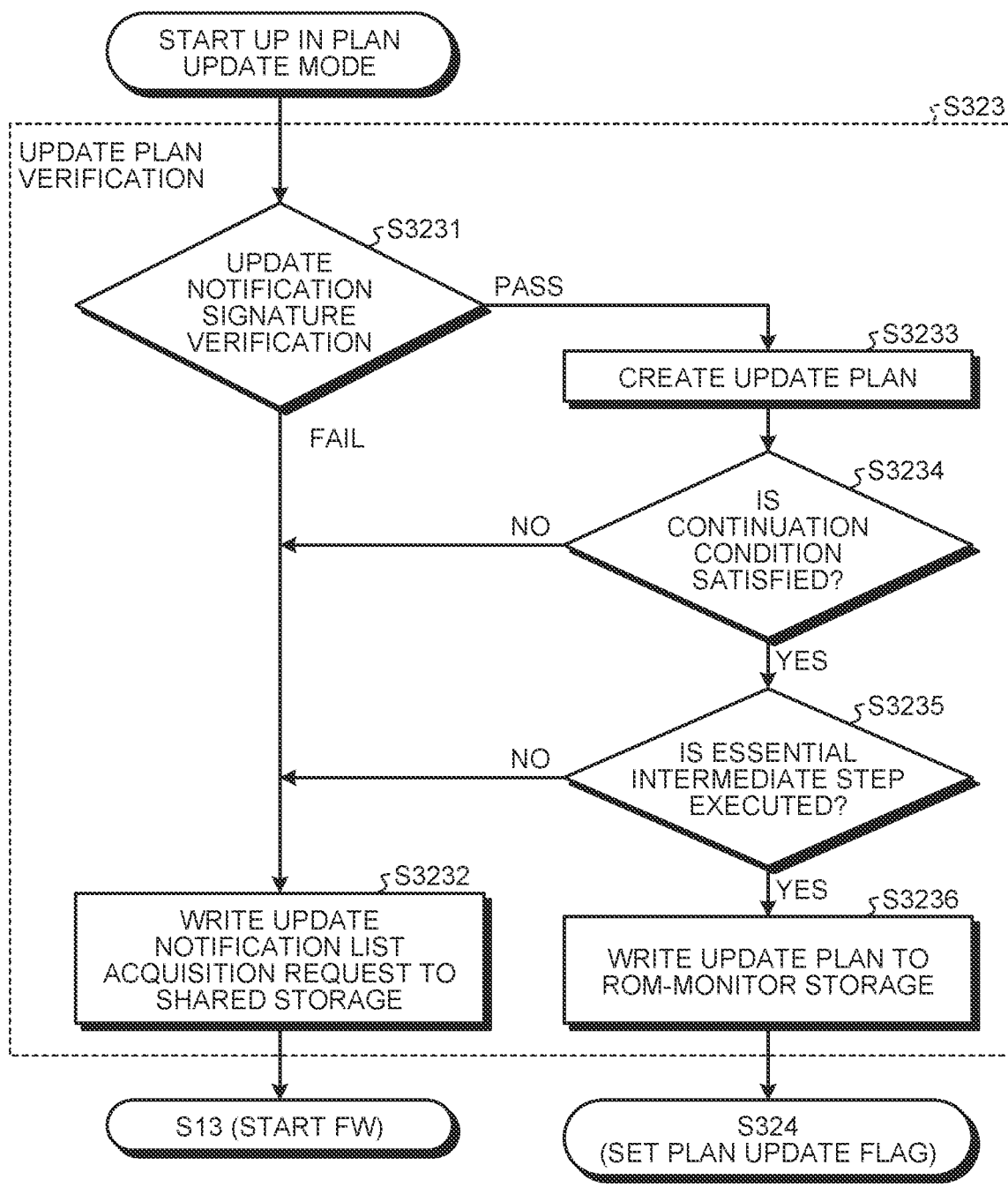
FIG. 34 is a flowchart illustrating update plan verification in detail according to the fourth embodiment.

FIG. 34 is a flowchart illustrating the update plan verification (S323 in FIG. 32) according to the fourth embodiment.

In the update plan verification, the ROM monitor 520c first verifies the update notification (S3231) with the signature. The ROM monitor 520c verifies the update notification list or the update notification 802 included in the update notification list acquired by the previous firmware using the signature 813, to determine the authenticity of the update notification list or the update notification included in the update notification list.

When the update notification verification results in a fail (S3231: fail), the ROM monitor 520c writes the update notification list acquisition request to the storage region 631 again (S3232), and proceeds to S13.

When the update notification verification results in a pass (S3231: pass), the ROM monitor 520c creates an update plan for the terminal device 100c to change from the current state to the latest state via the intermediate step with reference to the update notification list and the essential intermediate step list acquired or designated by the firmware (S3233).

In S3234 the ROM monitor 520c determines whether or not the order of a series of firmware updates according to the update plan satisfies the continuation condition (S3234). After determining satisfaction of the continuation condition (S3234: Yes), the ROM monitor 520c determines whether or not the series of firmware updates according to the update plan includes the essential intermediate step (S3235). When the series of firmware updates according to the update plan includes the essential intermediate step (S3235: Yes), the ROM monitor 520c writes the update plan to the update plan storage region 648 of the ROM-monitor storage 640c (S3236). The ROM monitor 520c then completes the update plan verification and proceeds to S324.

Upon non-satisfaction of the continuation condition (S3234: No) or when the series of firmware updates according to the update plan does not include the essential intermediate step (S3235: No), the ROM monitor 520c proceeds to S3232.

In S324 in FIG. 32, the ROM monitor 520c sets the plan update flag 661. The ROM monitor 520c performs a plan update start process (S325). In the plan update start process, the ROM monitor 520c changes the main state variable 641 from the plan update mode to the update mode. This changes the operation mode to the update mode. Then, the ROM monitor 520c proceeds to S13.

In the update mode, the ROM monitor 520c determines whether to have acquired designated firmware (S211), and verifies the integrity of the update firmware designated by the update notification 802 that designates the previous firmware as the rollback firmware. When the integrity verification results in a pass, the ROM monitor 520c determines whether or not there is the plan update flag 661 (S316), that is, the plan update flag 661 is set. With no plan update flag 661 found (S316: No), the ROM monitor 520c executes trial mode switching (S112). With the plan update flag 661 found (S316: Yes), the ROM monitor 520c executes plan update FW acquisition post-processing (S317).

Figure 35:
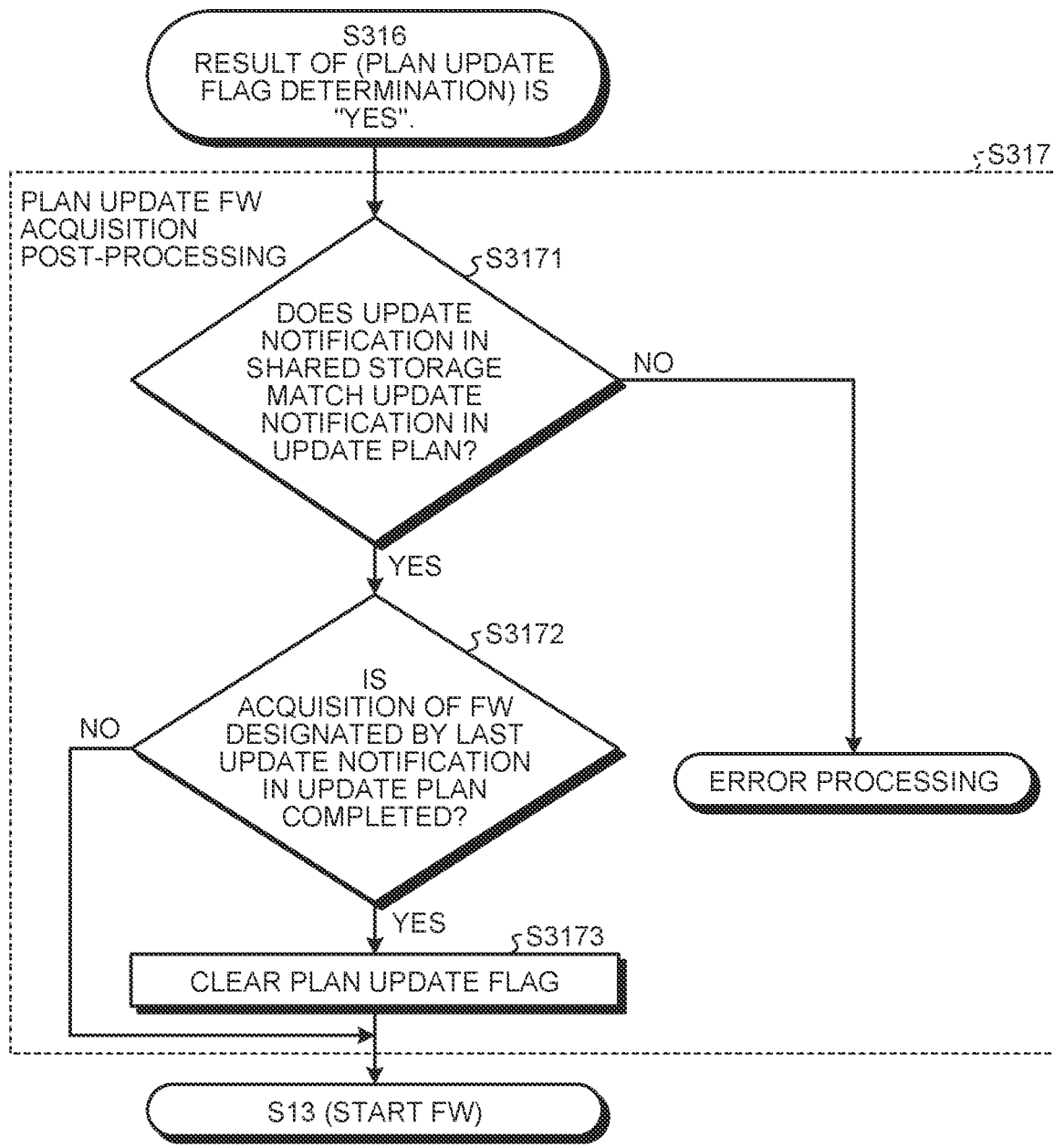
FIG. 35 is a flowchart illustrating a plan update FW acquisition post-processing in detail according to the fourth embodiment.

FIG. 35 is a flowchart illustrating the plan update FW acquisition post-processing in detail (S317 in FIG. 32) according to the fourth embodiment.

In the plan update FW acquisition post-processing, the ROM monitor 520c determines whether or not the update notification 802 in the shared storage 620 matches any update notification 802 included in the update plan (S3171). The update notification 802 selected from the update plan is written to the shared storage 620 by the processing in S307 as described later. In S3171, the ROM monitor 520c checks whether or not the update notification 802 in the shared storage 620 has been selected from the update plan.

When the update notification 802 in the shared storage 620 does not match any update notification 802 included in the update plan (S3171: No), the ROM monitor 520c executes given error processing.

When the update notification 802 in the shared storage 620 matches any update notification 802 included in the update plan (S3171: Yes), the ROM monitor 520c determines completion or non-completion of acquiring the firmware designated by the last one of the update notifications in the update plan (S3172). After determining completion of acquiring the firmware designated by the last one of the update notifications in the update plan (S3172: Yes), the ROM monitor 520c clears the plan update flag 661 (S3173). Then, the ROM monitor 520c completes the plan update FW acquisition post-processing, proceeding to S13.

After determining non-completion of acquiring the firmware designated by the last one of the update notifications in the update plan (S3172: No), the ROM monitor 520c skips S3173.

In this manner, upon completion of all the firmware updates defined by the update plan, the ROM monitor 50c clears the plan update flag 661 and completes the plan update.

Returning to FIG. 32, in the trial mode the ROM monitor 520c determines whether or not the plan update flag 661 is set after determining that the previous firmware operates normally (S04: normally operated), (S307). With the plan update flag 661 set (S307: Yes), the ROM monitor 520c selects the update notification 802 corresponding to the FW to be acquired next from among the update notifications 802 included in the update plan, and writes the selected update notification 802 to the shared storage 620 (S308). The ROM monitor 520c then executes the update mode switching (S209).

According to the fourth embodiment as described above, when the terminal device 100c does not hold the firmware designated by the update notification 802, the ROM monitor 520c starts up firmware (second firmware) determined as normally operating in the plan update mode. The second firmware starts up in the plan update mode and acquires an update notification list containing two or more issued update notifications. The ROM monitor 520c generates an update plan indicating the order of update of two or more pieces of firmware with reference to the update notification list. The ROM monitor 520c selects the firmware in the order following the update plan. When the terminal device 100c does not hold the selected firmware, the ROM monitor 520c starts up the firmware determined as normally operating in the update mode, the firmware having started up in the update mode acquires the selected firmware, and the ROM monitor 520c starts up the selected firmware in the trial mode.

Thus, if the terminal device 100c starts up after the operation stop period in response to the update notification 802 issued during the operation stop period, the terminal device 100c can update the firmware to the latest version while avoiding updating to firmware with a defect.

According to the fourth embodiment, the second firmware starts up in the plan update mode and acquires an essential intermediate step. The ROM monitor 520c creates an update plan including the essential intermediate step.

This makes it possible to update a series of firmware including essential firmware.

According to the fourth embodiment, the ROM monitor 520c acquires the update firmware designated by the update notification 802 selected from the update plan when the firmware designated as the rollback firmware by the update notification 802 starts up in the update mode.

As described above, according to the first to fourth embodiments, the terminal devices 100, 100a, 100b, and 100c can detect counterfeit of any of the update notifications 701, 702, and 801 and the update firmware, if occurs. In addition, the terminal devices 100, 100a, 100b, and 100c can acquire the update firmware by the firmware determined as normally operating. To deal with the updated firmware not normally operating, the terminal devices 100, 100a, 100b, and 100c can rollback the firmware to firmware determined as normally operating. Thus, according to the first to fourth embodiments, the terminal devices 100, 100a, 100b, and 100c excel in terms of security and availability.

In the above embodiments, the storages are set in the single nonvolatile memory 203. The CPU 200 may be equipped with a plurality of nonvolatile memories, and the storages may be distributed in the plurality of nonvolatile memories.

In addition, in the above embodiments, the CPU 200 has single instruction execution unit 201. The CPU 200 may be equipped with a plurality of instruction execution units, and the operations of the CPU 200 may be executed in the plurality of instruction execution units in a distributed manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An electronic apparatus comprising:
a processor configured to be able to:
execute a firmware program and a monitor program from each other,
switch between a plurality of operation modes of the monitor program, the plurality of operation mode including a first mode and a second mode, and
start up the firmware program according to the monitor program; and
a nonvolatile memory which includes:
storage regions in which a plurality of firmware programs is stored,
a signature table configured to hold signatures of the plurality of firmware programs individually stored in the storage regions or a signature of one of the firmware programs including an identification number of an update notification used for update,
a firmware program storage configured to store therein information specifying a firmware program selected to be executed, in accordance with the monitor program, among the plurality of firmware programs,
a first storage configured to hold a result of execution of a firmware program selected in accordance with the monitor program among the plurality of firmware programs,
a second storage configured to hold the update notification acquired as a result of the execution of the firmware program, and
a third storage configured to hold a maximum identification number of firmware programs that have been executed among the plurality of firmware programs, wherein in the first mode, the processor
determines, according to a result of a previous execution of a firmware program, validity of a function of the firmware program;
after failing to determine the validity of the function of the firmware program, selects and executes one firmware program from the plurality of firmware programs stored in the storage regions according to a given order of priority; and
after succeeding in determining the validity of the function of the firmware program, performs a first verification of verifying the update notification acquired and held in the second storage, and
changes an operation mode to be used from the first mode to the second mode to execute the firmware program, when the identification number of the update notification is larger than the maximum identification number, and
in the second mode,
after succeeding in a second verification of verifying the update notification stored in the second storage, succeeding in a third verification of verifying a firmware program acquired and stored in the storage region by the previous execution of the firmware program in response to the update notification, and succeeding in a fourth verification of confirming that the identification number is larger than the maximum identification number,
the processor transfers the update notification from the second storage to an entry of the signature table corresponding to the firmware program,
the processor changes the firmware program to be executed and an operation mode to be used from the second mode to the first mode and executes the firmware program, and
the processor executes the firmware program again after failing in any of the second verification, the third verification, and the fourth verification.

2. The electronic apparatus according to claim 1, wherein the identification number of the update notification is a sequence number of the update notification.

3. The electronic apparatus according to claim 1, wherein each storage region among the storage regions is capable of storing therein one of the plurality of firmware programs, wherein
in the second mode the storage regions are set to be unwritable, and
in the first mode, after succeeding in the first verification of the update notification, the processor selects one of the storage regions as a first region and set the first region to be writable according to the monitor program, and stores the acquired firmware program in the first region.

4. The electronic apparatus according to claim 2, wherein the update notification includes a hash value of an update firmware program and the identification number designating an alternative firmware program to be executed, and
the processor limits the alternative firmware program to be executed.

5. The electronic apparatus according to claim 4, wherein when the storage regions do not store the firmware program corresponding to the identification number of the alternative firmware program designated by the update notification, the processor acquires the alternative firmware program in the second mode before acquiring the update firmware program.

6. The electronic apparatus according to claim 4, wherein the plurality of operation modes includes a third mode,
the processor changes an operation mode to be used to the third mode, when the processor, in the first mode, processes the update notification held in the second storage, and when the storage regions do not store the firmware program with the identification number designating the alternative firmware program,
in response to a startup of the monitor program in the third mode, the processor acquires a list of two or more issued update notifications acquired in the previous firmware program processing,
the processor selects, from the list of update notifications, update notifications for implementing sequential updates to a latest firmware program, and stores the update notifications as an update plan list, and
the processor acquires the update notifications from the update plan list in the first mode until completion of the updates to the latest firmware program.

7. A method for controlling an electronic apparatus which includes a nonvolatile memory, the method comprising:
executing a firmware program and a monitor program from each other,
switching between a plurality of operation modes of the monitor program, the plurality of operation mode including a first mode and a second mode, and
starting up the firmware program according to the monitor program; wherein
a nonvolatile memory includes:
storage regions in which a plurality of firmware programs is stored,
a signature table configured to hold signatures of the plurality of firmware programs individually stored in the storage regions or a signature of one of the firmware programs including an identification number of an update notification used for update,
a firmware program storage configured to store therein information specifying a firmware program selected to be executed, in accordance with the monitor program, among the plurality of firmware programs,
a first storage configured to hold a result of execution of a firmware program selected in accordance with the monitor program among the plurality of firmware programs,
a second storage configured to hold the update notification acquired as a result of the execution of the firmware program, and
a third storage configured to hold a maximum identification number of firmware programs that have been executed among the plurality of firmware programs, wherein
the method further comprising:
in the first mode,
determining, according to a result of a previous execution of a firmware program, validity of a function of the firmware program;
after failing to determine the validity of the function of the firmware program, selecting and executing one firmware program from the plurality of firmware programs stored in the storage regions according to a given order of priority; and
after succeeding in determining the validity of the function of the firmware program, performing a first verification of verifying the update notification acquired and held in the second storage, and
changing an operation mode to be used from the first mode to the second mode to execute the firmware program, when the identification number of the update notification is larger than the maximum identification number, and in the second mode, after succeeding in a second verification of verifying the update notification stored in the second storage, succeeding in a third verification of verifying a firmware program acquired and stored in the storage region by the previous execution of the firmware program in response to the update notification, and succeeding in a fourth verification of confirming that the identification number is larger than the maximum identification number, transferring the update notification from the second storage to an entry of the signature table corresponding to the firmware program, changing the firmware program to be executed and an operation mode to be used from the second mode to the first mode and executing the firmware program, and executing the firmware program again after failing in any of the second verification, the third verification, and the fourth verification.

8. The method according to claim 7, wherein
the identification number of the update notification is a sequence number of the update notification.

9. The method according to claim 7, wherein
each storage region among the storage regions is capable of storing therein one of the plurality of firmware programs, and in the second mode the storage regions are set to be unwritable, the method further comprises, in the first mode, after succeeding in the first verification of the update notification, selecting one of the storage regions as a first region, setting the first region to be writable according to the monitor program, and storing the acquired firmware program in the first region.

10. The method according to claim 8, wherein
the update notification includes a hash value of an update firmware program and the identification number designating an alternative firmware program to be executed, and the method further comprises limiting the alternative firmware program to be executed.

11. The method according to claim 10, further comprises,
when the storage regions do not store the firmware program corresponding to the identification number of the alternative firmware program designated by the update notification, acquiring the alternative firmware program in the second mode before acquiring the update firmware program.

12. The method according to claim 10, wherein
the plurality of operation modes includes a third mode,
the method further comprises changing an operation mode to be used to the third mode, when processing the update notification held in the second storage in the first mode, and when the storage regions do not store the firmware program with the identification number designating the alternative firmware program, in response to a startup of the monitor program in the third mode, acquiring a list of two or more issued update notifications acquired in the previous firmware program processing, selecting, from the list of update notifications, update notifications for implementing sequential updates to a latest firmware program, and storing the update notifications as an update plan list, and acquiring the update notifications from the update plan list in the first mode until completion of the updates to the latest firmware program.

\* \* \* \* \*